(12) United States Patent
Shaver et al.

(10) Patent No.: US 8,001,471 B2
(45) Date of Patent: Aug. 16, 2011

(54) SYSTEMS AND METHODS FOR PROVIDING A SIMILAR OFFLINE VIEWING EXPERIENCE OF ONLINE WEB-SITE CONTENT

(75) Inventors: Robert Shaver, Watertown, MA (US); William Clogston, Weymouth, MA (US)

(73) Assignee: Maven Networks, Inc., Cambridge, MA (US)

( * ) Notice: Subject to any disclaimer, the term of this patent is extended or adjusted under 35 U.S.C. 154(b) by 253 days.

(21) Appl. No.: 11/478,066

(22) Filed: Jun. 29, 2006

(65) Prior Publication Data

US 2007/0204057 A1    Aug. 30, 2007

Related U.S. Application Data

(60) Provisional application No. 60/777,672, filed on Feb. 28, 2006.

(51) Int. Cl.
*G06F 3/00* (2006.01)
(52) U.S. Cl. ........ 715/716; 715/719; 715/720; 715/722; 715/748
(58) Field of Classification Search .................. 715/854, 715/716, 784, 719, 720, 722, 748
See application file for complete search history.

(56) References Cited

U.S. PATENT DOCUMENTS 6,298,385 B1 * 10/2001 Sparks et al. ................. 709/233
6,460,087 B1 * 10/2002 Saito et al. .................... 709/236

(Continued)

FOREIGN PATENT DOCUMENTS

WO    WO2005122532 A1    12/2005

OTHER PUBLICATIONS

International Search Report dated Sep. 21, 2007 (PCT/US2007/062857).

(Continued)

*Primary Examiner* — Weilun Lo
*Assistant Examiner* — Shashi K Becker
(74) *Attorney, Agent, or Firm* — Greenberg Traurig, LLP

(57) ABSTRACT

The present invention provides a comprehensive development platform and client-side technology for intelligent and cost-effective delivery of video, audio and broadband content over a network, such as the Internet, to desktop, mobile computing, and network connected devices. In one embodiment of the present invention, an intelligent delivery system (IDS) delivers offline content on a client that provides a user experience similar to corresponding content accessed via a network, such as content experienced by a user visiting a web-site on the Internet. Through a background delivery process, the IDS transparently provides offline content automatically to the client. A user may display online content via a browser the first time visiting a content provider, such as a web-site, and from thereafter, the IDS automatically provides a second application to display offline content downloaded from the content provider. The user interface provided by the offline content stored on the client has a substantially similar appearance and behavior to the user interface presented by the online content. Using the second application locally on the client, the user displays and experiences offline content substantially similar to and corresponding to portions of the online content communicated via the Internet. For example, the user may display in the second application a high-definition video from storage of the client in a user interface that is substantially similar to the user interface of the web-site for streaming video.

19 Claims, 50 Drawing Sheets

U.S. PATENT DOCUMENTS

| | | | |
|---|---|---|---|
| 6,745,226 B1* | 6/2004 | Guedalia | 709/203 |
| 7,237,032 B2 | 6/2007 | Gemmell | |
| 2001/0051998 A1 | 12/2001 | Henderson | |
| 2002/0124098 A1* | 9/2002 | Shaw | 709/231 |
| 2002/0143952 A1* | 10/2002 | Sugiarto et al. | 709/227 |
| 2002/0154163 A1 | 10/2002 | Melchner | |
| 2003/0014483 A1 | 1/2003 | Stevenson et al. | |
| 2003/0110503 A1 | 6/2003 | Perkes | |
| 2004/0080528 A1* | 4/2004 | Rand et al. | 345/738 |
| 2005/0034151 A1 | 2/2005 | Abramson | |
| 2005/0065855 A1* | 3/2005 | Geller | 705/26 |
| 2005/0075783 A1* | 4/2005 | Wolf et al. | 701/117 |
| 2005/0165911 A1 | 7/2005 | Homiller | |
| 2005/0044260 A1 | 8/2005 | Abramson et al. | |
| 2005/0273514 A1* | 12/2005 | Milkey et al. | 709/232 |
| 2006/0156343 A1 | 7/2006 | Jordan | |
| 2006/0179154 A1* | 8/2006 | Sitaraman et al. | 709/231 |
| 2006/0277098 A1* | 12/2006 | Chung et al. | 705/14 |
| 2007/0033531 A1 | 2/2007 | Marsh | |
| 2007/0038567 A1 | 2/2007 | Allaire et al. | |
| 2007/0038931 A1* | 2/2007 | Allaire et al. | 715/526 |
| 2007/0094705 A1* | 4/2007 | Crowley et al. | 725/136 |
| 2007/0204011 A1 | 8/2007 | Shaver et al. | |

OTHER PUBLICATIONS

Office Action issued in connection with U.S. Appl. No. 11/478,496 dated Mar. 10, 2010.

Office Action issued in connection with U.S. Appl. No. 11/478,496 dated Aug. 13, 2009.

Office Action issued in connection with U.S. Appl. No. 11/478,496 dated Mar. 12, 2009.

Hofmann, Chris et al., "Firefox and Thunderbird Garage", Prentice Hall, Apr. 2005, Chapter 8 Retrieved on May 21, 2010 <<URL:http://proquest.safaribooksonline.com/0131870041>>.

Yeow, Cheah Chu, "Firefox Secrets", Site Point, Jun. 2005, Sections 2.4-2.5 Retrieved on May 21, 2010 <<URL:http://proquest.safaribooksonline.com/0975240242>>.

* cited by examiner

SYSTEMS AND METHODS FOR PROVIDING A SIMILAR OFFLINE VIEWING EXPERIENCE OF ONLINE WEB-SITE CONTENT

RELATED APPLICATIONS

This application claims priority to U.S. Provisional patent application Ser. No. 60/777,672, entitled "SYSTEMS AND METHODS FOR DELIVERING AND MANAGING MEDIA CONTENT DOWNLOADED TO A NETWORK CONNECTED DEVICE", filed Feb. 28, 2006, which is hereby incorporated in its entirety by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention generally relates to an intelligent client delivery system for delivering and managing media content downloaded to a computing device. More particularly, the present invention relates to systems and methods for providing a similar offline viewing experience of online web-site content.

BACKGROUND INFORMATION

As the number of people communicating over a publicly accessible communication network, such as the Internet, continues to grow, the use, availability and distribution of media content via the Internet, such as video and audio media files, grows as well. The popularity of delivering and experiencing media content via the Internet continues to grow because the Internet provides for both immediacy of the media and interactivity of the media. Media content can provide a rich interactive user experience from a network connected device. In addition, media content delivered to computing devices via a network may receive input from the user or information about the user to both personalize and dynamically enhance the user experience, thereby further increasing the immediacy and interactivity of the medium.

As such, delivering media content via the Internet is quickly gaining adoption as a mechanism for reaching consumers for purposes of marketing and monetizing media content or media assets. For example, traditional broadcasting services, such as television and television advertising, are interested in transforming broadcasting content, advertisement and other media assets into Internet delivered content and Internet enabled consumer experiences that can be monetized, controlled and managed. However, even with increasing improvements in consumer devices, broadband technologies and multimedia interfaces, the adoption and movement towards Internet or Internet Protocol (IP) based delivery of media content to consumer devices raises various challenges in development, implementation and deployment, including content ingestion, media encoding and transcoding, content and catalog management, publishing and delivery, device targeting, digital rights management, and reporting.

One of the challenges facing the development of IP-based media delivery is that consumers may want to experience high quality media content or rich interactive media, such as high-definition video. The delivery and performance of high quality media content may be limited or constrained when transmitted over a network, such as the Internet. For example, a client may communicate with a content provider via a web browser. The content provider may provide a desired user experience via a web-site, such as by branding and interactive content. A smaller video media file of a lower quality may be streamed by the content provider via the Internet to the client and displayed in the web browser with minimal or no performance issues. However, a larger media file of higher quality may only be streamed to the client in a manner having performance issues such as delays in transmission, or other processing delays. As such, the user may be prevented from viewing the media in a continuous desired fashion. This may be due to the size of the media or the bandwidth of the connection of the device. For example, the client may be connected to the Internet with a slower network connection.

In some cases, the user could download the media file to the client and then start a media player locally to view the media offline. Although after downloading the file, the user may experience the higher quality media, the client is then using another user interface, such as a media player, to play the media offline. This results in a different user experience than that provided by the online web-site presence of the content provider. Content providers may invest thousands to millions of dollars in designing web-sites and rich interactive content to present a brand, attract new customers, and maintain customer loyalty. Therefore, content providers typically do not desire users to experience this designed content differently. Therefore, systems and methods are desired for downloading offline content to a user that provides a similar user experience as the online content of the content provider.

SUMMARY OF THE INVENTION

The present invention provides a comprehensive development platform and client-side technology for intelligent and cost-effective delivery of video, audio and broadband content over a network, such as the Internet, to desktop, mobile computing, and network connected devices. In one embodiment of the present invention, an intelligent delivery system (IDS) delivers offline content on a client that provides a user experience similar to corresponding content accessed via a network, such as content experienced by a user visiting a web-site on the Internet. Through a background delivery process, the IDS transparently provides offline content automatically to the client. A user may display online content via a browser the first time visiting a content provider, such as a web-site, and from thereafter, the IDS automatically provides a second application to display offline content downloaded from the content provider. The user interface provided by the offline content stored on the client has a substantially similar appearance and behavior to the user interface presented by the online content. Using the second application locally on the client, the user displays and experiences offline content substantially similar to and corresponding to portions of the online content communicated via the Internet. For example, the user may display in the second application a high-definition video from storage of the client in a user interface that is substantially similar to the user interface of the web-site for streaming video. As such, a content provider may provide a consistent and desired user experience, including branding and interactive content, for both online and offline content.

In one aspect, the present invention relates to a method for providing a user experience of content accessed on a client similar to corresponding content accessed via a network. The method includes providing, by a client, a first user interface having at least a portion communicated via a network, and displaying, by the first user interface, a first set of one or more user interface elements displaying a video media communicated via the network. The first set of one or more user interface elements has an appearance and a behavior. The method includes displaying, by the client, a second user interface provided via content stored in a storage of the client. The second user interface having a second set of one or more user interface elements corresponding and substantially similar to the appearance and behavior of the first set of one or more user interface elements of the first user interface. The method also includes displaying, by the second user interface via the second set of one or more user interface elements the video media from the content stored in the storage of the client.

In one embodiment of the present invention, the method includes displaying, by a browser in communication via the network with a server, the first user interface. In another embodiment, the method includes displaying, by an application on the client, the second user interface. The application may obtain content for the second user interface from the storage of the client instead of via the network. In one embodiment, the application displays for the second user interface at least one user interface element communicated via the network.

In some embodiments, the method displays the second user interface instead of the first user interface in response to a request by a user via an element of the first user interface. In other embodiments, the method displays the second user interface in response to detecting the client is not connected to the network. While displaying the first user interface, in another embodiment, the method automatically downloads from a content source the content comprising the video media and the second user interface. In one embodiment, the method automatically downloads the content as a background process transparent to the user. In another embodiment, the method downloads the video media to the storage of the client as a background process transparent to the user while the first user interface displays the video media on the client communicated via the network.

In some embodiments of the present invention, the method includes selecting, by the user, an element of the first user interface to display the video media in a higher definition of video quality, and invoking, by the first user interface, the second user interface to display the video media from the storage on the client. The video media from the storage provides the higher definition of video quality. In another embodiment, the video media stored in the storage of the client had a desired video characteristic not provided by the video media communicated via the network. The desired video characteristic may include one or more of the following: 1) a resolution, 2) an aspect ratio, 3) a size, 4) a quality, 5) a bit per pixel, 6) a compression, 7) a frame rate, and 8) a bit rate.

In another aspect, the present invention is related to a client providing a user experience of content accessed on the client similar to corresponding content accessed via a network, The client includes a first user interface having at least a portion communicated via a network. The first user interface provides a first set of one or more user interface elements displaying a video media communicated via the network. The first set of one or more user interface elements has an appearance and a behavior. The client also includes a second user interface provided via content stored in a storage of the client. The second user interface having a second set of one or more user interface elements corresponding and substantially similar to the appearance and behavior of the first set of one or more user interface elements of the first user interface. The second user interface displays via the second set of one or more user interface elements the video media from the content stored in the storage of the client.

In one embodiment of the present invention, the client includes a browser displaying the first user interface. The browser may be in communication via the network with a server. In another embodiment, the client has an application for displaying the second user interface. The application may obtain content for the second user interface from the storage of the client instead of via the network. In a further embodiment, the application displays for the second user interface at least one user interface element communicated via the network. In some cases, the second user interface is displayed instead of the first user interface in response to a request by a user via an element of the first user interface. In one embodiment, the second user interface is displayed in response to detecting the client is not connected to the network.

In some embodiments, while displaying the first user interface, a download manager of the client automatically downloads from a content source the content comprising the video media and the second user interface. In one embodiment, the download manager automatically downloads the content as a background process transparent to the user. For example, in an embodiment, the download manager downloads the video media to the storage of the client as a background process transparent to the user while the first user interface displays the video media on the client communicated via the network.

In yet another embodiment, the first user interface has an element selectable by the user to display the video media in a higher definition of video quality, and in response to a selection of the element, the first user interface invokes the second user interface to display the video media from the storage on the client. The video media from the storage provides the higher definition of video quality. In some embodiments, the video media stored in the storage of the client has a desired video characteristic not provided by the video media communicated via the network. The desired video characteristic may include one or more of the following: 1) a resolution, 2) an aspect ratio, 3) a size, 4) a quality, 5) a bit per pixel, 6) a compression, 7) a frame rate, and 8) a bit rate.

The details of various embodiments of the invention are set forth in the accompanying drawings and the description below.

BRIEF DESCRIPTION OF THE DRAWINGS

The foregoing and other objects, aspects, features, and advantages of the present invention will become more apparent and may be better understood by referring to the following description taken in conjunction with the accompanying drawings, in which.

DESCRIPTION

Certain illustrative embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiments of the intelligent delivery system described herein provide a comprehensive development platform and client-side technology for intelligent and cost-effective delivery of high-quality video, audio files and broadband content over a network, such as the Internet, to desktop, mobile computing, and network connected consumer devices. In one illustrative embodiment, the intelligent delivery system provides systems and methods for the downloading and storage of content, such as media files, to a client from one or more content sources. In another illustrative embodiment, the intelligent delivery system provides systems and methods for providing an offline user experience substantially similar to the corresponding online user experience. Furthermore, in some illustrative embodiments, the intelligent delivery system provides systems and methods for personalizing downloaded content and synchronizing the downloaded content among multiple user devices.

Figure 1A:
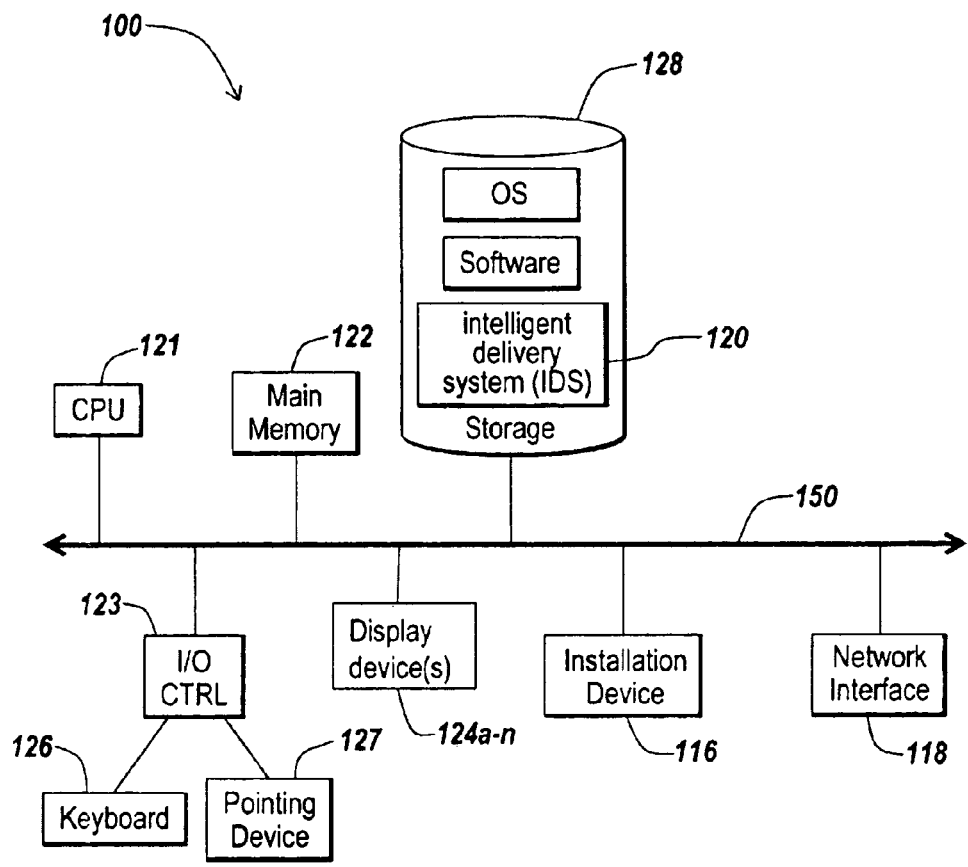
FIGS. 1A and 1B are block diagrams of embodiments of a computing device for practicing an embodiment of the present invention.
Figure 1B:
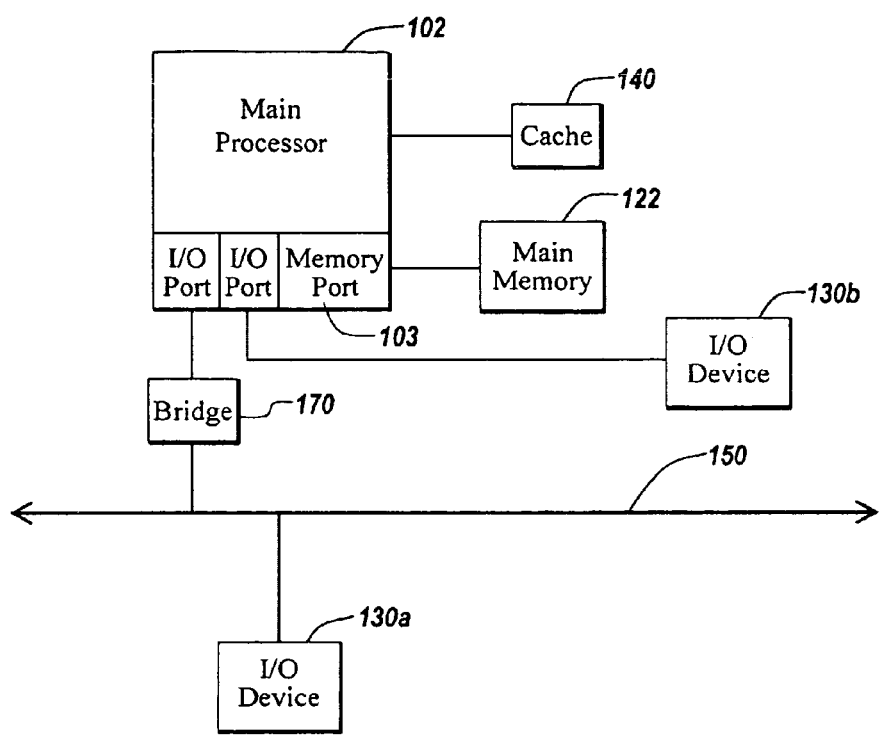

FIGS. 1A and 1B depict block diagrams of a computing device 100, and in some embodiments, also referred to as a network connective device 100, useful for practicing an embodiment of the intelligent delivery system. As shown in FIGS. 1A and 1B, each computing device 100 includes a central processing unit 102, and a main memory unit 122. As shown in FIG. 1A, a typical computing device 100 may include a visual display device 124, a keyboard 126 and/or a pointing device 127, such as a mouse. In some embodiments, the visual display device 124 and any related hardware and/or software supports and is capable of displaying high-definition video as described in detail further herein. Each computing device 100 may also include additional optional elements, such as one or more input/output devices 130a-130b (generally referred to using reference numeral 130), and a cache memory 140 in communication with the central processing unit 102.

The central processing unit 102 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.;, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 102, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 102 communicates with main memory 122 via a system bus 150 (described in more detail below). FIG. 1A depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 102 communicates directly with cache memory 140 via a secondary bus, sometimes referred to as a backside bus. In other embodiments, the main processor 102 communicates with cache memory 140 using the system bus 150. Cache memory 140 typically has a faster response time than main memory 122 and is typically provided by SRAM, BSRAM, or EDRAM.

In the embodiment shown in FIG. 1A, the processor 102 communicates with various I/O devices 130 via a local system bus 150. Various busses may be used to connect the central processing unit 102 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 102 may use an Advanced Graphics Port (AGP) to communicate with the display 124. FIG. 1B depicts an embodiment of a computer 100 in which the main processor 102 communicates directly with I/O device 130b via HyperTransport, Rapid I/O, or InfiniBand. FIG. 1B also depicts an embodiment in which local busses and direct communication are mixed: the processor 102 communicates with I/O device 130a using a local interconnected bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any software 120, or portion thereof, related to the intelligent delivery system described herein. The computing device 100 may further comprise a storage device 128, such as one or more hard disk drives or redundant arrays of independent disks, for storing an operating system and other related software, and for storing application software programs such as any program related to the intelligent delivery system 120. Optionally, any of the installation devices 116 could also be used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif. In one embodiment, the computing device 100 may provide a USB connection to receive a media playing or media storage device, such as an iPod device manufactured by Apple Computer of Cupertino, Calif.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. The computing device 100 can be any workstation, desktop computer, laptop or notebook computer, server, handheld computer, mobile telephone or other portable telecommunication device, media playing device, a gaming system, or any other type and/or form of computing, telecommunications or media device that is capable of communication and that has sufficient processor power and memory capacity to perform the operations described herein. For example, the computing device 100 may comprise a device of the iPod family of devices manufactured by Apple Computer of Cupertino, Calif., a Playstation 2, Playstation 3, or Personal Playstation® Portable (PSP) device manufactured by the Sony Corporation of Tokyo, Japan, a Nintendo DS™ or Nintendo Revolution™ device manufactured by Nintendo Co., Ltd., of Kyoto, Japan, or a Xbox™ or Xbox 360™ device manufactured by the Microsoft Corporation of Redmond, Wash.

Figure 2A:
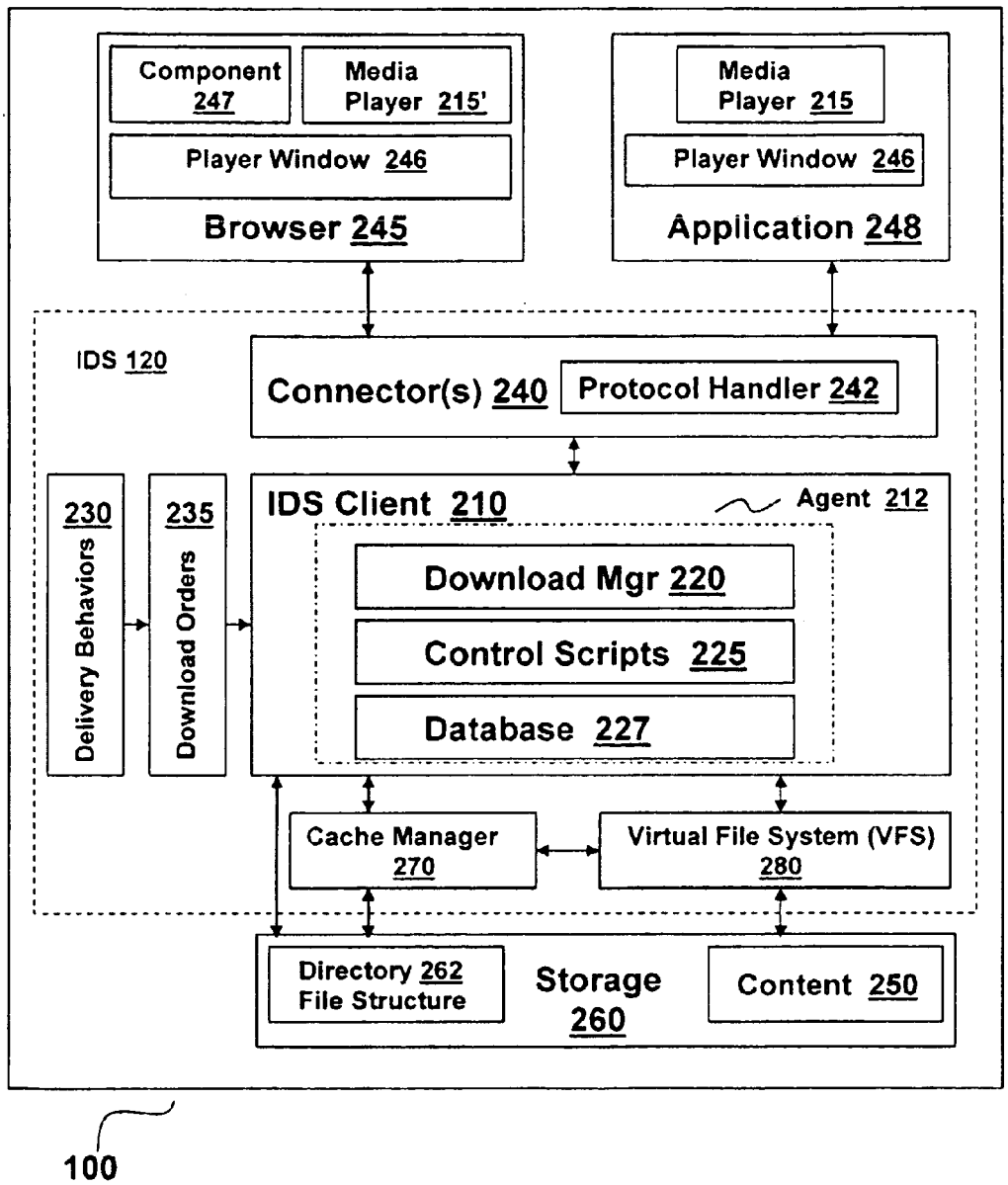
FIG. 2A is a block diagram of an embodiment of an intelligent delivery client system.

In one embodiment, an intelligent delivery system (IDS) provides a client with intelligent downloading of content from a content source, and the playing of media from such content. Referring now to FIG. 2A, an embodiment of the IDS 120 executing on a client 205 is depicted. In brief overview, a client 205, includes the IDS 120, a browser 245, and application 248 and storage 260. In some embodiments, the IDS 120 includes an IDS client 210 having one or more connectors 240 to the browser 245 and/or application 248. The IDS client 210 interfaces to the storage 260 of the client 205 via a cache manager 270 and/or virtual file system 280, or via any type and/or form of suitable interface to the storage 260. In some embodiments, the IDS client 210 runs as a background task, process or service on the client 205.

As shown in FIG. 2, the client 205 also includes a media player 215, which comprises any type and/or form of software, hardware, or combination of software and hardware for experiencing, running, or otherwise playing a media in any form, such as various types and forms of information and data, electronic, digital or otherwise, for conveying information via text, audio, graphics, animation, video and/or interactivity. In some cases, multimedia may also refer to the use of a plurality of media, such as video and audio, for conveying information. Additionally, the media to be played by the media player 215 may be in any form, such as a file, data structure or object in memory, data or information stored on physical media of a storage device 128 or I/O device 130 of a computing device 100, or data signals transmitted or propagated via a network, e.g., streaming media. Further, the type and/or format of the media may comprise a container format such as 3gp, AVI, ASF, Matroska, MOV, MP4, NUT, Ogg, RealMedia, a video codec such as 3ivx, Cinepak, DivX, DV, H.263, H.264/MPEG-4 AVC, HuffYUV, Indeo, MJPEG, MPEG-1, MPEG-2, MPEG-4, RealVideo, Sorenson, Theora, WMV, XviD, and/or audio codecs, such as AAC, AC3, ALAC, AMR, FLAC, MP3, RealAudio, Shorten, Speex, Vorbis, and WMA. In these embodiments, the media player 215 may read and process a media of any type and/or format.

In some embodiments, the media player 215 comprises an application, program, library, script, service, process, task or any other type and/or form of executable instructions. In one embodiment, the media player 215 comprises one of the following: the Windows Media Player manufactured by the Microsoft Corporation of Redmond, Wash., iTunes or Quick-Time manufactured by Apple Computer, Inc. of Cupertino, Calif., RealPlayer® manufactured by RealNetworks, Inc. of Seattle, Wash., or Macromedia Flash Player manufactured by Adobe Systems Incorporated of San Jose, Calif. In other embodiments, the media player 215 comprises any custom, proprietary, open source, shareware, freeware or any other type of application, program or executable instructions capable of playing media, either for a specific purpose or otherwise for an general or desired purposes. Additionally, the media player 215 may comprise any type and/or form of user interface, graphical or otherwise, for accessing, controlling, managing, or otherwise providing input and/or receiving output regarding media and/or the playing of media.

As shown in FIG. 2A, the IDS client 210, in some embodiments, includes a download manager 220, control scripts 225, and a database 227, which may collectively be referred to as a client agent or agent 212. The download manager 220 comprises any software, hardware, or combination of software and hardware for initiating, handling, managing, controlling or otherwise obtaining one or more downloads of content, such as media, from one or more content sources. In some embodiments, the download manager 220 comprises an application, program, library, script, service, process, task or any other type and/or form of executable instructions.

The download manager 220 may communicate via any type and/or form of protocol via any type and/or form of network with one or more computing devices 100. In some embodiments, the download manager 220 communicates via any suitable download protocol. In one embodiment, the download manager 220 communicates via the Hyper Text Transfer Protocol (HTTP) or Secure Hyper Text Transfer Protocol (HTTPS), i.e., HTTP over Secure Socket Layer (SSL). In another embodiment, the download manager 220 communicates via file transfer protocol (FTP), or in further embodiments, in an FTP-like protocol, such as FTPS (FTP over SSL), Secure FTP (FTP over Secure Shell encryption (SSH)), Simple File Transfer Protocol (SFTP), or SSH file transfer protocol (SFTP). In yet other embodiments, the download manager communicates via the transport control protocol (TCP) over the Internet Protocol (IP), and may also use the user datagram protocol (UDP). In one embodiment, the download manager 220 uses a connection-based protocol, such as TCP to communicate via socket-based mechanisms, while in other embodiments, the download manager 220 uses a connectionless protocol. In further embodiments, the protocol may be a stateless protocol, or yet in another embodiment, a stateful protocol. The download manager 220 may include any type and/or form of means and/or mechanisms for tracking or managing states relating to the protocol and/or downloading. Additionally, the download manager 220 may perform any functions, logic or operations to coordinate, track, control, manage or process one or more of the following: 1) requesting a download from a content source, 2) obtaining and/or providing a status of a download, 3) storing content or portions of a download to a client 205, 4) obtaining and/or providing information or characteristics of content, such as media, downloaded or to be downloaded, 5) interactions with a user; and 6) interactions with the client 205, the IDS client 210 or the media player 215.

The database 227 of the IDS client 210 may comprise any type and/or form of suitable structure and arrangement of information and data in a storage or memory element. In one embodiment, the database 227 includes a file or set of files. In some embodiments, the database 227 is a relational database, while in other embodiments, the database 227 is an object based or object-oriented database. In some embodiments, the database 227 is used by the IDS client 210 to store information related to a state or status of a media playing in the application 248, browser 235 or media player 215. In other embodiments, the IDS client 210 or download manager 220 stores information or data relayed to the progress, state or status of one or more downloads. In yet another embodiment, the database 227 stores information and data related to the state, status, and preferences related to any user interface provided by the IDS client 210. In some embodiments, the database 227 stores information and data regarding authentication, authorization and/or access control of one or more users to content in storage 260, such as video media files, by a media player 215.

In some embodiments, control scripts 225 of the IDS client 210 provide directives, commands and/or instructions for controlling, managing, directing or otherwise providing or executing the functions, logic, and operations of the IDS client 210. The control scripts 225 may comprise any type and/or form of suitable scripting language, such as perl, awk, JavaScript or VBScript. In other embodiments, the control scripts 225 may comprise executable instructions in any programming language known to those skilled in the art, interpreted, compiled or otherwise, to interact or interface with the IDS client 205. In one embodiment, the control scripts 225 interact with the IDS client 120 via a control script application programming interface (API), which provides classes, functions and variables representing an interface to the IDS client 120.

In some embodiments, the control scripts 225 provide download orders 235 to the download manager 220. A download order 235 comprises a request, instruction or communication to download media, such as a media file, from a content source to storage 260 of the client 205, such as disk storage. In one embodiment, the download order 235 comprises an instruction in the control script language to request or initiate a download via the download manager 220. In one embodiment, the download order 235 comprises a request of a media file from a single content source. In another embodiment, the download order 235 comprises a request for a media file along with other files and content from a content source. In some embodiments, the download order 235 comprises a request for a plurality of media files from one or more content sources, and may also include request for one or more other types of files, such as a text file or executable file. In a further embodiment, a download order 235 may comprise multiple download orders, such as a series of download orders to occur subsequently or concurrently with each other. The download order 235 may request any number of files, content or other entities from one or more content sources. In some embodiments, the intelligent delivery system 120 may comprise one or more content retrieval queues. For example, the intelligent delivery system 120 may download content, or portions thereof, and store such content in a content retrieval queue for use, management or processing by the download manager 220 or any portion of the IDS 120.

In some embodiments, the download manager 220 via an application programming interface (API) provides the control scripts 225 with the ability to pause, cancel, restart and/or reprioritize download orders 235. Additionally, the control scripts 225 and/or download orders 235 may comprise or refer to delivery strategies or behaviors 230 as will be described in further details below. In one embodiment, a delivery behavior 230 is a technique for downloading content from a content source to the client 205. For example, these techniques include using a certain type of host for a content source (such as a load or content balanced host), the ability to balance download or file transfer load across multiple hosts, and the ability to follow a schedule to only use bandwidth at certain times. For example, a user of the IDS client 210 may want to download a large video file by starting a download via a download client or a peer-to-peer client, such as a BitTorrent peer-to-peer client or a client using the BitTorrent protocol provided or manufactured by BitTorrent, Inc. of San Francisco, Calif. If fours have elapsed without finishing the download, then the download manager 220 should continue downloading over BitTorrent but also download over HTTP from a geographically load-balanced set of hosts, except for a certain time period on Fridays, and if two more hours go by, then the download manager 220 should include a another high-quality content source into the mix of multiple download content sources. As such, delivery behaviors 230 can provide a balance between user experience and delivery costs. In some embodiments, the control scripts 225 and download orders 235 may select from a plurality of delivery techniques provided by the download manager 220. Additionally, control scripts 225 may monitor download orders 235 to determine the status and progress of a download or if any errors have occurred. For example, an API of the download manager 220 may provide an interface, such as a function call or event callback, to provide access to monitoring one or more downloads in progress with the download manager 220.

Although BitTorrent is generally described above as a peer-to-peer technology, client and protocol, any type of peer-to-peer technology, client or protocol may be used in practicing the operations described herein. For example, the intelligent delivery system 120 may use the peer-to-peer technology of Kontiki provided by British Sky Broadcasting Ltd of Isleworth, Middlesex, England. In another example, the intelligent delivery system 120 may use the peer-to-peer technology or client referred to as Red Swoosh provided or manufactured by Red Swoosh, Inc. of San Mateo, Calif.

In some embodiments, a download order 235 identifies a location in storage 260 of the client 205 for storing the requested downloaded content. In other embodiments, the download order 235 allows the IDS client 210 and/or download manager 220 decide the location in storage 260 to store the downloaded content, such as via the cache manager 270 and or virtual file system 280. In one embodiment, the IDS client 210 uses a cache manager 270 for storing downloaded content to the storage 260 of the client 205. In some embodiments, the cache manager 270 may comprise software, hardware, or any combination of software and hardware for storing downloaded content to a portion of storage 260, such as directory file structure 262, under the control and/or management of the cache manager 270. In other embodiments, the cache manager 270 keeps track of storage usage of downloaded content. In some embodiments, the cache manager 270 notifies the IDS client 210 if the amount of usage exceeds a predetermined limit, which may be configurable. The cache manager 270 may calculate a hash code for any portion of downloaded content stored to cache storage. For example, a hash code may be calculated on each file downloaded and stored by the cache manager 270. The cache manager 270 may use any suitable type and/or form of hash algorithm or computation, such as the SHA-1 of the Secure Hash Algorithm family, or the MD5, the Message Digest Algorithm. In one embodiment, the cache manager 270 associates and tracks the hash code with the file.

In some embodiments, the cache manager 270 provides an application programming interface (API) for the file to be retrieved from storage 260 or to find information about the file by referencing the hash code. In one embodiment, the hash code allows the cache manager 270 to determine if a file has been previously downloaded. For example, if an application 248 knows the hash code of a file the application 248 desires to download, the application 248 can request the cache manager 270 to check using the hash code if the file is already stored in the storage 260. Additionally, the cache manager 270 can determine if a duplicate of the file exists in storage 260, e.g., the files have the same hash code, and delete one of the duplicate files.

In some embodiments, the IDS client 210 uses a virtual file system 280 to organize downloaded content into a desired structure, such as a hierarchical naming structure, for example, a directory structure. So, although an application 248 allows the IDS client 210 via the cache manager 270 to determine the location of storing downloaded content to storage 260, the application 248 may desire to reference or arrange the downloaded content via an organized naming structure. For example, the application 248 may want to reference to a downloaded file as "/player/index.html" although the cache manager 270 stored the corresponding file to another location in storage 260. for example, C:/data/user/player/index.html in directory file structure 262. As such, the application 248 may use a desired virtual name meaningful to the application 248 that is different than the name of the file in the directory file structure 262. The VFS 280 may provide this naming ability through an application programming interface (API). The API of the VFS 280 may provide an interface for the creation of virtual directory names and files, and for associating the virtual file names with files stored by the cache manager 270. In some embodiments, the VFS 280 may comprise a user or application level API, while, in other embodiments, the VFS 280 may comprise a kernel or system level API.

In some embodiments, the IDS client 205 stores the virtual naming structure, such as in memory, a data structure or database, and maps the virtual naming structure to the actual naming structure managed or used by the cache manager 270, such as the directory file structure 262. In one embodiment, the VFS 280 provides a virtual naming structure mapped to the directory file structure 262, or portion thereof, of the storage 260. In other embodiments, the VFS 280 provides a virtual naming structure mapped to the portion of storage 260 used by or controlled by the cache manager 270. In some embodiments, the cache manager 270 and the VFS 280 are used together. For example, when a file is downloaded and stored via the cache manager 270, the control scripts 225 provide a virtual file name for the downloaded file. In these embodiments, the cache manager 270 stores the file to storage 260, creates and associates a hash code with the file, and via the virtual file system 280 the virtual file name is associated with the hash code and therefore, the stored file.

The storage 260 of the client 205 may comprise any type and/or form of storage device either locally on the client 205 or accessible via a network by the client 205 for storing content 250, such as content downloaded via the IDS client 210. In some embodiments, the storage 260 of the client 205 comprises any storage device 128, I/O device 130 or installation device 116 of the computing device 100. Additionally, the storage 260 may be provided via a second computing device 100' accessible via a USB, FireWire, network or other suitable connection. In some embodiments, the storage 260 used by the client 205 for storing content 250 may include multiple storage devices on the client 205 and/or accessible via another computing device 100'. In some embodiments, the storage 260 may be one or more elements, such as an object or data structure in memory. In other embodiments, the storage 260 comprises a database. In other embodiments, the storage 260 may be arranged, organized, named, or structured in any desired or suitable manner. For example, the storage 260 may use a directory file structure 262 to store the content 250.

The content 250 downloaded and/or stored with the IDS 120 may comprise media, such as video and/or audio media, and any other types and/or forms of information, data or files. In some embodiments, the content 250 includes electronic or digital forms of elements of a user interface, a web page, or a web site. For example, the content 250 may include graphical images, in any format known to those skilled in the art, such as jpeg, gif, or windows bitmap formats. In other embodiments, the content 250 includes text files, for example, files in a markup language such as Hypertext Markup Language (HTML), or the Extensible Markup Language (XML). In additional embodiments, the content 250 may include executable instructions of a scripting language, such as a control script 225, an executable file, such as .exe file that can execute on the operating system of the computing device 100. In other embodiments, the content 250 may include a manifest providing a list of the files in the content.

In some embodiments, the IDS client 210 comprises a user interface, such as a graphical user interface, for either an end user and/or administrator of the client 210. In other embodiments, the IDS client 210 does not have a user interface for the end user. As such, the application 248 and/or browser 245 connected via the connectors 240 to the IDS client 210 may provide the user interface for the end user. In some embodiments, the IDS client 210 provides content, such as web page files, e.g., HTML file, Dynamic HTML (DHTML), Flash within HTML or JavaScript, to the application 248 and/or browser 245 to display in a user interface. In one embodiment, the files or content 250 allows a user to browse and play downloaded content, such as via the media player 215. In some embodiments, the application 248 is also referred to as a "player" in that the application displays a user interface or provides a user experience, i.e., plays content for a user interface. In a further embodiment, the application or player 248 comprises the media player 215 playing media in addition to providing user interface elements or content. In yet another embodiment, the application 248 runs without a user interface and monitors for downloads.

In other embodiments, the IDS client 210 provides a player window 246 for use by the browser 245 or application 248. In one embodiment, the player window 246 appears similar to a browser displaying HTML pages or other similar type of pages. In another embodiment, the user interface of the application 248 may display the player window 246 including HTML or other web content, but appear to not be a browser-based user interface. For example, the player window 246 displaying content provided via the IDS client 210 may be borderless and/or not have any browser decorations. In other embodiments, the control scripts 225 may open a player window 246, such as one provided by the media player 215, control the placement of the player window 246, set the icon of the player window 246, minimize and maximize the player window 246, and set the contents of the player window 246. In one embodiment, the control scripts 225 set the content of the player window 246 to be a Uniform Resource Locator (URL) to a location available via the Internet. In another embodiment, the control scripts 225 set the content of the player window 246 to be a URL referencing content 250 stored by the cache manager 270, VFS 280, or IDS client 210.

In some embodiments, the IDS 120 provides connectors 240 for interfacing and communicating with the browser 245 and/or application 248. For example, a page displayed by the player window in the browser 245 or application 248 may desire to determine what content 250 has been downloaded, or request the IDS client 210 to download content 250 for a user. In one embodiment, a connector 240 provides a mechanism for pages to sends a string request and receive a string response, such as an HTML web page send and receive mechanisms. In another embodiment, a component 247, such as an ActiveX control or Java Script is provided as an interface or connection mechanism to allow a browser 245 to communicate with the IDS client 210 or to a connector 240. In some embodiments, the connector 240 provides an application programming interface (API) to establish and communicate via a connection to the IDS client 210. The IDS client 210 can receive requests and send replies to the browser 245, component 247 of the browser, or the application 248, and vice-versa. Additionally, the connector 240 may provide notification and call back events via the connection.

In some embodiments, the connector 240 may be any type and form of general purpose interface mechanism used by any type of browser 245 or application 248. In other embodiments, a connector 240 may comprise an interface mechanism designed and constructed for the type of browser 245 or application 248. For example, the connector 240 may be designed and constructed to interface with the Internet Explorer (IE) browser manufactured by the Microsoft Corporation of Redmond, Wash. In another embodiment, the connector 240 may be designed and constructed to interface with a stand-alone application 248 written in any programming language such as C, C++ or C#. For example, the connector 240 may comprises a shared object library used by a stand-alone C program running on a Mac OS operating system. In some embodiments, the application 248 communicates with the IDS client 210 via an interprocess communication mechanism, such as a semaphore or mutex. In some embodiments, the application 248 and/or browser 245 communicates media files and content via one communication channel, while communicating control data and other information via a second communication channel, such as an out of band communication mechanism. In other embodiments, media content and control data are communicated via the same communication channel. The connector 240 may comprise a variety of interface and communication mechanisms for interacting between the browser and/or application and the IDS 120 or IDS client 210.

The IDS 120 may also include a protocol handler 242 to translate Uniform Resource Locators (URL) into a form useable or recognized by the IDS client 210, cache manager 270 or VFS 280. In one embodiment, the protocol handler 242 intercepts URL requests from a browser 245 or application 248 and routes the request directly to the VFS 280. In some embodiments, the protocol handler 242 is part of a connector 240, while, in other embodiments, the protocol handler 242 is a separate interface. In one embodiment, the protocol handler 242 is a component 247 of the browser 247. In some embodiments, the protocol handler 242 is automatically installed with the IDS client 210.

In some embodiments, the VFS 280 and protocol handler 242 allow a web browser 245 to display content downloaded to cache or storage 260 of the client 205. In one embodiment, the protocol handler 242 translates URLs in the form of "<IDS identifier://{appid}){VFS name}" into the appropriate files in storage 260. For example, rather than using a URL of 'http://localhost:8550/vfs/mycontent.html', the browser 245 may use a URL of 'mav-6881:/mycontent.html'. The mav-6881 protocol would be registered by the IDS client 210 to obtain the content from the client 210 instead of an HTTP server. As such, the protocol handler 242 translates and routes the URL of 'mav-6881:/mycontent.html' to the corresponding content 250 via the VFS 280. As such, using a URL recognize by the protocol handler 242, a browser 245 can read an HTML page downloaded in content 250 to the storage 260 and present the downloaded page via a familiar browser experience. Additionally, any references on the downloaded page to other elements of content 250 in storage 260, such as images, videos or audio files, or other web page, will also be translated and used by the browser 245. In one embodiment, the browser 245 or application 248 provides a user interface via the use of the protocol handler 242 and the VFS 280 translating to user interface content stored in storage 260.

Although the IDS 120 may be generally described using a file as a unit of download for media and other content 250, the unit of download may comprise any portion of content 250 in any form or granularity. So, although a file may be used as the unit of download, one ordinarily skilled in the art while reading the description of this specification shall also include files to identify, mean, or otherwise refer to any unit of download. In some embodiments, a unit of download comprises any portion of a file, such as a segment of a file or a byte range of a sequence of bytes. In one embodiment, a unit of download comprises a group of one or more files. In another embodiment, the group of one or more files may be compressed into a single file using any type and/or form of compression. In a further embodiment, the unit of download comprises a group of portions of one or more files, such as a group of segments from multiple files. In other embodiments, a unit of download may comprise one or more network packets carrying or representing content 250. In one embodiment, the unit of download comprise any portion of signals representing the content 250 and propagating or traversing any suitable transmission medium. In additional embodiments, a unit of download may comprise a portion of a data structure, an object or a set of one or more areas in memory or storage.

Figure 2B:
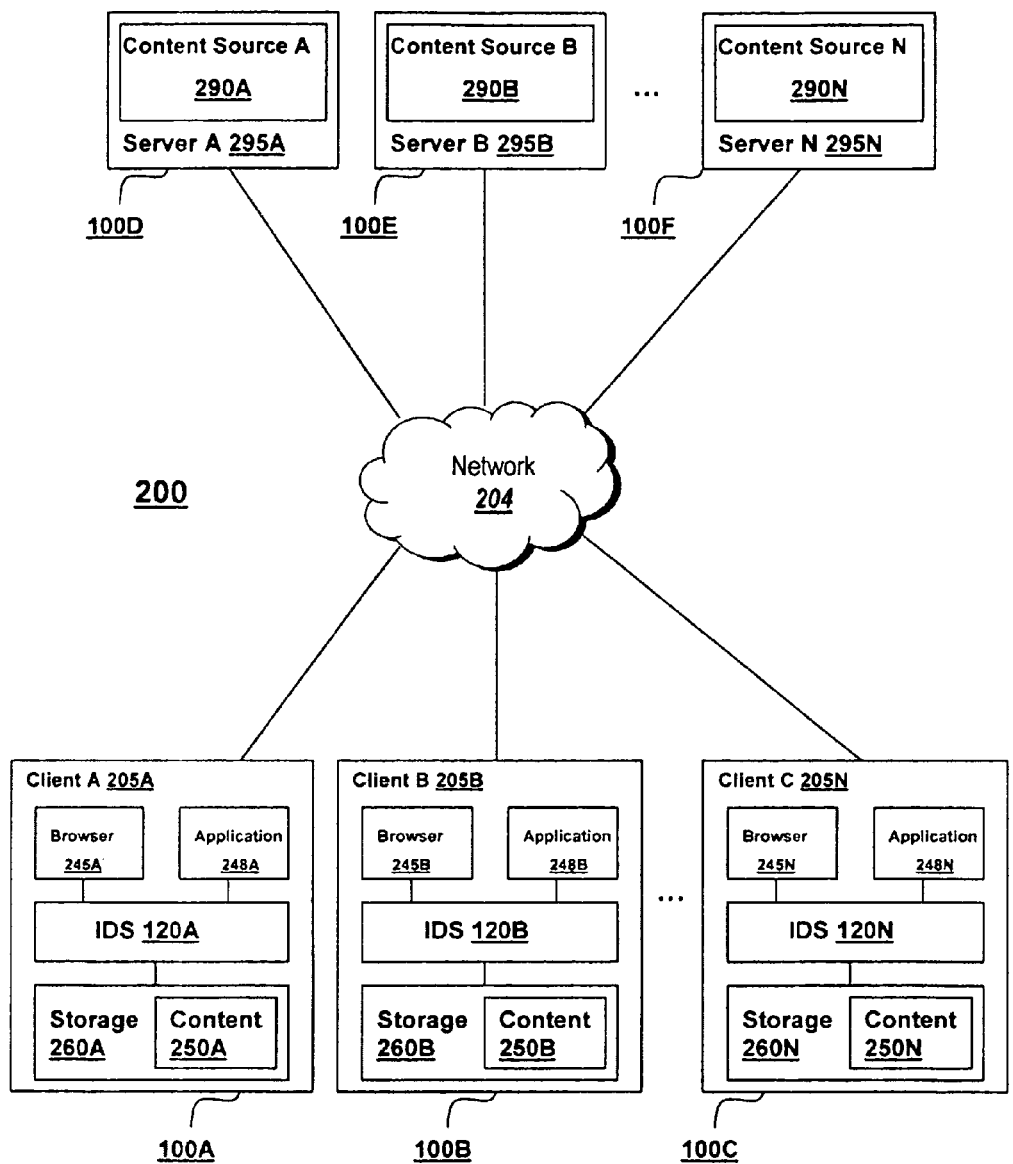
FIG. 2B is a block diagram of an illustrative network environment for practicing an embodiment of the intelligent delivery client system.

Referring now to FIG. 2B, the IDS 120 is depicted in a networked environment 200. In brief overview of the environment 200, clients 205A-205N provided via computing device 100a-100C are in communication via a network 204 with one or more content sources 290A-290N, referred to as Source Content A, Source Content B, and Source Content N provided via computing devices 100D-100F, referred to as Server A 295A, Server B 295B and Server N 295N respectively. Each of the servers 295A-295N may comprise a content source 290A-290N, also referred to as source content herein, providing content available for downloading. Each of the clients 205A-205N may comprise an IDS 120 for downloading content from a content source 290A-290N to provide local content 250A in a storage 260A-260N of the client 205A-205N.

Although FIG. 2B shows a network 204 between the clients 205A-205N and the servers 295A-N, there may be additional networks, e.g., 204', 204" between the clients 205A-205N and the servers 295A-N. A client 205 and server 295 may be on the same network 204 or on a different network 204'. The networks 204 and 204' can be the same type of network or different types of networks. The network 204 and/or the network 204' can be a local-area network (LAN), such as a company Intranet, a metropolitan area network (MAN), or a wide area network (WAN), such as the Internet or the World Wide Web. The topology of the network 204 and 204' may be a bus, star, or ring network topology. The network 204 and network topology may be of any such network or network topology capable of supporting the operations described herein.

The clients 205A-205N and servers 295A-295N can connect to the one or more networks 204, 204' through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), and wireless connections or any combination thereof. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, and direct asynchronous connections). In one embodiment, a client 205 and the server 295 communicate via any type and/or form of gateway or tunneling protocol such as Secure Socket Layer (SSL) or Transport Layer Security (TLS). Additionally, the clients 205A-205N and servers 295A-295N may communicate via any type and/or form of protocol to request and provide a download from the content source 295A-295N to a client 205A-205N. In one embodiment, the clients 205A-205N and servers 295A-295N may communicate via any type, form or version of a Hyper Text Transfer Protocol, a File Transfer Protocol, or a download protocol.

The network 204 and network connections may include any transmission medium between any of the computing devices 100A-100N such as electrical wiring or cabling, fiber optics, electromagnetic radiation or via any other form of transmission medium capable of supporting the operations described herein. The methods and systems described herein may also be embodied in the form of, or otherwise include, computer data signals, program code, or any other type of transmission that is transmitted over the transmission medium, or via any other form of transmission, which may be received, loaded into, and executed, or otherwise processed and used by a computing device 100 to practice the operations described herein.

The servers 295A-295N may be any type of computing device 100D-100F capable of operating as described herein. Furthermore, any server 295A-295N may be provided as a group of server systems logically acting as a single server system, referred to herein as a server farm. In one embodiment, a server 295A-295N comprises a multi-user server system supporting multiple concurrently active client connections or user sessions. In some embodiments, one or more servers 295A-295N act as or provide a proxy or gateway to one or more other servers 295A-295N. In other embodiments, a server 295A-295N comprises a load-balancer as known to those skilled in the art for balancing loads between multiple servers 295A-295N in a server farm. In some embodiments, the client 205, intelligent delivery system 120, one or more servers 295A-295N, or otherwise the network 204 may use or deploy a content server location and capacity loading device, software, or service for identifying, selecting, using or otherwise providing one or more content sources 290A-290N. In one embodiment, the client 205, intelligent delivery system 120, servers 295A-295N, and/or the network 204 may use any of the products, technologies services, and/or network devices provided or manufactured by Akamai Technologies, Inc. of Cambridge, Mass.

Additionally, any server 295A-295N may cache content 290A-290N from another server. In one embodiment, a server 295A-295N may comprise a peer-to-peer technology or application, such as a client using the BitTorrent protocol provided by BitTorrent, Inc. of San Francisco, Calif. A server 295A-295N may be a client 205 computing device or a peer computing device on the network 204. Furthermore, a server 295A-295N may comprise any of the following: 1) a load-balanced host, 2) a content-balanced host, 3) a peer-to-peer file transfer host, 4) inhouse or intranet proxy or 5) a geographic proxy. In some embodiments, neighborcasting describes a client broadcasting on a network, such as a local network or LAN, to see if another client has identified or desired content. The client may request or obtain the content from another client on the local network instead of a content server 290A-290N. In other embodiments, a server 295A-295N may transmit content via a satellite transmission or medium.

Although each client 205A-205N is illustrated with one IDS environment 120, each client 205A-205N may have a plurality of IDS environments 120. In one embodiment, a client 205A-205N may have one IDS environment 120 but multiple IDS clients 210. Additionally, each client 205A-205N may have multiple storages 260A-260N for storing content 250A-250N for one or more IDS environments 120 or one or more IDS clients 210. One client 205A-205N may communicate with and receive a download of content 295 from one server 295A in one embodiment, or from a plurality of servers 295A-295N in another embodiment. Furthermore, each client 205A-205N may be in communication via the network 204 with another client 205A-205N to obtain, share or provide content 250A-250N.

Each of the computing devices 100A-100N may be configured to and capable of running any portion of the IDS environment 120. The IDS environment 120 and/or any portion thereof, such as the IDS client 210, cache manager 270, media player 215, download manager 220, and VFS 280 can be capable of and configured to operate on the operating system that may be running on any of the computing devices 100A-100N. Each computing device 100A-100N can be running the same or different operating systems. Additionally, any portion of the IDS environment 120 can be capable of and configured to operate on and take advantage of different processors of any of the computing devices 100A-100N. One ordinarily skilled in the art will recognize the various combinations of operating systems and processors that can be running on any of the computing devices.

Although the IDS environment 120 is generally illustrated as operating on a client 205A-205N, portions of the IDS 120 may be practiced in a client/server architecture or in a distributed manner in the network environment 200. For example, the IDS environment 120 can be capable of and configured to have a first portion of the IDS environment 120 run on a first computing device, e.g., client 205A, and a second portion of the IDS environment run on a second computing device, e.g., server 295A. In one embodiment, the download manager 220 may have a first portion running on the client 205A and a second portion 220' running on the server 295A. In some embodiments, the IDS environment 120 may be capable of and configured to execute with a client portion and a server portion in a client/server architecture, or with portions distributed across computing devices in a distributed architecture.

Figure 3A:
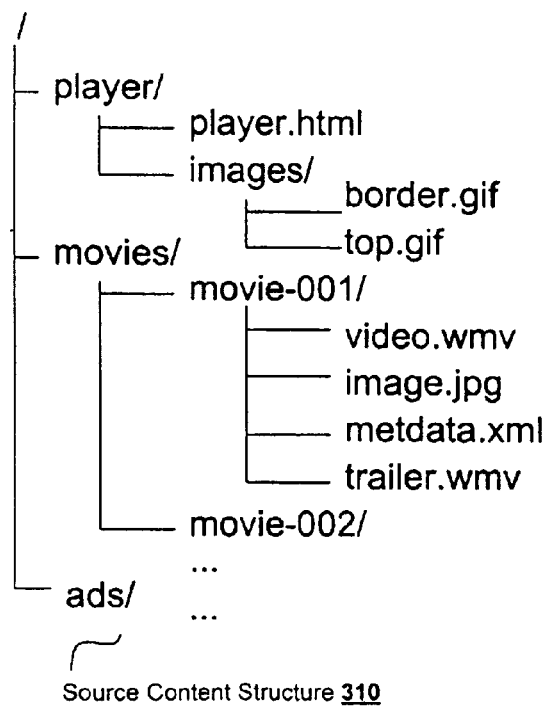
FIG. 3A is a diagrammatic view of an embodiment of content structure for source content.
Figure 3B:
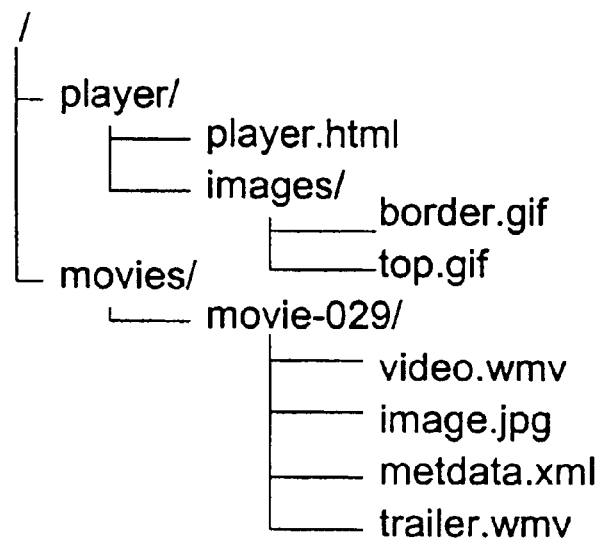
FIG. 3B is a diagrammatic view of an embodiment of content structure for local content.
Figure 3C:
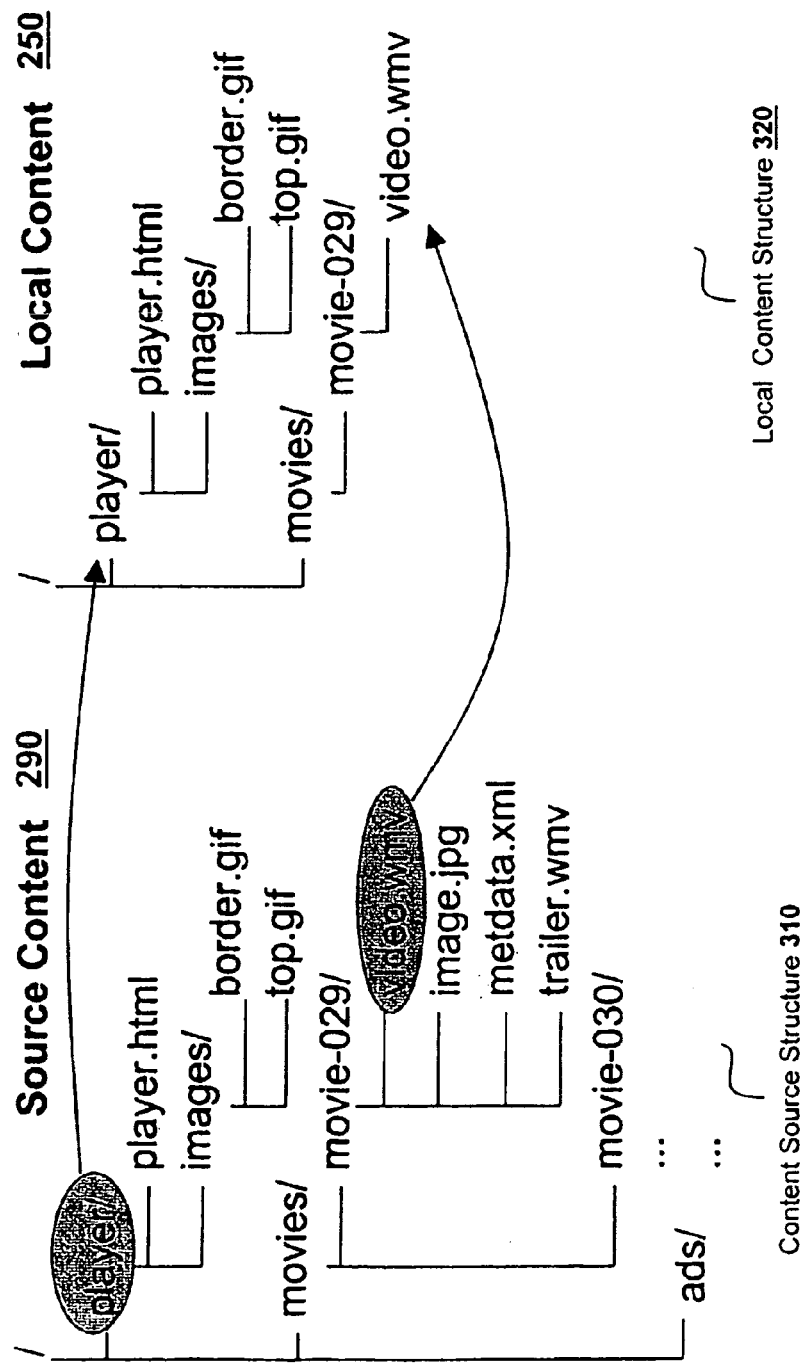
FIG. 3C is a diagrammatic view of an embodiment of content structure in using a download order to download from the source content to the local content.
Figure 3D:
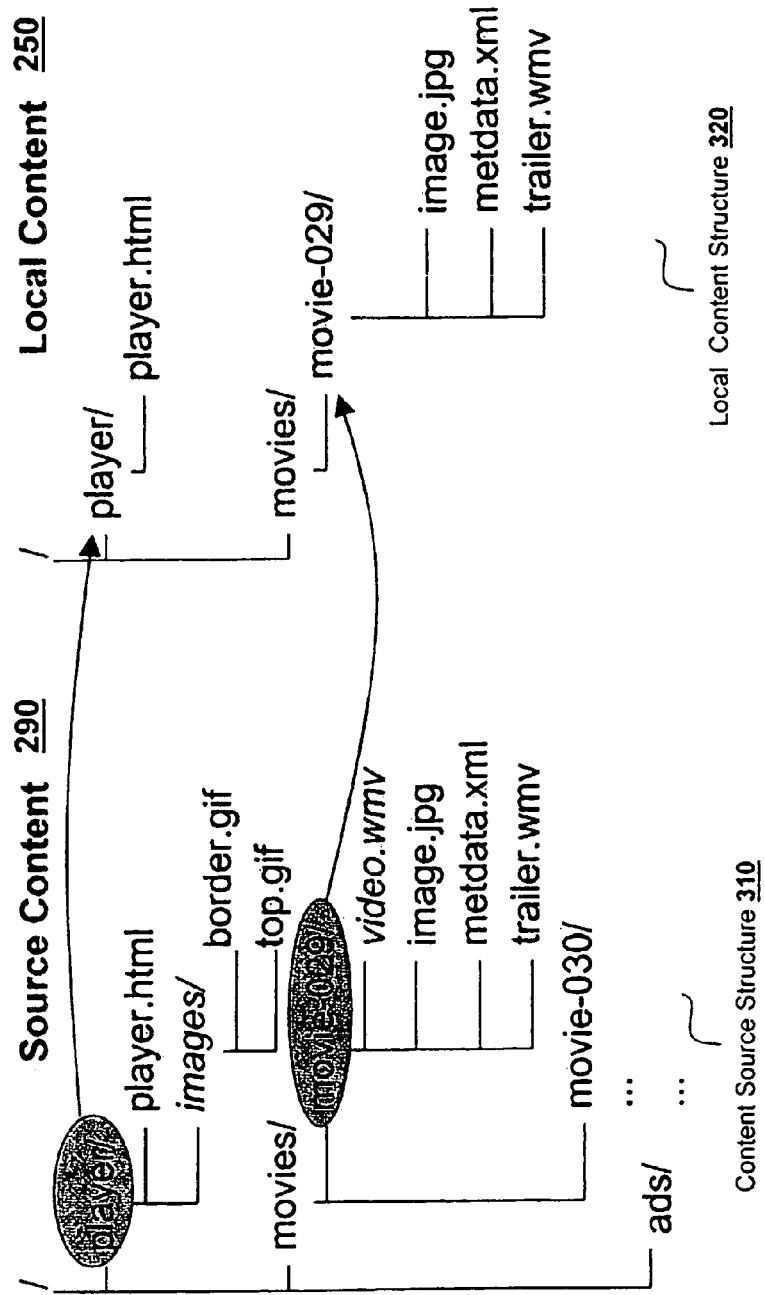
FIG. 3D is another diagrammatic view of another embodiment of content structure to download from the source content to the local.
Figure 3E:
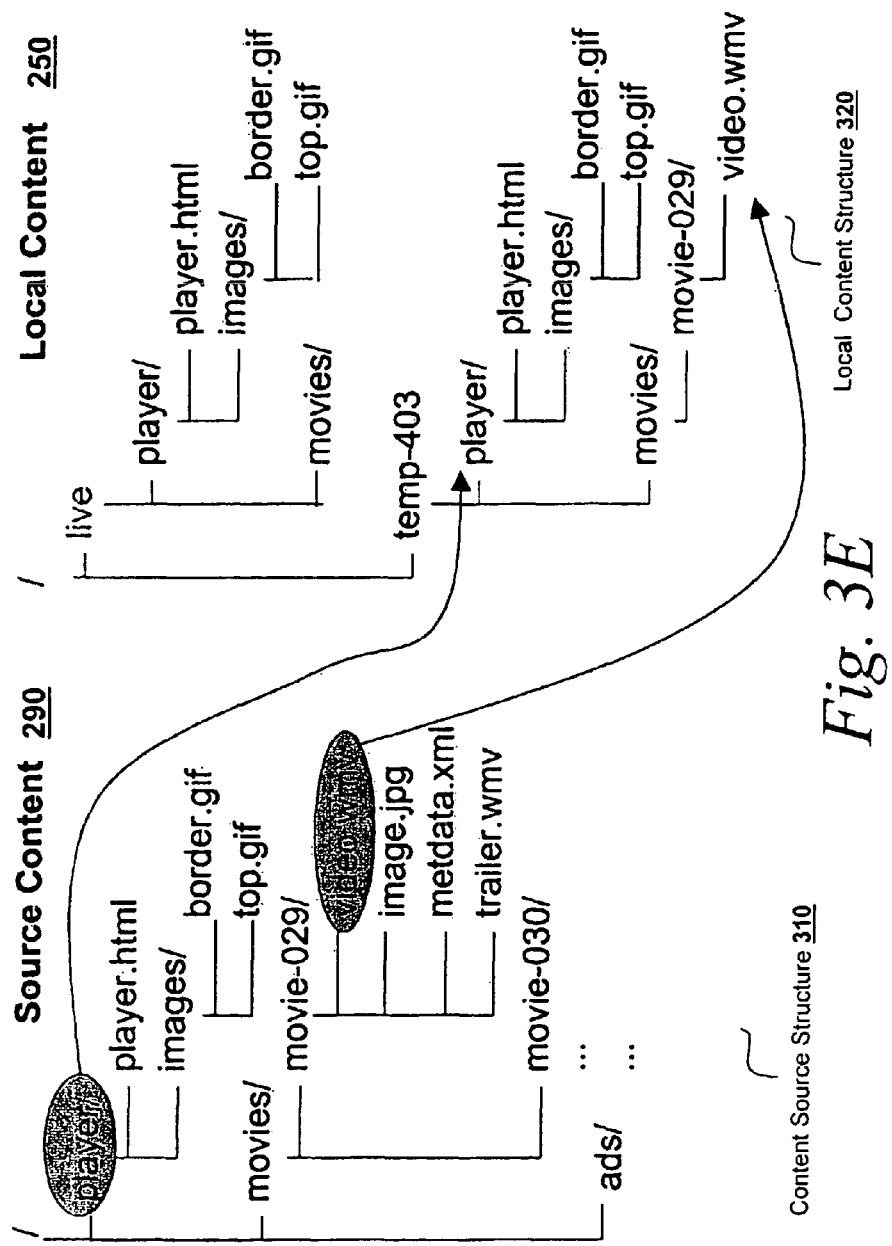
FIG. 3E is a diagrammatic view of an embodiment of content structure in using temporary directory structure with a download order to download from the source content to the local content.
Figure 3F:
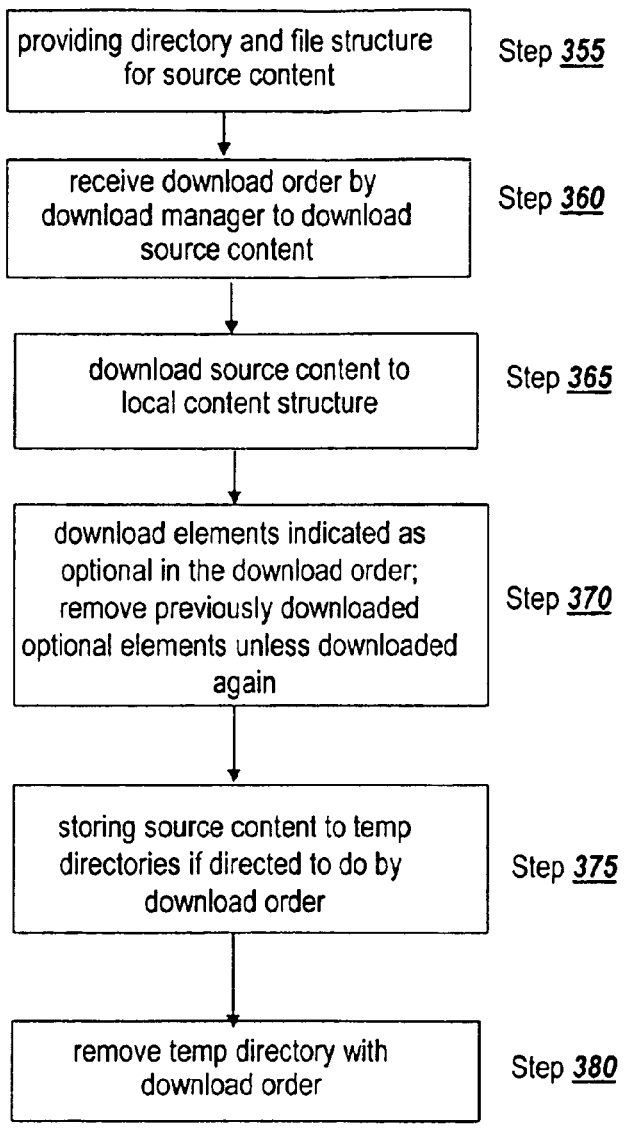
FIG. 3F is a flow diagram of steps performed in practicing an embodiment of downloading content with download orders.

In another embodiment, the IDS 120 uses techniques for downloading content from a content source 290 and storing the downloaded content to storage 260 of a client to provide a local content 250. Referring now to FIGS. 3A-3F, these downloading and storing techniques of will be described. In brief overview, FIG. 3A depicts a source content structure 310 of a source content 290, and FIG. 3B depicts a local content structure 310 for local content 250. FIG. 3C depicts an example download from a source content 290 to a local content 250, and FIG. 3D depicts example download with optional elements from a source content 290 to local content 250. FIG. 3E illustrates the user of temporary storage for downloading source content 290 to local content 250. FIG. 3F depicts an embodiment of method 350 for downloading source content 290 to local content 250 via download orders 235. In brief overview of method 350, at step 355, source content 290 is provided via a directory and file structure. At step 360, the download manager 220 receives a download order 235 requesting to download source content 290, such as a portion of content, and at step 365, the download manager 220 downloads the source content 290, or any portion thereof, to local content structure 310 to form the local content 250. At step 270, if any elements of the download are identified as optional by the download order, then preserving the optional elements in the local content structure 310. If an optional element was previously downloaded, the method 350 may remove the previously downloaded optional element unless downloaded again at step 365. At step 375, the download manager 220 stores the source content 290 to a temporary directory if directed to so by the download order 235, and at step 380, the temporary directory may be removed after completing the download order 235.

In view of FIGS. 3A-3E, the method 350 will be described in further detail. At step 355, the source content 290 is provided via a source content structure 310, such as the source content structure depicted in FIG. 3A. The source content structure 310 may be any form of one or more directories and one or more files organized or placed in a desired arrangement. In some embodiments, the name of a directory or a file may identify, refer to or be associated with the type of content 290. For example, media player 215 related source content 290 may be stored under a directory named 'player' and movie videos related source content 290 may be stored in a directory names 'movies.' In some embodiments, the source content structure 290 may span directories of one or more storage devices of the server 295A-295N or directories that span across multiple servers 295A-295N. In some embodiments, one or more content sources 290A-290N may have the same source content structure 310, while, in other embodiments, different source content structure 310.

In further embodiments, the source content structure 310 represents or models an abstract directory structure. That is, in some embodiments, the directories and files of the source content structure 310 may not be stored in the same arrangement or with the same names on any of the servers 295A-295N. As such, the source content structure 310 may provide a mapping of the download content 290A into a desired arrangement or organization. In some embodiments, the source content structure 310 maps to a structure or naming scheme of any content management system. Also, the scale of the number of directories and files of the source content structure 310 may not be limited and may comprise millions or more directories and files.

At step 360 of method 350, the IDS client 210 or download manager 220 receives a download order 235 requesting a download of the source content 290 to the client 205. In some embodiments, the download order 235 is communicate to the IDS client 210 or download manager 220 via a user's interaction with elements of a user interface, such as from content 250 provided via a browser 245 or an application 248. For example, a user may request via an element or link of web page to download one or more portions of the source content 290, such as a high definition video. In some embodiments, the control scripts 225 provide the download order 235 to the download manager 220. For example, the logic, function or operation of a control script 225 may communicate the download order 235 to the download manager 220 or otherwise trigger the download request. In some embodiments, the download manager 220 reads or otherwise obtains, for example, via a polling mechanism the download order 235. For example, a user may create a download order 235 via an editing tool or user interface of the browser 245 or application 248 and stored the download order 235 into a directory accessed by the download manager 220. In further embodiments, a download order 235 may be a communication of a request to download, for example, via an API call, to the download manager 220.

At step 365, the download manager 220, in response to the download order 235, initiates and executes a download of the source content 290 identified or referred to by the download order 235. In some embodiments, the download manager 220 downloads from one content source 290A while in other embodiments, from multiple content sources 290A-290N. In one embodiment, the download order 235 identifies a single file obtainable from one content source 290A or from multiple content sources 290A-290N. In other embodiments, the download order 235 identifies multiple files from one or more content sources 290A-290N. Various combinations of quantity of files and content sources may be used in practicing this method.

Further to step 365, the download manager 220 stores the downloaded source content 290 to a local content structure 320, such as the local content structure of FIG. 3B, to form or otherwise provide the local content 250 of the client 205. As with the source content structure 310, the local content structure 320 may be any form of one or more directories and one or more files organized or placed in a desired arrangement. In some embodiments, the name of a directory or a file may identify, refer to or be associated with the type of content 250. In one embodiment, the local content structure 320 matches or is substantially similar to at least a portion of the source content structure 310.

In some embodiments, the local content structure 320 is a subset of the source content structure 310. In another embodiment, the directory and file names of the source content structure are preserved or remain the same in the local content structure 320. In some embodiments, the local content structure 320 is a directory file structure 262 as it exists in storage 260 of the client 205. In other embodiments, the local content structure 320 is an abstraction or mapping to the source content structure 310, such that each directory and file name of the source content structure 310 maps to the same or a different name in the local content structure 320. For example, the local content structure 320 may comprise a directory and file name provided via the VFS 280 or cache manager 270.

By way of example and referring to FIG. 3C, the download manager 220 may download the directory named 'player' and all sub-directories and files from the source content 290 and store the content to the local content structure 32. Additionally, the video file named 'video.wmv' may be downloaded to a corresponding directory and file name in the local content structure 320. In some embodiments, the download manager 220 stores download content for a download order 235 to the local content structure 320 as it is received. In other embodiments, the download manager 220 holds the downloaded content in memory until the download order 235 is completed and then stored the downloaded content to the local content structure 310. In additional embodiments, the download manager 220 stores some content to the local content structure 320 as it is received and holds other content in memory until another portion of content is received or the download order 235 is completed.

In some embodiments of method 350, at step 370, one or more download elements are identified as optional, such as via the download order 235 or via the source content structure 310. For example, as depicted in FIG. 3D, the directory named 'images' may be tagged as optional along with the file named 'video.wmv'. Optional elements may affect the download of directories and files. An optional directory or file is tagged as part of the content 290, and in some embodiments, not the download order 235. The download manager 220 may be requested to download the 'player' directory of the source content 290 to a corresponding directory of the local content 250 of the same name, and likewise for the directory names 'movie-029' as illustrated in FIG. 3D. Accordingly, the download manager 220 may download the portions of content of the directories 'player' and 'movie-029' not tagged as optional without downloading the optional elements. As such, in some embodiments, the optional 'images' directory of the source content structure 310 is not downloaded to the local content structure 310 and likewise for the file 'video.wmv'.

In one embodiment, the download order 235 requests the download of optional elements, and as such, the download manager 220 also downloads the optional elements. In another embodiment, the download manager 220 removes optional elements from the local content structure 320 on the next or subsequent download order 235 if the next download order 235 does not request the optional elements. In other embodiments, the download manager 220 leaves optional elements in the local content structure 320 intact if not requested in a subsequent download order 235. In an additional embodiment, the download manager 220 may move the optional elements stored in the local content structure 320 to another directory, such as a temporary directory, if the optional elements are not requested for download in a next or subsequent download order 235.

At step 375, in some embodiments of the method 350, the download order 235 requests the download manager 220 to download source content 290 to a temporary directory structure. For example, this may be requested to isolate downloads from a "live" local content structure 320 being accessed or used by the media player 215 for playing content or by a browser 245 or application 248 to provide a user interface. By way of example and referring to FIG. 3E, the 'player' directory and 'video.wmv' file of the source content 290 may be downloaded and stored in corresponding directories and file names of the 'temp-403' directory of the local content structure 320. The 'live' directory structure represents the content currently be used, accessed or displayed by an application, browser or user of the client 205. Additionally, the source content 290 downloaded to a temporary directory can be inspected or examined during or after the download. In one embodiment, the content directed to storage in a temporary directory is an updated copy or version of content accessed via the 'live' directory of the local content structure 320.

In some embodiments, at step 380, the content stored in the temporary directory, such as 'temp-403' depicted in FIG. 3E, is copied, moved, placed or stored into the corresponding directories of the 'live' directory structure, and then the temporary directory is removed. In one embodiment, the content of the temporary directory is inspected or examined to determine the portions of content to copy or move to the live directory of the local content structure 320. In some embodiments, none of the content from the temporary directory is moved to the live directory. For example, the IDS client 210 may determine the files downloaded to the temporary directory are the same as the corresponding files in the live directory. In other embodiments, a portion of the content from the temporary directory is moved to the live directory, for example, one or more files have changed or been updated. As such, at step 380, the temporary directory when deleted may contain no files, a portion of the files, or all the files of the downloaded content.

In another embodiment, the IDS 120 performs a "flipping" technique for downloading content to a temporary directory and replacing the content in the live directory of a local content structure 320 with the content from the temporary directory. The flipping technique provides a means and mechanisms for atomically replacing directories and files in a live directory with directories and files from a temporary directory. For example, the live directory may currently have one or more files in use, such as a media file played by a media player 215. While the file from the live directory is being used, the download manager 220 in response to a download order 235 may download content to a temporary directory to avoid or prevent disruption or interruption of the use of the file in the live directory. Then at an appropriate time, for example, upon completion of the download or when no files are in use from the live directory, the content from the temporary directory is "flipped", i.e. to the live directory to replace the previous contents, or portions thereof, with new downloaded content.

Figure 4A:
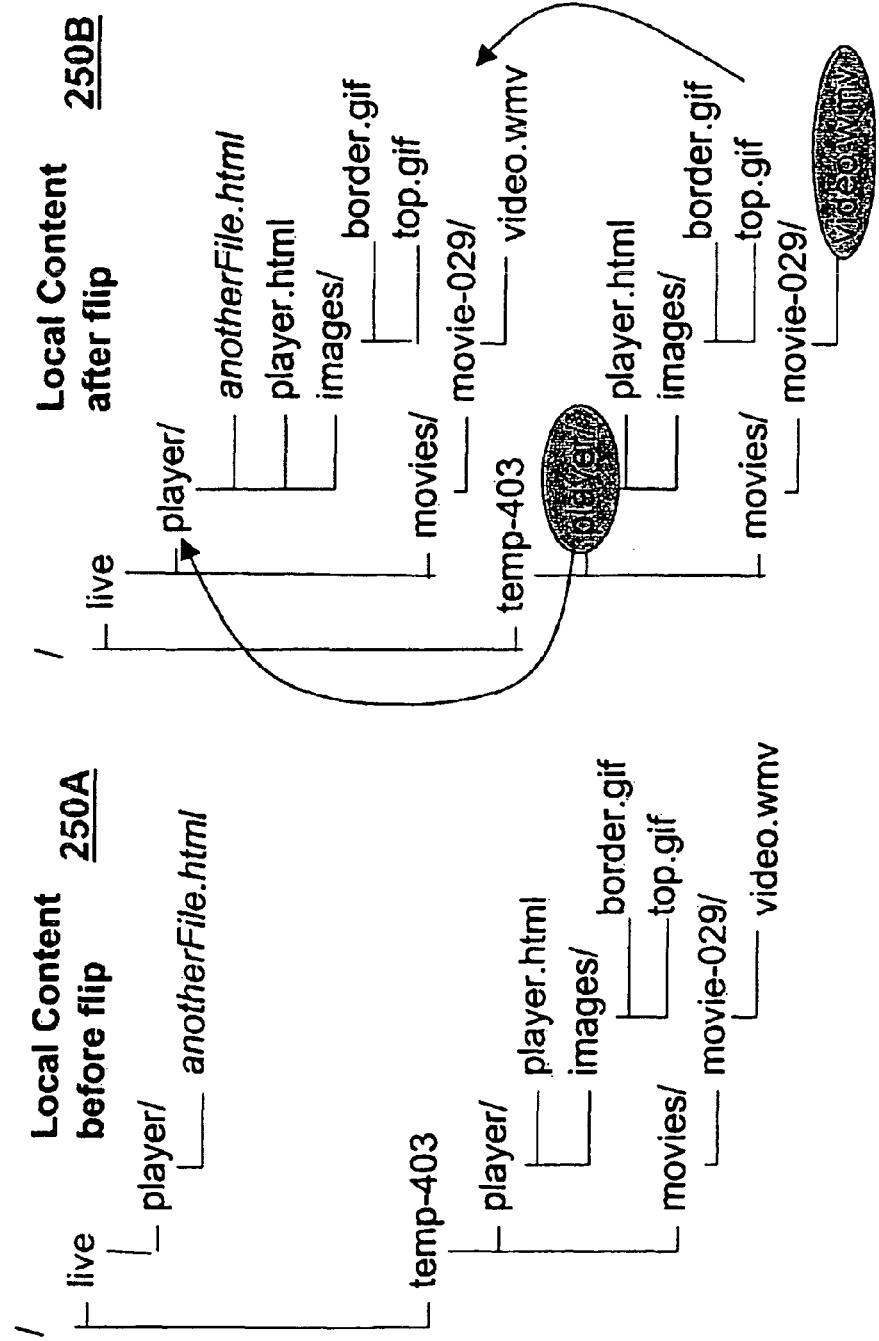
FIG. 4A is a diagrammatic view of an embodiment of local content structure updated according to an embodiment of the flipping technique depicted in FIG. 4B.
Figure 4B:
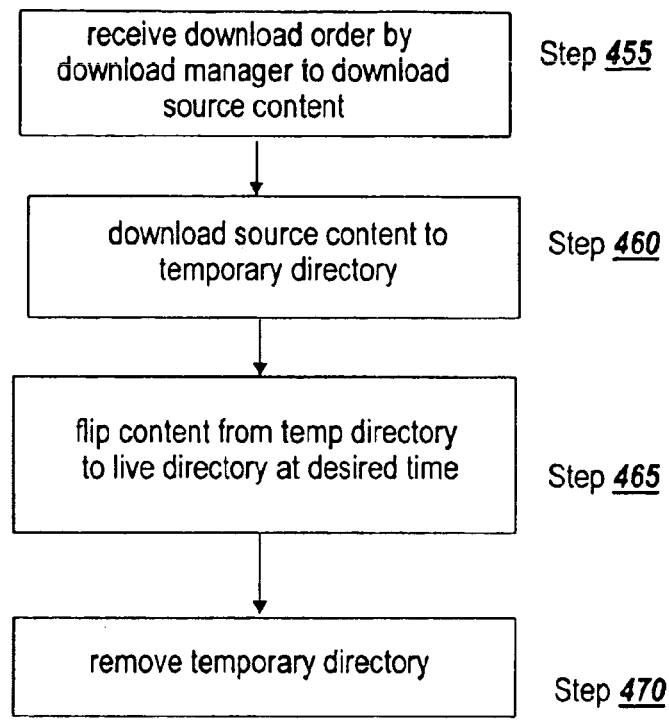
FIG. 4B is a flow diagram of steps performed for practicing an embodiment of a flipping technique.

Referring now to FIGS. 4A and 4B, the flipping technique is depicted. FIG. 4A depicts a local content 250A before a "flip" and the local content 250B after the "flip". FIG. 4B depicts the steps performed in method 450 for practicing an embodiments of the flipping technique. In brief overview of method 450, at step 455, the download manager 455 receives a download order 235 to download source content 290 to the client 205. At step 460, the source content 290 is downloaded by the download manager 220 to a temporary directory in a local content structure 320. At step 465, the content in the temporary directory is "flipped" to the live directory of the local content structure 320, such as after the download order 325 is completed. At step 470, the temporary directory structure and any remaining content thereof may be removed.

In view of FIG. 4A and in further detail of method 450, at step 455, the download order 235 received by the download manager 220 may direct the download manager 220 to store the downloaded content to the temporary directory, such as the 'temp-403' directory of the local content 250A. In other embodiments, the download manager 220 may determine to store the downloaded content to the temporary directory based on a status of a file in the live directory structure of the local content structure. In some embodiments, the download manager 220 determines that the file is currently being used or accessed by a process, task or program on the client 205, such as the media player 215, browser 245 or application 248. In other embodiments, the download manager 220 determines a file in the live directory may be used based on the running of a process, service or task on the client 205 or based on a request from a user on the client. In other embodiments, the download manager 220 downloads to the temporary directory for every download order 220 by default or when the download order 220 does not specific a directory.

At step 460, the download manager 220 stores the downloaded content to the temporary directory. In some embodiments, the download order 235 requests the download of a subset of the source content 290. For example, the live directory of the local content 250A in FIG. 4A may have a 'player' directory containing a file name 'anotherFile.html'. The download manager 220 may download to the 'temp-403' directory the directories 'player' and 'movies' with subdirectories and files as illustrated in the local content 250A of FIG. 4B. As such, the local content 250A in FIG. 4B represents the local content structure 320 after the content has been downloaded but not yet moved to the live directory. In this manner and in some embodiments, the downloaded content is isolated from the live directory until a suitable or desired time to replace the content in the live directory.

At step 465 of method 450, the downloaded content in the temporary structure is moved, copied, or otherwise placed, i.e., "flipped" into the live directory tree of the local content structure. The downloaded content may be moved to the live directory tree by the download manager 220, IDS client 210, or cache manager 220. In some embodiments, the content of the live directory tree is first removed, and then the content from the temporary directory tree is moved or copied into the live directory tree. In other embodiments, the content of the live directory tree is overwritten with the content from the temporary directory. In another embodiment, the content from the temporary directory is added to the content of the live directory. In some embodiments, any intermediate directories and/or files in the live content not affected by the downloaded content or the download order 235 are ignored.

In yet further embodiments, some portions of the live directory tree are removed while other portions are overwritten, and yet in other embodiments, portions of content from the temporary directory are added to the live directory. In one embodiment, portions of the live directory are modified with content from the temporary directory. In another embodiment, the IDS client 120 uses the VFS 280 to move or copy content from the temporary directory to the live directory. In yet another embodiment, the live directory is moved or copied to another directory, such as a backup directory and the temporary directory contents are used to replace the live directory. Those ordinarily skilled in the art will recognize and appreciate the various combinations of additions, modifications, deletions, overwrites, replacements, copying or moving of content from the temporary directory, or any portions thereof, to form, change, update or otherwise provide the content in the live directory, or any portions thereof.

Further to step 465, the IDS client 210 may move or copy the content from the temporary directory to the live directory at any desired time. In one embodiment, the content is moved or copied from the temporary directory to the live directory upon completion of the download or the download order 235.

In another embodiment, the content is moved or copied from the temporary directory upon request by a user, such as via a user interface of the browser 245 or application 248. In some embodiments, the content is moved or copied from the temporary directory upon detection that none of the content in the live directory to be updated by the downloaded content is currently in use or being accessed. In other embodiments, portions of content from the temporary directory may be moved or copied to the live directory while portions of the live directory not affected by the move or copy are in use. In yet other cases, the content from the temporary directory is moved or copied to the live directory regardless if any portion of the content in the live directory is being used. The "flipping" technique may be practiced at any desired, suitable or appropriate time to update, change or provide the content for the live directory.

In some embodiments of method 450, at step 470, the temporary directory, and any downloaded content therein, is removed from the temporary directory after moving or copying the content to the live directory. In some embodiments, only the temporary directory exists without any content as the content was moved to the live directory. In another embodiment, the temporary directory has the downloaded content as the content was copied to the live directory. In further embodiments, the temporary directory has some portions of the downloaded content remaining as some portions of the downloaded content was moved to the live directory while other portions were copied. In some embodiments, the method 450 does not remove the temporary directory. In other embodiments, the temporary directory and/or contents of the temporary directory are moved to another directory, such as a directory designated as a backup.

Although the live directory is depicted in FIG. 4A with the name 'live' and the temporary directory is depicted with a name having the term 'temp', those ordinarily skilled in the art will recognize and appreciate that any name may be given to or associated with a live directory and likewise, with a temporary directory, in practicing the operations described herein. As such, the live directory is any directory structure in the local content structure 320 of local content 250 identified or designated for providing content for use and interaction by a user of the IDS client 210, browser 245 or application 248 of the client 205. Accordingly, the temporary directory is any directory structure in the local content structure 320 of local content 250 identified or designated for transient, background or temporary use in practicing the operations described herein.

In some embodiments, the IDS 120 stores downloaded content in storage 260 of the client 205 via the cache manager 270 and/or virtual file system (VFS) 280. In these embodiments, the downloaded files are stored in a "hash cache" or cache storage which maps hash values or codes of the file contents to actual named files in storage 260. Files in the hash cache may be stored in a disk structure, such as a virtual directory structure of the VFS 280, which may not represent the local content structure 320. In some cases, the VFS 280 provides for mapping of the names in the local content structure 320 to hash values, and the hash values to the actual names of the downloaded files in storage 260.

Figure 5A:
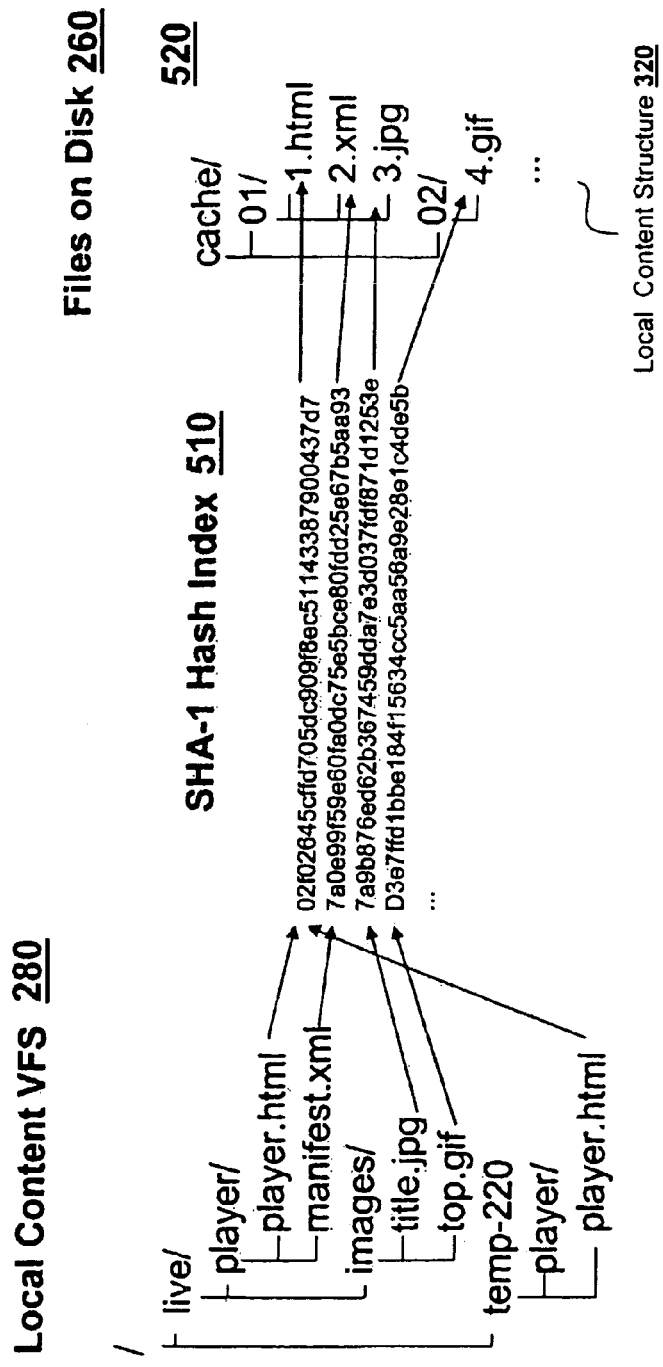
FIG. 5A is a diagrammatic view of an embodiment of a hashing and virtual file system of local content structure.
Figure 5B:
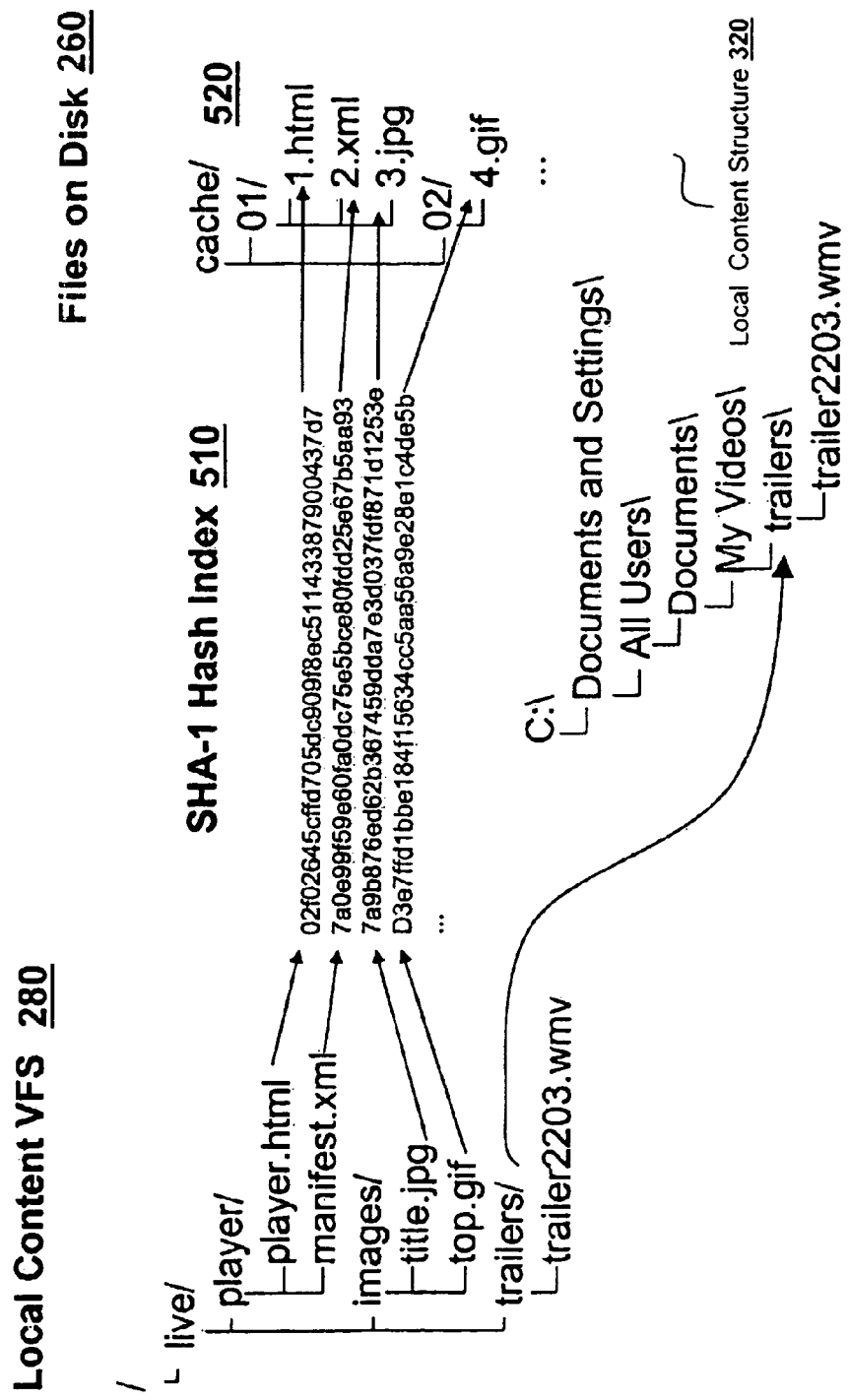
FIG. 5B is a diagrammatic view of another embodiment of a hashing and virtual file system of local content structure.
Figure 5C:
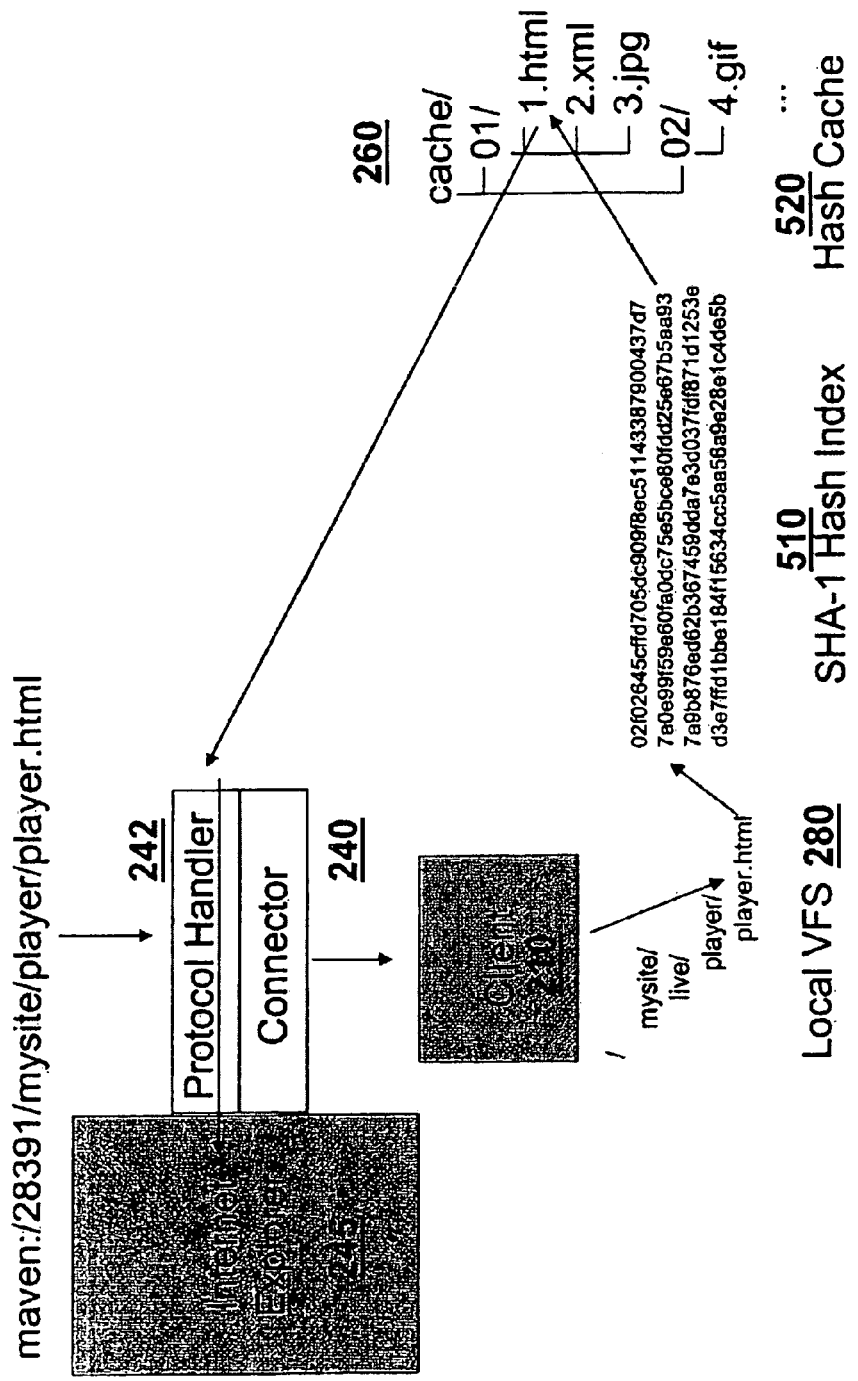
FIG. 5C is a diagrammatic view of yet another embodiment of a hashing and virtual file system of local content structure.
Figure 5D:
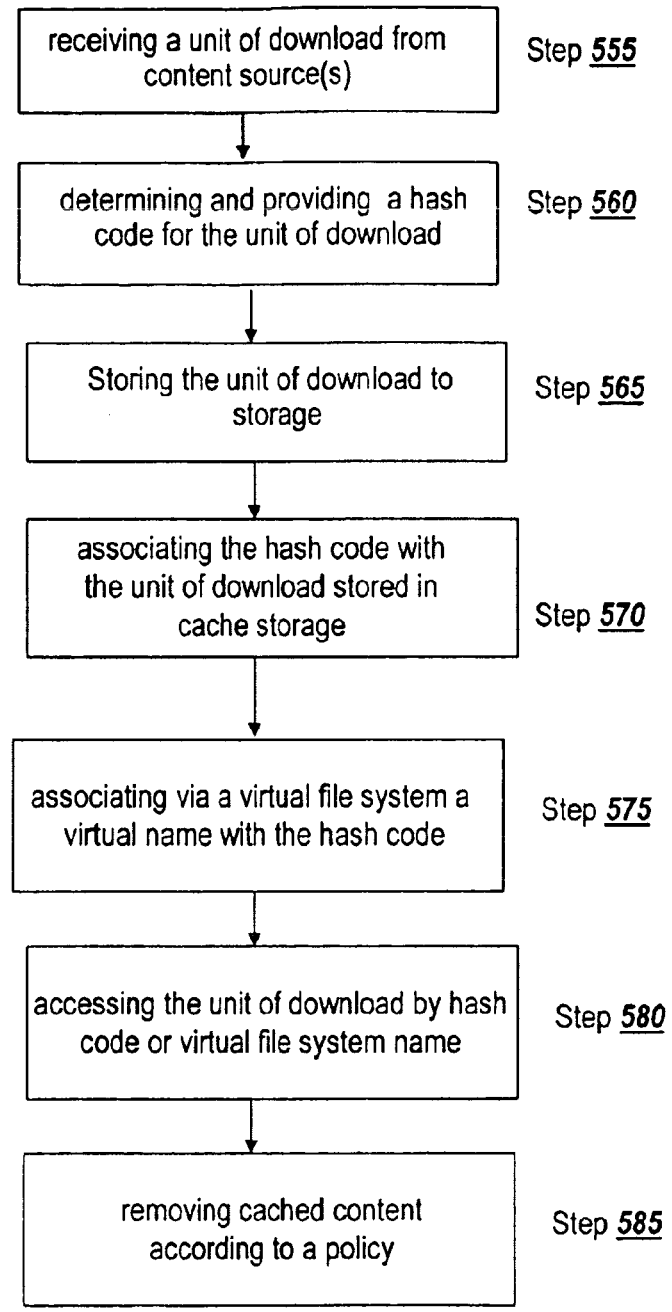
FIG. 5D is a flow diagram of steps performed in practicing an embodiment of caching and virtual file system content storing techniques.
Figure 5E:
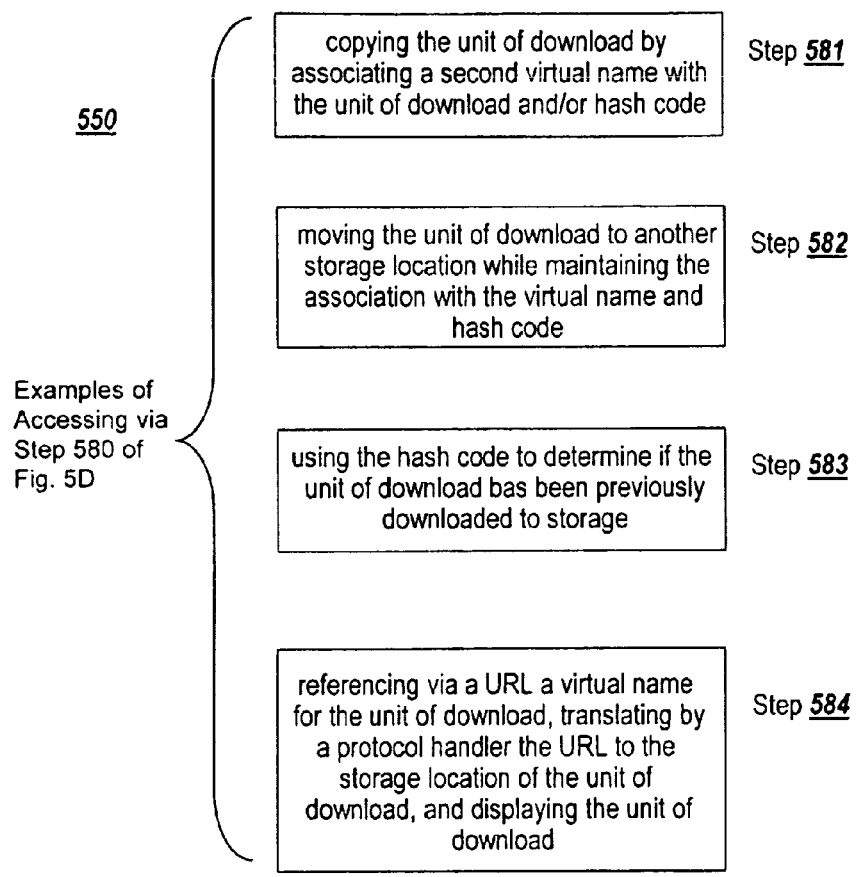
FIG. 5E is a flow diagram of an embodiment of steps performed in accessing content stored via the illustrative caching and virtual file system related techniques of FIG. 5D.

FIGS. 5A-5E illustrate the use of cache and virtual file management techniques. FIG. 5A depicts the local content of a VFS 280 mapped via a hash code index 510 to the actual files on disk 260. FIG. 5B depicts the uses of local content structure bypassing the control or management of files by the cache manager 280 or VFS 280. FIG. 5C depicts the use of the protocol handler 242 in conjunction with cache manager 270 and VFS 280 to provide local content for a browser 245 from the hash cache 520. FIGS. 5D and 5E depicts steps of practicing illustrative method 550 for storing and accessing local content from the hash cache and VFS.

In brief overview of method 550, at step 55, the IDS client 210 receives a unit of download, such as a file, from a content source 290. At step 560, the cache manager 270 determines and provided a hash code for the unit of download, and stores the unit of download to a cache storage at step 565. At step 570, the cache manager 270 associates the hash code with the unit of download stored in the cache storage. At step 575, the hash code is associated with a virtual name for the unit of download, e.g., file, via the VFS 280. At step 580, the IDS client 210, VFS 280, application 248 or browser 245 may reference the hash code or virtual file name to use or access the unit of download. For example, at step 581 illustrated in FIG. 5E, a unit of download may be copied by associating a second virtual name with the unit of download or hash code. In another example, at step 582, the unit of download may be moved to another location and the virtual name and/or hash code remain associated. Also, at step 585, the hash code may be used to determine if the unit of download has been previously downloaded or has change. Additionally, at step 584, a Uniform Resource Locator (URL) may reference the unit of download by virtual name and have the virtual name translated to the unit of download stored in the cache storage. At step 585, the hash code and unit of download may be may removed from cache storage according to a policy or rule.

In view of FIGS. 5A-5C, the method 550 will be further described in detail. At step 555, the IDS client 210 receives a unit of download from one or more content sources 290A-290N. For example, the downloaded content may have occurred in response to a download order 235 received by the download manager 220. In some embodiments, the unit of download comprises a file or a portion of a file, such as a file segment or sequence of bytes. In other embodiments, the unit of download may be a set of one or more directories of files.

At step 560, the cache manager 270 determines and provides a hash value or code for the unit of download. In some embodiments, the hash code comprises a Secure Hash Algorithm (e.g., SHA-1) hash of the contents of a file, group of files, or directory. In other embodiments, any type and form of cryptographic or hash function, algorithm or computation may be used to generate a hash code or value. A hash value may comprise a number generated by applying a mathematical formula, algorithm or function to a document, sequence of text, file or other type and/or forms of content that provides a value shorter than and unique to the original document, file or content. As such and in some embodiments, the hash value may be used to determine if the contents of the document or file have changed by re-generating the hash value and comparing the value to a previously generated hash value for the document or file. In further embodiments, the cache manager 270 generates a unique number for the unit of download by any suitable means and/or mechanisms, for example, a non-repeating sequential numbering scheme.

At step 565, the cache manager 270 stores the unit of download to a cache storage 520. In some embodiments, the cached storage 520 is an identified or designated portion of storage 260 used by or under the control and management of the cache manager 270. For example, as illustrated in FIG. 5A, a directory identified by the name 'cache' may be used by the cache manager 220 to store cached content in the local content structure 320 of the file provided on disk storage 260. In some embodiments, the cache storage 520 is not known or visible to a user, or otherwise is transparent to a user of the client 205. For example, the cache directory 520 may have permissions or settings such that the user may not access the directory directly. In other embodiments, the cache storage 520 comprises one or more compressed or zipped folders, and may further include a password protected folder. In yet another embodiment, the cache storage 520 may comprise a structure in memory, such as a data structure or object.

At step 570 of method 550, the cache manager 270 associates the hash code provided at step 560 with the unit of download stored in cache 520. For example, as illustrated by the hash index 510 of FIG. 5A, a unique hash code provides an index to the corresponding file or file name in the cache 520. The hash code may be associated with the unit of download by any suitable means and/or mechanisms to provide a hash index 510. In one embodiment, the hash index 510 comprises a lookup table in storage or memory. In another embodiment, the hash index 510 comprises a database where the hash value and/or file names are keys to associated information. In other embodiments, the hash index 510 comprises any type of data structure, object, or file providing a mapping between hash codes and file names. In some embodiments, the hash code may be stored with the unit of download in the cache 520. In other embodiments, the hash index 510 may be stored in the cache 520. In further embodiments, the hash index 510 may stored in any portion of storage 260, such as the directory file structure 162.

At step 575, the hash code is associated with a virtual name via the VFS 280. For example, the virtual file system for accessing local content structure 310 may comprise a directory structure as illustrated in FIG. 5A. Each file in the virtual file system may be refer to, point or index to, or otherwise be associated with a hash code of the hash index 510. The VFS 280 may provide this association via an application programming interface (API). For example, the cache manager 270 may call a function of the VFS API to associate a virtual file name with the hash code and/or actual file name. In some embodiments, the virtual file name may be associated with the hash code and/or actual file name via the hash index 510. For example, the hash index 510 may include the hash code association with the actual file name, and the hash code association with the virtual file name. In some embodiments, instead of associating a virtual file system with the hash code or hash index, another actual directory and file structure may be associated to the corresponding hash codes.

In some embodiments of method 450, one or more files of the virtual file system 280 are associated with files on disk 260 instead of a hash code or the cache 520. For example, as illustrated in FIG. 5B, the local content VFS 280 may have one or more files associated with a file in a directory structure other than the cache 520. Additionally, as illustrated in FIG. 5B, some portions of the virtual file system 280 may be associated with a hash code and the cache 520 via a hash index 510, while other portions are associated with a directory and files other than the cache 510. For example, the hash cache 520 may be bypassed because a downloaded file may need to be placed in a specific location on disk, such as to be used by a media player 215. In some embodiments, files are copied from the hash cache 520 into specific locations on disk 260. In further embodiments, a portion of the local content 250 may be associated with a VFS 280, another portion associated with the VFS 280 and hash index 510, and a further portion not mapped or using either the VFS 280, hash index 510 or cache 520. The cache 280 also may contain files that are not referenced via the VFS 280, or hashed and indexed into the hash index 510. In some embodiments, files initially not referenced via the VFS 280 upon download, may become referenced via the VFS 280 in subsequent download orders 235.

At step 580, upon referencing and associating the downloaded content in cache 520 with hash codes and the virtual file system 280, the units of download may be accessed, referenced or used by the IDS client 210, browser 245 or application 248 by hash code or virtual file name. For example, and now referencing step 581, copying of files in the VFS 280 does not require actual disk copies. In the VFS 280, a second virtual file name may be associated with the same hash code of a first virtual file name. By associating one or more additional virtual files names to the hash code via the VFS 280, copies of the actual file on disk 260 are virtually created without actually copying the file. In another example of accessing the file via the hash code and VFS 280, at step 582, a file may be moved to a different location in cache 520 or to another location in storage 260 while maintaining the same hash code and therefore maintaining the associating with the virtual file name in the VFS 280. Although the actual file on disk 260 has moved, the hash index 510 can be updated and the virtual file name still reference the same hash code.

In another example of using the hash cache and VFS techniques, the cache manager 270 can use the hash code to determine if the file has been previously downloaded to the cache 520 or to storage 260. For example, download orders 235 for hash files already in the cache 520 may not require additional download of those files. In another embodiment, the IDS client 210, browser 245 or application 248 may reference a virtual file name in the VFS 280 having an associated hash code. The cache manager 270 may use the hash index 510 to find the file in cache 520 associated with the hash code, and then recalculate the hash code on the file in cache 520 to determine if the hash code has changed and therefore the contents of the file have changed. In some embodiments, the download manager 220 may receive a download order 235 referencing a file in VFS 280, and the download manager 220 determines if a hash code exists for the virtual file name, and if so, if the hash code points to an actual file in cache 520. If the file exists in cache 520, then the download manger 220 does not need to download that file for the download order 235.

In a further example and referring now to FIG. 5C, the VFS 280 and hash code techniques may be used for translating URLs referencing the VFS 280 into content from the cache 520. By way of example, an element of the user interface presented via the browser 245 may refer to a virtual file in a URL of 'maven:/28391/mysite/player/player.html.' The mysite/player/player.html file of the URL refers to a virtual file in the structure of the VFS 280, which in turn maps to or is associated with a unique hash code in the hash index 510 that is associated with a file name, e.g. '1.html' in the cache 520. In some embodiments, the protocol handler 242 translates the URL via the IDS client 210 into the file in cache 520, and the file is provided in response to a request using the URL. As such, in these embodiments, the browser 245 or application 248 may use local content 250 provided via the cache 520 and VFS 280 to present or display the content in a user interface.

Referring to FIG. 5D and step 585 of method 550, the contents of the cache 520 may be removed according to any logic, business rules, or policy of the IDS client 210 or cache manager 270. For example, a file with an associated hash code may be removed upon receipt of a download order 235 by the download manager 220 that requests a newer version of the file, or if the file is marked optional and not included in the download order 235. Furthermore, any files in the cache 520 and not referenced by the VFS 280 may be removed from the cache 520 according to a policy or rule. For example, the cache manager 220 may check for and delete unreferenced files in the cache 520 via the hash index 510 upon a download by the download manager 220. In another embodiment, the cache manager 220 may check for and delete unreferenced files in the cache 520 upon a predetermined time or schedule, or upon an event, such as restarting the IDS client 210 or rebooting the client 205.

Figure 6A:
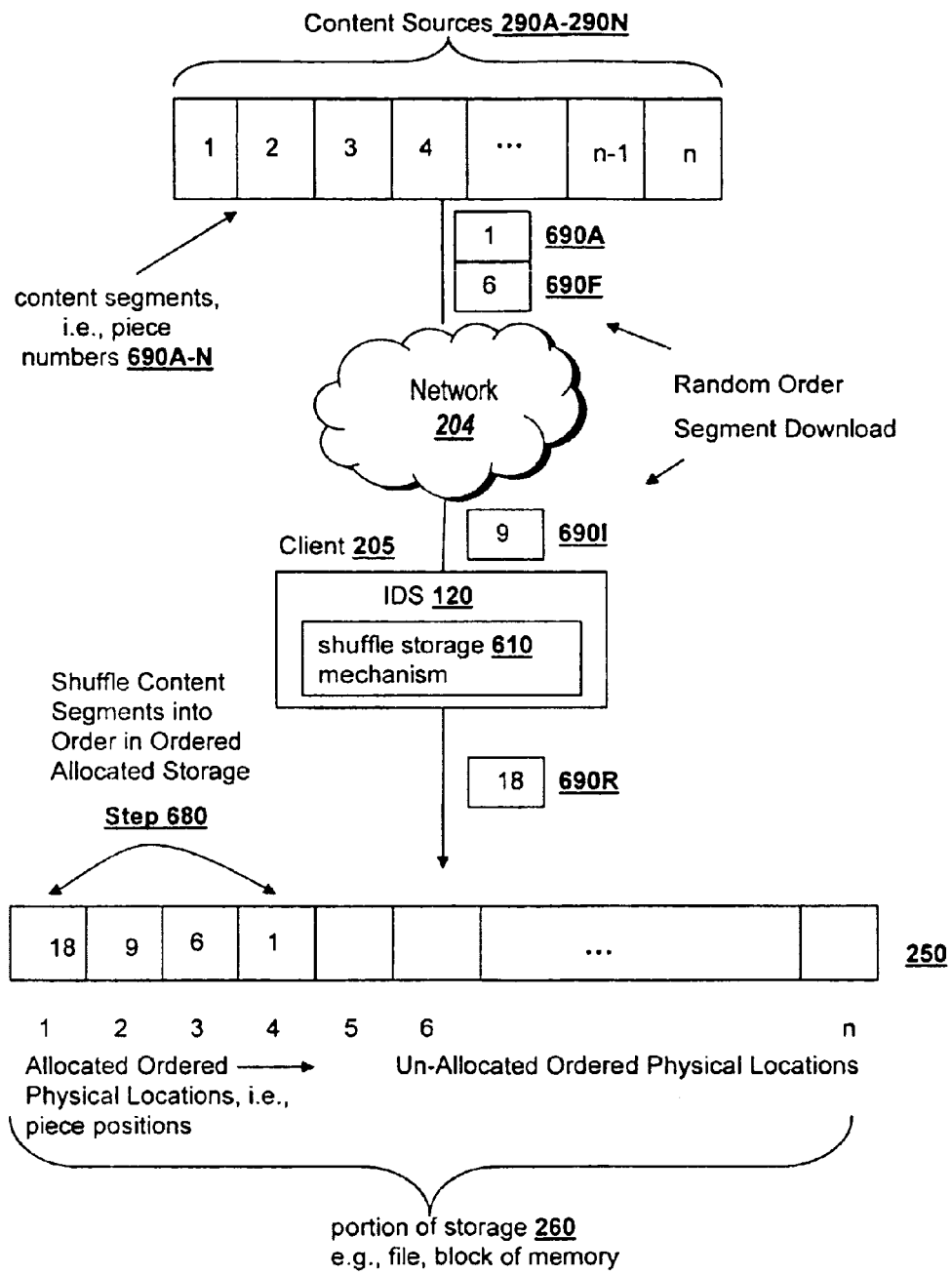
FIG. 6A is a block diagram view of an embodiment for storing downloaded content using a shuffle storage technique.

In another embodiment, the IDS 120 uses a technique for downloading portions of a file in random order and storing the downloading portions to storage 260 in an efficient manner. This technique is referred to as "storage shuffling" and is illustrated via FIGS. 6A-6E. FIG. 6A provides a diagrammatic view of storage shuffling with the IDS 120. FIGS. 6A-6D depict five illustrative cases of the storage shuffling technique in view of method 650 depicted in FIG. 6E. In brief overview of method 650 of FIG. 6E, at step 655, the source content 290 to be downloaded is logically divided into pieces or segments. For example, a file to be downloaded may be divided into logical segments of equal size. At step 660, each logically divided piece is assigned a piece number corresponding to the piece's position within the content. For example, the first segment representing a first sequence of bytes of the file is assigned piece number 1, and the second segment piece number 2, and so forth. At step 665, a piece of content is received in random order, and the next ordered physical location of the target storage, e.g., file is allocated at step 670. At step 675, the piece of content is stored into one of the allocated ordered physical locations. At step 680, the pieces stored in the allocated ordered physical locations are shuffled in accordance with case example of FIGS. 6B-6D. At step 685, allocation, storage and shuffling of steps 670,675, and 680 are performed for the next randomly received pieces of content at step 665 until have completed ordered content in the target storage.

In overview of FIG. 6A, content segments 690A-690N, depicted and also referred to as piece numbers 1, 2, 3, 4, . . . n–1, n may be provided by one or more content sources 290A-290N. Each of the pieces 690A-690N of the source content 290A-290N may be downloaded and/or received in random order by a client 205 having the IDS 120. For example and as depicted in FIG. 6A, piece number 18 may be received first by the client 205 via the network 204, and then piece number 9, followed by pieces 6 and 1. The client 205 and/or IDS 120 includes a shuffle storage mechanism 610, which shuffles contents 690A-690N into order in ordered allocated physical locations of a portion of storage 260, such as a target file that is to hold the completed downloaded copy of the original file represented by the content pieces 690A-690N.

The shuffle storage mechanism 610 comprises software, hardware, or any combination of software and hardware to provide the logic, function and operations of the shuffle storage techniques, such as will be discussed in further detail in conjunction with FIGS. 6B-6D. In some embodiments, the IDS client 210 comprises the shuffle storage mechanism 610, which may be provided via any type and/or form of an application programming interface (API). In other embodiments, the IDS client 120 may use a control script 225 to provide the shuffle storage mechanism 610. In one embodiment, the shuffle storage mechanism 610 comprises a set of executable instructions as part of the IDS client 210. For example, the shuffle storage mechanism 610 comprises a set of executable instructions written in any programming language, such as C++, and may further be included as a library, module or component of the IDS client 210.

In some embodiments, the portion of storage 260 comprises an ordered set of physical locations, referred to as and depicted as piece positions 1, 2, 3, 4, 5, 6 and n. In one embodiment, the portion of storage 260 comprises a file and each piece position is a segment or portion of the file to hold a downloaded or received content segment 690A-690N from the content source 290A-290N. In other embodiments, each ordered piece number 1 . . . n−1 of the file represent an equal size of a sequence of bytes of the file with the last piece number n representing the last set of bytes of the file. In some embodiments, each piece number is allocated in accordance with the ordered physical location of the file, such that physical location of piece position 1 is allocated first, the physical location of piece position 2 is allocated next, and so forth. In another embodiment, the portion of storage 260 may include a block of memory, or a data structure or objects. As such, in these embodiments, each ordered piece position is a segment or portion of the memory, data structure or object to hold a downloaded or received content segment 690A-690N from the content source 290A-290N.

Although the portion of storage 260 to hold the complete set of the downloaded content segments 690A-690N are ordered physical locations, the physical locations may be fragmented across the storage 250 or memory element and still be in order. That is, in these embodiments, the allocated ordered physical location of piece position 1 may not necessarily be adjacent in the memory or storage area of the storage or memory element of the allocated ordered physical location of piece position 2. For example, the operating system of the client 205 may assign or use areas of storage or memory not adjacent to each other for adjacent ordered physical locations of a file, or other types of storage 260. However, in some embodiments, the operating system of the client 205 keeps track of and manages the fragmented ordered physical locations of the file or memory as ordered subsequent physical locations.

As will be further discussed in detail and by way of case examples, the shuffle storage mechanism 610 may only allocate a next ordered physical location for a random piece of content segment 690A-690N as it is received, and use the currently allocated ordered physical locations to store and shuffle the randomly received content. As such, in some embodiments, the IDS 120 or IDS client 210 only allocates the physical locations of a file 260 in order regardless if a received piece number of a content segment 690A-690N is to be eventually stored in an ordered physical location yet allocated. For example as illustrated in FIG. 6A, piece number 18 may be received and stored in one of the allocated ordered physical locations 1 . . . 17 until ordered physical location of piece position 18 is allocated on receipt of the 18$^{th}$ piece of random content segment 690A-690N. Then, piece number 18 may be shuffled to allocated ordered physical location of piece position 18. Using this technique, the IDS 120 or IDS client 210 minimizes the size of the file to the number of random segments of content segments 690A-690N received. As such, in these embodiments, the size of the file does not need to expand based on the final position of the randomly received content segment 690A-690N, which may be near the end of the file when only a few pieces have been received. Expanding the file in an ordered fashion using the shuffle storage technique reduces any processing or performance delays due to memory or disk swapping due to dealing with larger files.

In further detail of method 650, at step 655, the source content 290A-290N to be downloaded may be logically divided into content segments 690A-690N by any suitable means and/or mechanisms. In one embodiment, the source content 290A-290N is a file and the IDS client 210 logically divides the file into content segments 690A-690N of equal or uniform size, with the last segment 690N either being the same size or smaller size. In other embodiments, the IDS client 210 logically divides the file into content segments 690A-690N into varying sizes. In other embodiments, the content segments 690A-690N are divided into some segments of the same size with other segments of different sizes. In one embodiment, the IDS client 210 may request the size of a file to be downloaded from a server 295 providing the source content 290. The IDS client 210 then may use any logic, functions or operations, for example, a set of executable instructions, to determine a sizing scheme for the content segments 690A-690N making up the file. Each of the content segments 690A-690N can be set to any size. For example, in one embodiment of a large multiple-Megabyte (MB) file, each content segment is 1048576 bytes or 1 MB.

In another embodiment, the source content 290 provides a segmentation of the content into content segments 690A-690N. For example, the source content 290 may include another file, such as a manifest, listing the sizing scheme, number of segments, etc. of the file to be downloaded. In some embodiments, each of the content segments 690A-690N represent a sequence of bytes of a byte range of the file. In other embodiments, each of the content segments 690A-690N represent a logical portion of the file to be downloaded. For example, content segment 690A may represent the audio portion of a file, while content segment 690B represents the video portion, and content segment 690C, a data portion. For clarity, those ordinarily skilled in the art will recognize and appreciate that logically dividing the content 290A-290N into content segments 690A-690N refers to downloading, transmitting or otherwise moving the file in these units and not physically dividing a file into smaller files.

At step 660, each of the content segments 690A-690N is assigned a piece number corresponding to the position of the content segment 690A-690N within the content 290. For example, the first content segment 690A of a file to be downloaded is assigned piece number 1, and the second content segment 690B is assigned piece number 2, and so forth. As such, piece numbers 1 . . . n assigned to content segments 690A-690N represent the ordered sequence of content to provide a complete copy of the file to be downloaded. For example, piece number 0 corresponds to bytes 0-1048575 of the file to be downloaded, piece number 1 corresponds to bytes 1048576-2097151 of the file, etc. Although the piece numbers generally described and illustrated as assigned to content segments 690A-690N are sequential starting from one, any other sequential numbering scheme starting at any initial number, e.g., 1001, may be used in practicing the operations described herein.

At step 665, the client 205 and/or IDS 120 receives one of the content segments 690A-690N in random order. For example, a file may be requested to be downloaded via a download order 235 to the IDS client 210. In response to the download order 235, the IDS client 210 may request a download from one or more content sources 290A-290N the desired file. In one embodiment, the IDS client 210 makes a series of requests for one or more content segments of the file to be downloaded from one content source 290A. In another embodiment, the IDS client 210 makes requests for one or more content segments 690A-590N of the file from one content source 290A and other content segments 690A-690B from another content source 290B. In some embodiments, all the content segments 690A-690N are received in a random order by which no two piece numbers are subsequent to each other, while in other embodiments, some content segments 690A-690N may be received that are adjacent to each other, i.e., adjacent piece numbers, while other content segments 690A-690N are not received sequentially. In one embodiment, all the content segments 690A-690N may not be received in random order but happen to be received in sequential order.

At step 670, upon receipt of a content segment, for example content segment 690R assigned piece number 18 as illustrated in FIG. 6A, the next ordered physical location of the target file 260 is allocated to hold the content of the content segment. In the case of a first received content segment, for example content segment 690R, then the first ordered physical location of piece position 1 is allocated for the file 260, which represents the final piece position for content segment assigned piece number 1. In the case of a second received content segment 690I then the next ordered physical location of the second piece position is allocated, and for the a third content segment 690F the next ordered physical location of the third piece position is allocated, and so forth. As such, in some embodiments, the highest piece position of the allocated ordered physical location is the number of random content segments 690A-690n received by the IDS client 210. In another embodiment, the IDS client 210 allocates two ordered physical locations at a time: the ordered physical location for storing the currently received content segment 690A-690N and the next ordered physical location for the next content segment 690A-690N to be received. In further embodiments, the IDS client 210 allocates a block of two or more ordered physical locations at a time.

At step 675, the content segments 690A-690N are stored into one of the ordered allocated physical locations. As such, in one embodiment, the pieces are stored in the order they are received, which may be random. For example, if pieces 9, 18, and 6 are downloaded in that order, then these pieces will be stored in the target file in that same order. Further to the example, piece position 0 will contain downloaded piece 9, piece position 1 will contain piece 18, and piece position 2 will contain piece 6. Although downloading the content segment 690A-690N in this way would reduce or minimize the intermediate sizes of the file holding the download content prior to the completion of download, the content segments 690A-690N would be stored in the file 250 in the incorrect order. So at some point, the content segments 690A-690N stored in the allocated ordered physical locations of the file have to be sorted into the right order in the file.

At step 680, the method 650 sorts or shuffles the pieces stored in the allocated ordered physical location. The sorting or shuffling techniques may be performed at any point during the downloading and storing of content segments 690A-690N. In one embodiment, the shuffling technique is performed upon receipt of each content segment 690A-690N, while, in other embodiments, the shuffling techniques may be performed after any set of one or more content segments 690A-690N are received, for example, after every three segments are received. In other embodiments, shuffling or sorting may occur when any one or more ordered physical locations are allocated or upon storage of any one or more content segments 690A-690N to the allocated ordered physical locations. In further embodiments, the shuffling or sorting may occur during any idle time of the IDS client 210, for example, between receipts of downloaded content segments 690A-690N.

The shuffling techniques are directed towards multiple scenarios of sorting content segments 690A-690N in allocated ordered physical locations as will be described in conjunction with example cases 625A-625E illustrated in FIGS. 6B-6D. In considering these example cases, the terms or variables illustrated in FIGS. 6B-6D are described. These variables may be described in view of variables that may be used and implemented in any type and form of executable instructions, such as a programming or scripting language, for performing the algorithm, function or operations of the shuffling techniques. The "pieceCount" variable includes the number of pieces, i.e., content segments 690A-590N that are currently stored in the target file, i.e., allocated ordered physical location. The pieceCount is also the "piece position" of the next piece to be stored. For example, in the case having piece positions 0, 1, and 2 containing piece numbers 9, 18 and 6, the pieceCount is 3. The "existingPiece" variable is used to determine if there is an existing piece stored in the target file with the piece position equal to the piece number of the incoming piece. For example, in the case having piece positions 0, 1, and 2 containing piece numbers 9, 18, and 6 where the incoming piece number 1, the existingPiece would be 18 since piece 18 is currently stored in piece position 1. If there is no piece position with the same number as the incoming piece's piece number, then the existingPiece variable is empty. For setting the "nextPiece" variable, the pieceCount variable is used to determine if there is a piece in the target file having a piece number that is the same as the pieceCount. For example, in the case having piece positions 0, 1, and 2 containing piece numbers 3, 18 and 6, the pieceCount is 3 and, there is a piece in the target file with a piece number of 3, i.e., piece number 2 is stored in piece position 0. As such, nextPiece is 3. Otherwise, if there is no such condition, then nextPiece is empty.

Figure 6B:
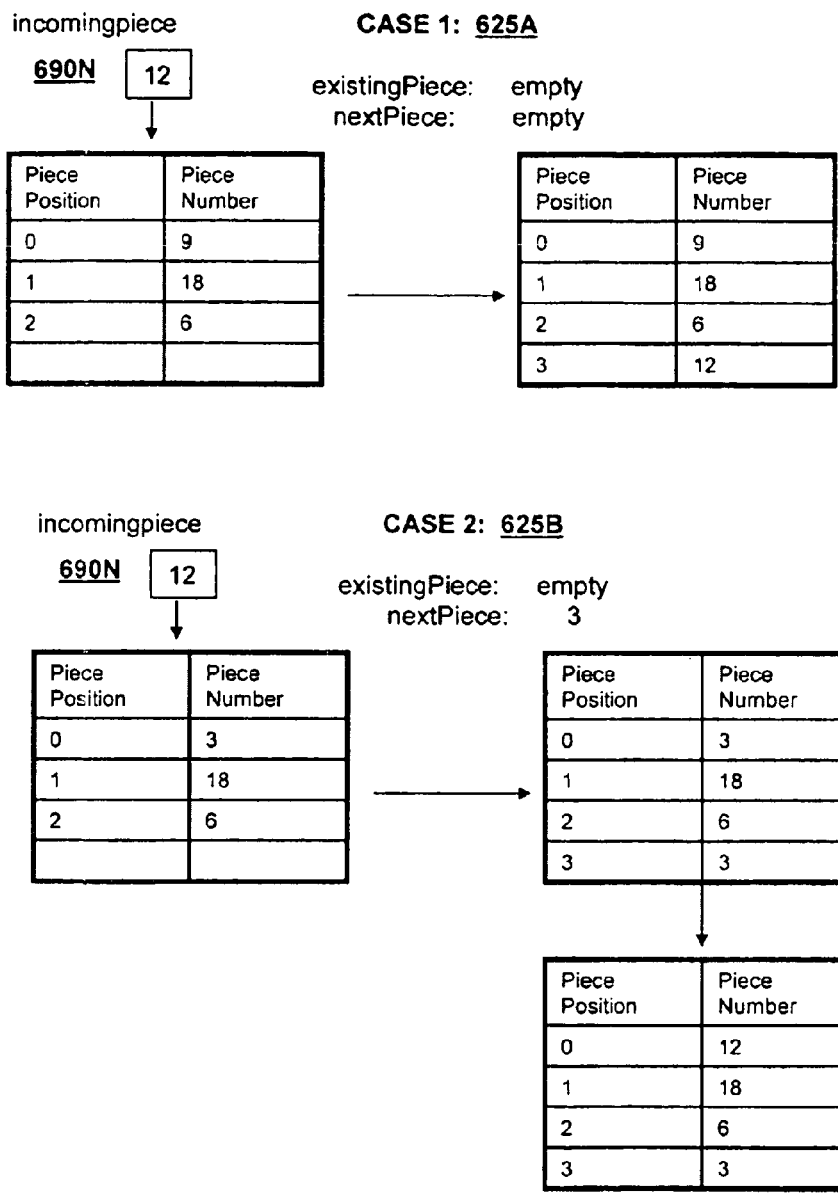
FIG. 6B is a diagrammatic view of embodiments of various shuffle storage technique examples.

Referring now to the example case 625A illustrated in FIG. 6B, the shuffling technique is performed at a point where the existingPiece is empty and the nextPiece is empty In this example case, piece positions 0, 1, and 2 have piece numbers 9, 18, and 6 stored respectively, and the IDS client 210 receives the next incoming content segment 690N, i.e., piece having piece number 12, i.e., the "incomingPiece" variable is 12. In this case, the shuffling technique stores the incoming piece at piece position of the value of pieceCount, which is 3. As such, the shuffling technique stored the incoming piece into the next allocated ordered physical location such that piece positions 0, 1, 2, and 3 hold piece numbers 9, 18, 6 and 12 as depicted in FIG. 6B.

In example case 625B illustrated in FIG. 6B, the shuffling technique is performed at a point where the existingPiece is empty and the nextPiece is 3. In this example case, piece positions 0, 1, and 2 have piece numbers 3, 18, and 6 stored respectively, and the IDS client 210 receives the next incoming content segment 690N having piece number 12. In this case, the shuffling technique stores the incoming piece at piece position of the value of pieceCount, which is 3. As such, the shuffling technique stored the incoming piece into the next allocated ordered physical location such that piece positions 0, 1, 2, and 3 hold piece numbers 9, 18, 6 and 12 as depicted in FIG. 6B. In this case, the nextPiece, which is piece number 3 stored in piece position 0 is copied, moved, or placed into piece position 3, and incoming piece is stored in piece position 0. As such, the allocated ordered physical locations comprises piece positions 0, 1, 2, and 3 storing piece numbers 12, 18, 6 and 3 respectively.

Figure 6C:
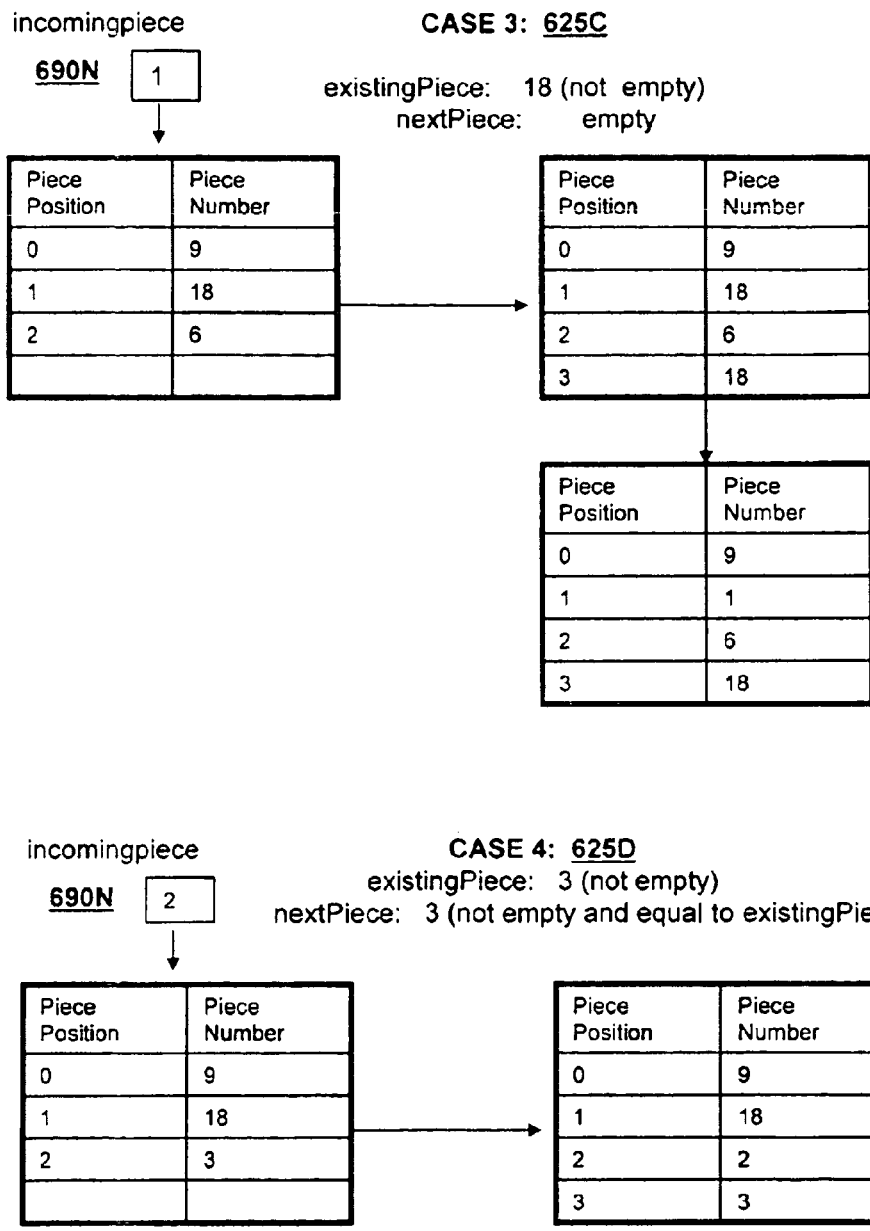
FIG. 6C is a flow diagram of example steps performed in practicing an embodiment of the shuffle storage technique in view of FIG. 6A and FIG. 6B.

In example case 625C illustrated in FIG. 6C, the shuffling technique is performed at a point where the existingPiece is 18, or not empty, and the nextPiece is empty. In this example case, piece positions 0, 1, and 2 have piece numbers 9, 18, and 6 stored respectively, and the IDS client 210 receives the next incoming content segment 690N having piece number 1. In this case, the shuffling technique moves, copies, or place the exsitingPiece 18 of piece position 1 to piece position 3, and stores the incoming piece of piece number 1 to piece position 1. As such, the shuffling technique stores the incoming piece into the correct position in the file and moved the replaced piece to next allocated ordered physical location such that piece positions 0, 1, 2, and 3 hold piece numbers 9, 1, 6, and 18 as depicted in FIG. 6C.

In example case 625D illustrated in FIG. 6C, the shuffling technique is performed at a point where the existingPiece is 3, or not empty, and the nextPiece is 3 or, not empty and equal to the existingPiece. In this example case, piece positions 0, 1, and 2 have piece numbers 9, 18, and 3 stored respectively, and the IDS client 210 receives the next incoming content segment 690N having piece number 2. In this case, the shuffling technique moves, copies, or place the exsitingPiece 3 of piece position 2 to piece position 3, and stores the incoming piece of piece number 2 to piece position 2. As such, the shuffling technique stores the incoming piece into the correct position in the file and moved the replaced piece to the correct location such that piece positions 0, 1, 2, and 3 hold piece numbers 9, 18, 2, and 3 respectively as depicted in FIG. 6C.

Figure 6D:
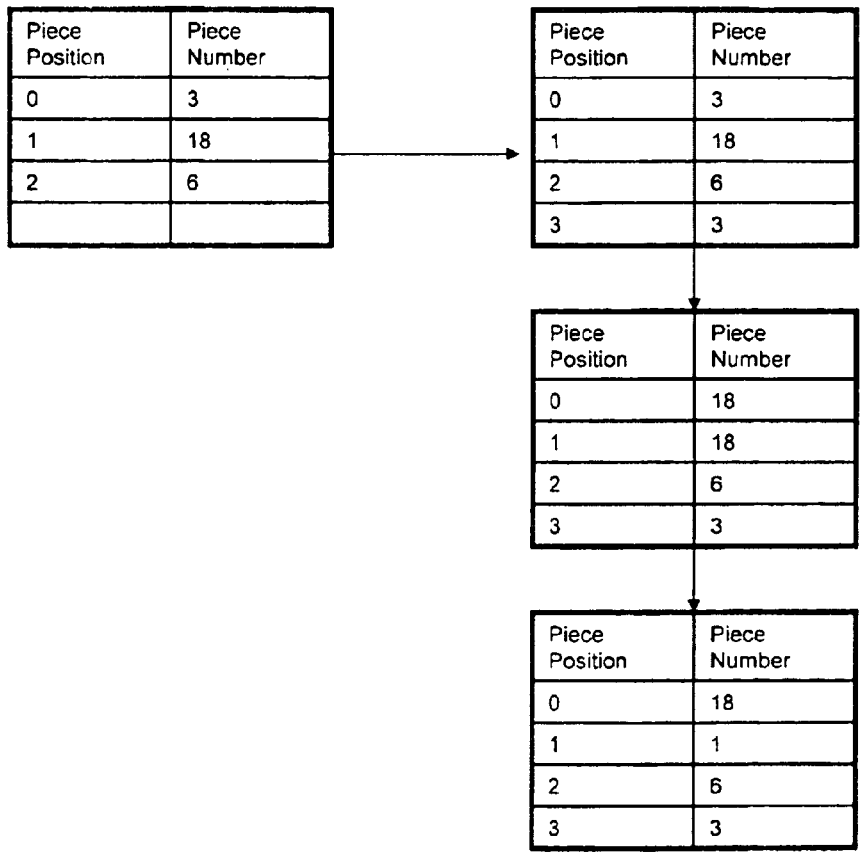
FIG. 6D is a flow diagram of example steps performed in practicing an embodiment of the shuffle storage technique in view of FIGS. 6A-6C.

In example case 625E illustrated in FIG. 6D, the shuffling technique is performed at a point where the existingPiece is 18, or not empty, and the nextPiece is 3 or, not empty and equal to the existingPiece. In this example case, piece positions 0, 1, and 2 have piece numbers 3, 18, and 6 stored respectively, and the IDS client 210 receives the next incoming content segment 690N having piece number 1. In this case, the shuffling technique moves, copies, or places the nextPiece 3 of piece position 0 to piece position 3, moves existingPiece 18 to piece 0, and stores the incoming piece of piece number 1 to piece position 1. As such, the allocated ordered physical locations comprises piece positions 0, 1, 2, and 3 storing piece numbers 18, 1, 6, and 3, respectively, wherein piece numbers 1 and 3 are in the correct piece positions.

Figure 6E:
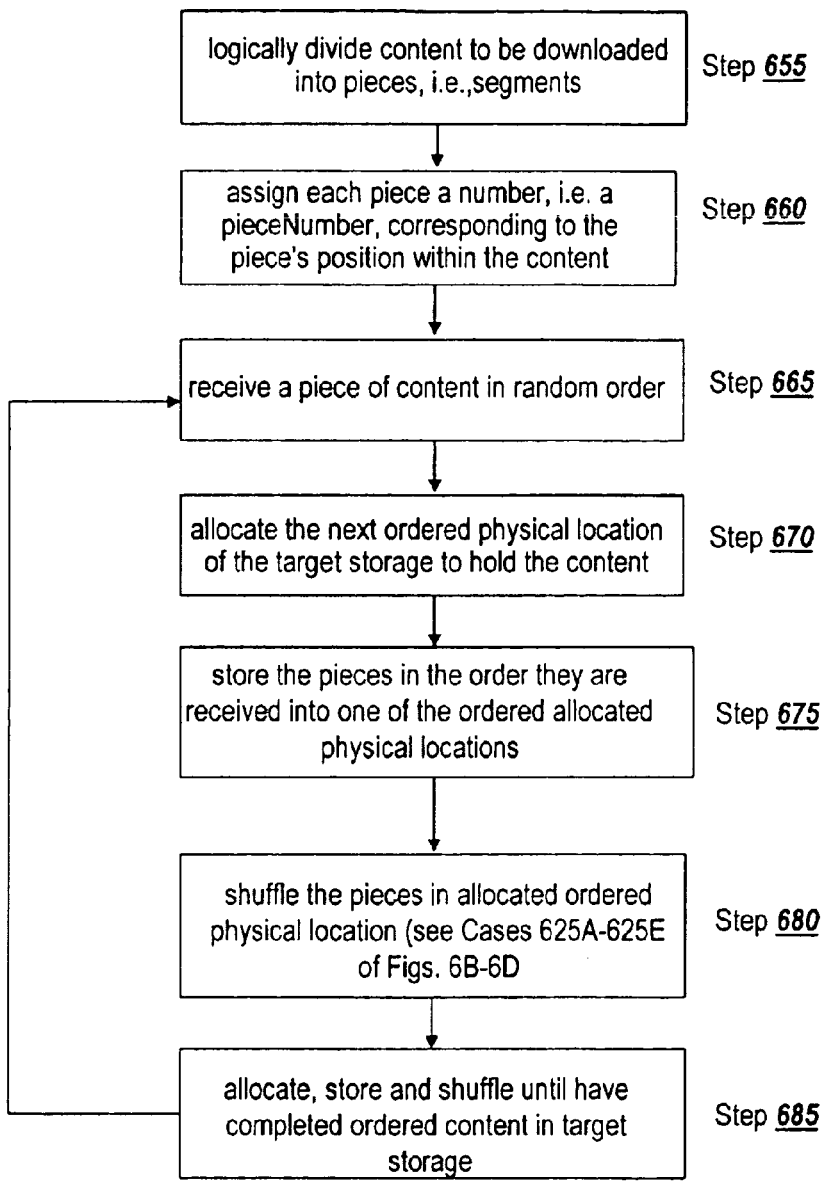
FIG. 6E is a flow diagram of example steps performed in practicing an embodiment of the shuffle storage technique of FIGS. 6A-6D.

Now referring to step 685 of method 650 depicted in FIG. 6E, the shuffling techniques described above and steps 665, 670, 675 and 680 are performed until the download of the randomly received content segments 690A-690n is complete and the piece numbers are shuffled in the allocated ordered physical piece positions to provide a complete form of the downloaded file having all content segment in the correct order, or otherwise have a complete downloaded file as desired or intended. By applying the shuffling techniques as random content segments 690A-690N are received, the IDS 120 or IDS client 210 can 1) provide the target file with each piece in the correct position, i.e., the piece position of each piece is the same as its piece number, 2) the target file does not need to be larger than the actual number of pieces currently downloaded, i.e., no need to expand the target file beyond the actual amount of data received and 3) each incoming piece only needs a small, bounded amount of processing at any point during the download.

Figure 7A:
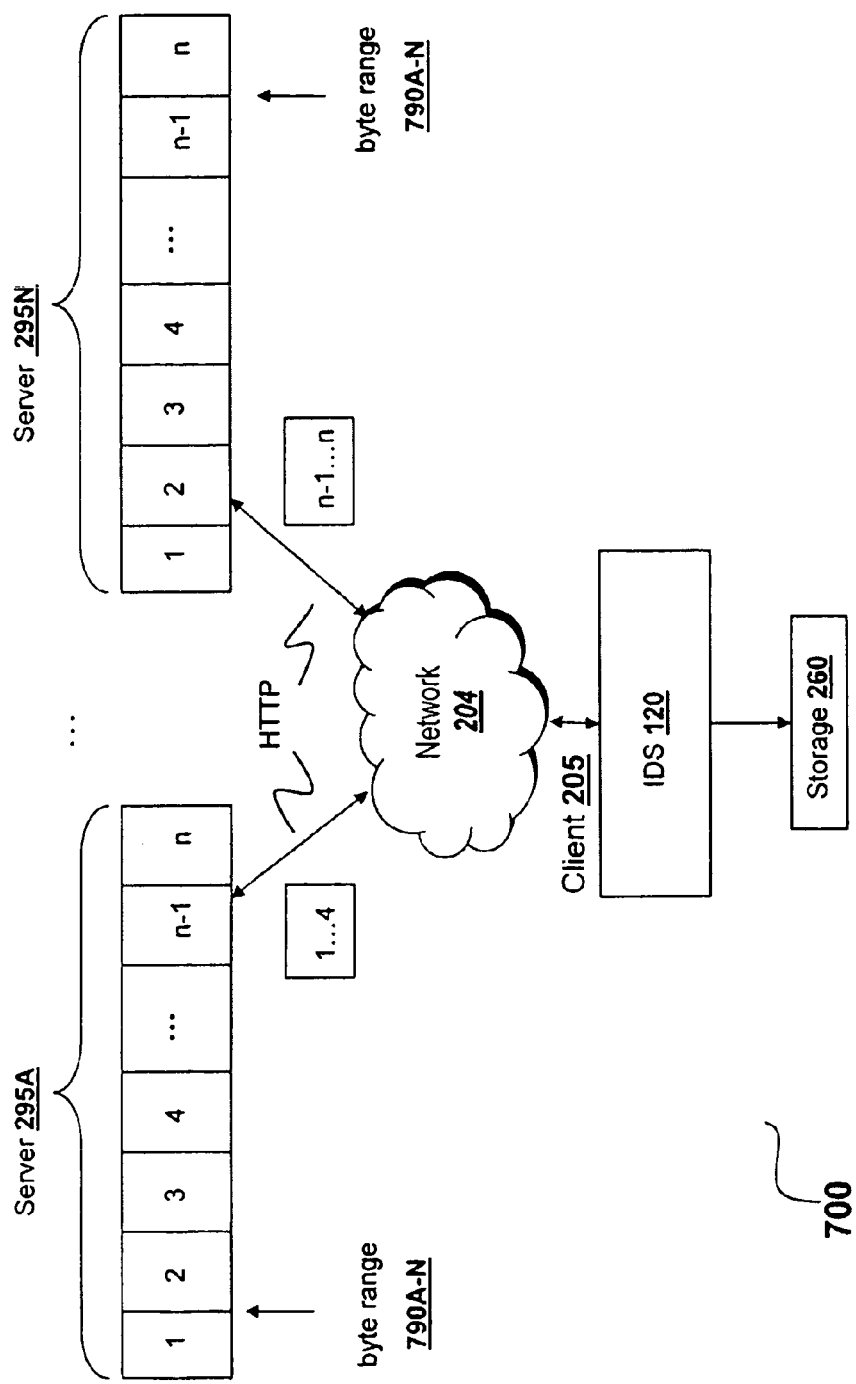
FIG. 7A is a block diagram view of another embodiment for downloading and storing content from multiple servers.

In an additional embodiment, the IDS 120 or IDS client 210 performs techniques to download content, such any type of video and/or audio media, servers via an application, Internet or web-based protocol, such as any type and form of the Hypertext Transfer Protocol (HTTP) from a content source providing the media via a plurality of servers. FIG. 7A depicts an illustrative environment 700 for a client 205 operating the IDS 120 to download over a network 204 media from a plurality of servers, such as servers 295A-295N and storing the downloaded media to storage 260 of the client 205. The media may be available in any desired portions from the servers 295A-295N, such as one more byte ranges 790A-790N, for example a sequence of bytes. The IDS 120 may obtain one or more byte ranges 790A-790N of the media from any of the plurality of servers, such as a first byte range 790A from a first server 295A and a second bytes range 790B from a second server 295B.

The servers 295A-295N may be provided by a single content provider or by a single content source, such as via a server farm or other logical association of servers. For example, one of the server 295A may provide a graphical user interface, as via a web page of a web-site, for a user to download media from the content source. The media to be downloaded may be stored on one or more of the servers 295A-295N. In other embodiments, the servers 295A-295N may be associated with multiple content sources, or different content providers. For example, a first set of one or more servers 295A-295N may provide a first content source, and a second set of one or more servers 295A-295N may provide a second content source. The first content source and the second content source may each have the media for downloading by the client 205. In some embodiments, the media may be available for download from one or more content sources each having one or more servers with the media. Additionally, any, some or all of the content sources and/or servers may each have only a portion of the media.

The servers 295A-295N of environment 700 may comprise a web server, web application, Internet server, Internet application, or other application, program, service, process or task for processing any type and form of HTTP protocol, such as Secured HTTP or HTTPS. In some embodiments, the servers 295A-295N may execute an HTTP driver in the network stack, which may further execute, in other embodiments, in the kernel or kernel space of the operating system of the server 295A-295N. In another embodiment, any of the servers 295A-295N may provide a gateway, load-balancer, or proxy for routing, proxying, redirecting, forwarding or otherwise communicating HTTP communications to and/or form an HTTP-based server 295A-295N.

Although the IDS 120 or IDS client 120 may be discussed generally using an HTTP protocol, any other protocol used between the client 205 and the server 295A-295N to download content may be used, such any type or form of download protocol, including File Transfer Protocol (FTP) or the Common Internet File System Protocol (CIFS). The IDS 120 or IDS client 210 may use the protocol already established by the content source without requiring a specialized protocol or protocol designed for downloading content from multiple sources or between peer devices, such as the BitTorrent protocol.

Figure 7B:
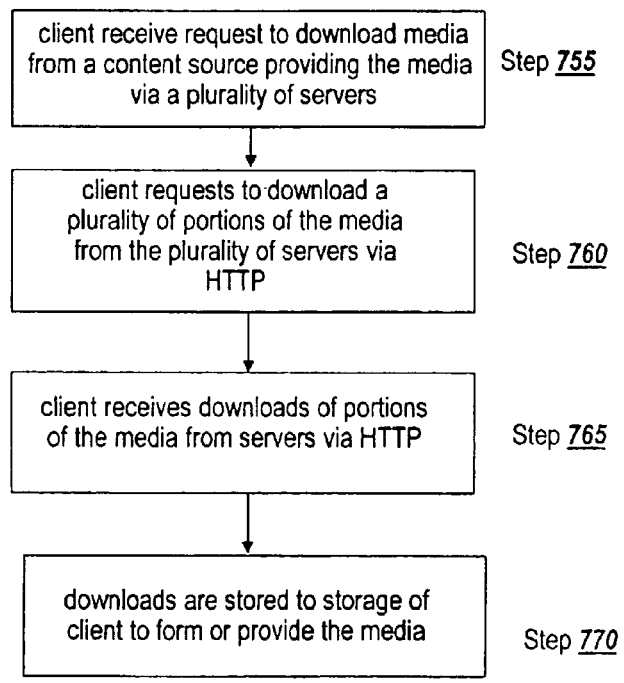
FIG. 7B is a flow diagram of an embodiment of a method performed in practicing an embodiment of a Hypertext Transfer Protocol downloading technique in view of FIG. 7A.

Referring now to FIG. 7B, an embodiment of the method 700 to download media content via HTTP from multiple servers 295A-295N is depicted. In brief overview, at step 755, the client 205 receives a request to download media from a content source. For example, a user requests to download a media file from a web-site. At step 760, the client 205, for example via the download manager 220, requests via HTTP to download a plurality of portions of the media from the plurality of servers 290A-290N, such as a first portion from a first server 295A and a second portion from a second server 295B. At step 765, client 205 receives the plurality of portions of the media from the plurality of servers 295A-295N, and the portions of media are stored in storage 260 of the client 205 in a manner to form or provide the media, such as to form the media file.

In further detail, at step 755 of the method 750, a client 205 receives a request to download media content from one or more content sources. In one embodiment, the request to download comprises a request identifying a media file or files, and a single content source. For example, in some embodiments, the user requests to download the media from one content source and allows the IDS 120 to determine the plurality of servers 295A-395N from which to obtain the media. In another embodiment, the download request may identify multiple content sources or multiple servers 295A-295N from which the media may be obtained. For example, in other embodiments, the user selects either the multiple content sources or servers 295A-295N from which to obtain the download, and communicates via a download order 235 the selection to the download manager 220.

At step 760, the client 205, such as via the IDS client 210, requests via HTTP portions of the media from a plurality of servers 295A-295N. In some embodiments, the client 205 may determine the servers 295A-295N from which to obtain the media. For example, the client 205 may communicate with a first server 295A of a content source to determine other servers 295B-295B from which to download the media. In other embodiments, the client 205 may request a first portion and second portion of the media from a first server 295A, and the first server 295A, such as a proxy or load balancer, may direct one or both of the requests to other servers 295A-295N. In another embodiment, the client 205 determines the servers 295A-295N from which to obtain the media via the download order 235 or download request.

The client 205 may determine the segmenting of the media into portions by any suitable means and/or mechanisms, such as via the IDS client 210. In one embodiment, the client 205 may determine a size and/or number of portions to segment the media for download. The client 205 may logically divide the media into a number of a sequence of bytes, blocks of bytes, or otherwise byte segments of the same size, with a last segment being of the same or lesser size than the other segments. For example, as illustrated in FIG. 7A, the byte ranges 1 . . . n 790A-790N may reach represent a logical division of the media into byte segments of equal size, with the nth byte range 790N being the same or lesser size as the other byte ranges 790A-790N-1. In the example of a media file, each byte range 790A-790N may represent a sequence of bytes of the files. In order to determine the size of the media, such as the size of a media files in bytes, the client 205 may request the size of the file from one of the servers 295A-295N. Although this embodiment of the IDS 120 is generally discussed in terms of bytes of a file, the IDS 120 or IDS client 210 determines the unit of download for obtaining portions of the media from the plurality of servers 295A-295$n$ in any desired manner with any type of size and segmentation.

In the example of HTTP, the client 205 at step 760 sends a get request for a first sequence of bytes 790A from a first server 295A, a get request for a second sequence of bytes 790B from a second server 295B, and so forth, until the client 205 obtains all the sequence of bytes 790A-790N from the plurality of servers 295A-295N. For example, the client 205 may request a third and fourth sequence of bytes 790C and 790C from a third server 295N or from the first server 295A or second server 295B. In other embodiments, the client 205 may use other commands, directive or instructions of the HTTP protocol to get, obtain or be sent the portions of the media in any desired unit. For example, in another embodiment, the server 295A-295N may provide a Uniform Resource Locator (URL) to the client 205 to use to obtain the media, or any portions thereof. In further embodiments, the client 205 may send the download requests to the plurality of servers 295A-295N nearly simultaneously or concurrently to each other, or otherwise, within any desired time period between each request.

At step 765, the client 205 receives downloads of portions of the media from the servers 295A-295N over HTTP in response to the HTTP request to download the portions of media at step 760. For example, as illustrated in FIG. 7A, the client 205 may request and receive byte ranges 1 . . . 4 of the media from a first server 295A and bytes ranges n−1 . . . n of the media from a second server 295N. The downloaded portion of media may be received in any type or form of HTTP protocol response or content. The client 205 may receive these downloaded portions of media in any order. In one embodiment, the portions of media are received by the client 205 in sequential order, while, in another embodiment, the portions of media are received in random order. In one embodiment, the client 205 does not receive a response from a first server 295A for a byte range 790A, or received a corrupted or otherwise unusable portion of media so the client 205 requests and receives the byte range 790A from another server 295B-295N.

At step 770, the client 205 stores the downloaded portion of media in storage 260 to form or provide the media in its entirety, intact or otherwise usable by the client 205. In one embodiment, the client 205 uses the shuffling storage technique illustrated in FIGS. 6A-6E above to store randomly received portions of media. In another embodiment, the client 205 stores the portions of media in the file in their correct or desired location in the file as each portion is received. In further embodiments, the client 205 organizes the received portions of media in memory, such as via a data structure or object, and then writes received portions as a single media to a file.

Although the operations of the IDS 120 or IDS client 210 are generally discussed with a single media or media file, the IDS 120 or IDS client 210 may be practiced with multiple media or media files, logically grouped or associated, or otherwise distinct sets of one more media files. Additionally, any of the techniques described herein may be practiced in any combination with this aspect of the IDS 120. For example, the client 205 may use the cache manager 270 and VFS 280 along with the shuffle storage mechanism 610 to store the media to storage 260 of the client 205. In another example, the client 205 may use the flipping technique illustrated in FIGS. 4A and 4B to provide and store the media on the client 205. Furthermore, as will be discussed next in further detail, the client 205 may use one or more delivery strategies or behavior techniques in another embodiment to download the portions of media from the plurality of servers.

In one embodiment, the IDS 120 or IDS client 210 uses a delivery strategy for downloading media or files from one or more content sources. Delivery strategies may be used to balance between download experience and delivery cost in ways desired by each application or user. A delivery strategy specifies one or more download behaviors or techniques for downloading one or more files. A download behavior may be specified as a set of options gathered into one or more of the following categories: 1) direction, 2) sources, 3) schedule, 4) reports, and 5) phases. The direction identifies an order of which portions of a file are downloaded. The source identifies the one or more content sources, by name, type, category or any other suitable manner, from which to download the file. The schedule identifies any type and form of desired schedule or time limits or constraints for downloading, such as for server availability scheduling, client download staggering or client bandwidth management. A report identifies information to be sent to or received by the client, such as client bandwidth usage, user interactions, download speeds, or error rates, related to performance or any other characteristics of downloading. A phase defines information for switching between delivery behaviors, or to change one or more of a direction, source, schedule or report of a delivery behavior during the course of downloading. For example, a phase may change from one delivery behavior to another based on download performance so far or based on an impending due date to complete the download.

In one embodiment, a delivery strategy may be specified and identified in a separate file, such as the delivery strategy file 230 illustrated in FIG. 2A. In some embodiments, a delivery strategy or the delivery behavior of a delivery strategy may be specified or identified via a download order 235, a control script 225, or in any download request received by the client 205, IDS client 210 or download manager 220. In another embodiment, the delivery strategy may be specified in a file on a server 298A-295N in any format, such an the Extensible Markup Language (XML). In some embodiments, one or more delivery strategies may be associated with a user or an application, or a group of users or applications. In another embodiment, a delivery strategy may be associated with a content source by name, type or category. In some embodiments, the delivery strategy is associated with a media or file based on name, type, category or location. For example, a database may identify and associate a delivery strategy with any entity or resource, such as a user, application, or content source.

Figure 8A:
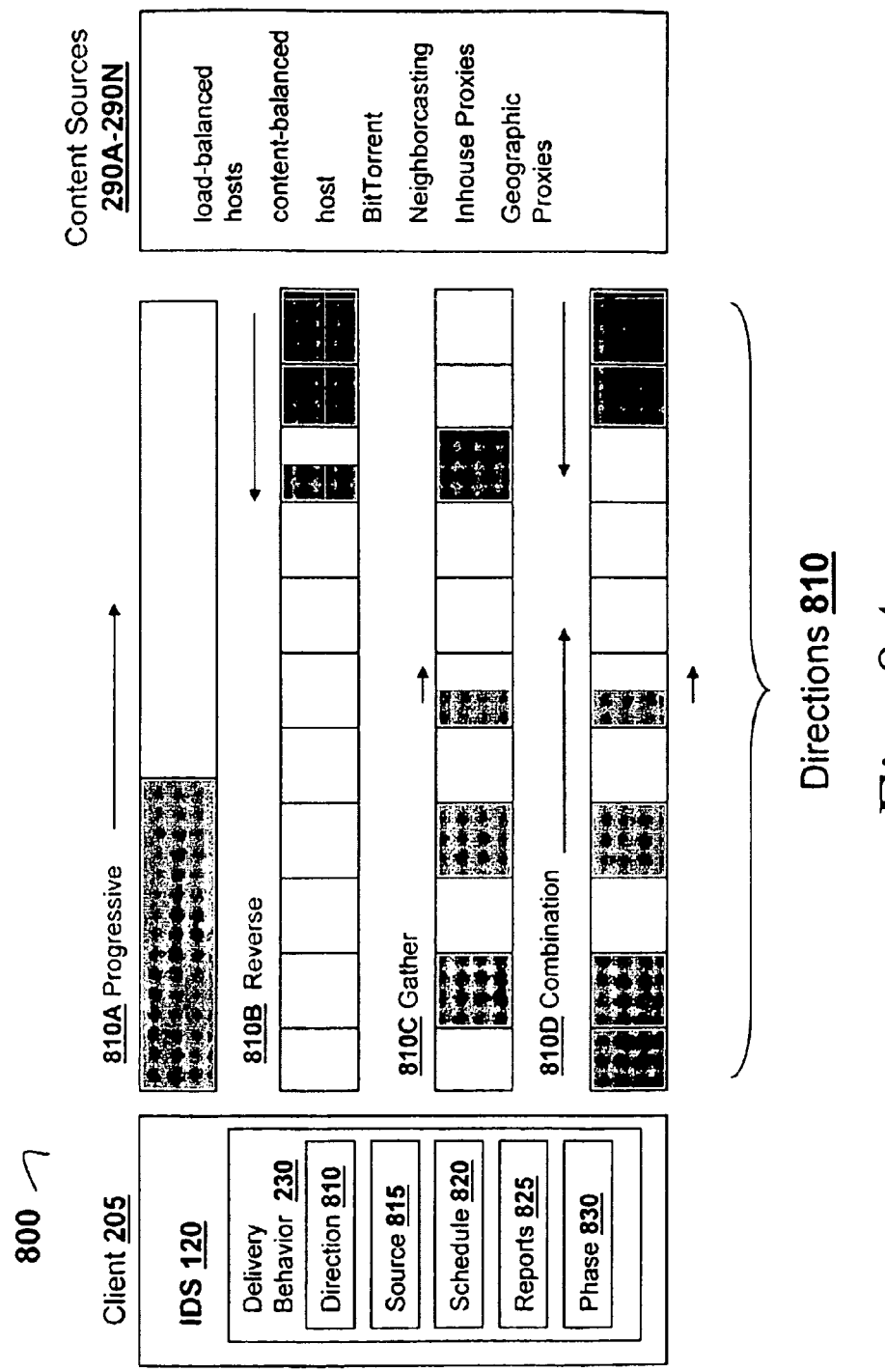
FIG. 8A is a diagrammatic view of another embodiment of downloading according to a delivery behavior.

Referring now to FIG. 8A, the environment 800 provides a diagrammatical view of delivery strategies 810 used between a client 205 and one or more content source 290A-290N. In overview of environment 800, a client 205 comprises the IDS 120 in communication over a network with one or more content sources 290A-290N. The client 205 may use a delivery behavior 230 to download one or more files from a content source 290A-290N. The delivery behavior 230 may identify or specify one or more of the following: 1) direction 810, 2) source 815, 3) schedule 820, 4) report 825, and 5) phase 830. The content sources 290A-290N may comprise a variety of types of content sources providing a range of performance or download characteristics. The content source 290A-290N may comprise any of the following: 1) a load-balance host or server, 2) a content-balance host or server, 3) a peer-to-peer client, host, server or peer, such as a BitTorrent tracker or seed host, 4) an inhouse proxy, 5) a geographic proxy, or 6) may otherwise use neighborcasting to be directed to a content source.

In further detail, the direction 810 of the delivery behavior 230 may identify or specify any of the following types of directions: 1) progressive 810A, 2) reverse 810B, 3) gather 810C, and combination 810D. Any one of these directions 810A-810D may be a default download direction used by the client 205, IDS 120 or download manager 220, and may be a default download direction for a user, application or content source 290A-290N. For a progressive download direction 810A, the download manager 220 of the IDS 120 downloads the content, such as file, from the beginning to end of the content in order, i.e. from front-to-back or start-to-end order. For example, the download manager downloads a first unit of download representing a starting segment of content and a second unit of download subsequently to the first unit of download in which the second unit of download represents a segment of the content following the starting segment.

For a reverse 810B download direction, the download manager 220 downloads the content starting with the end portions of the content in reverse order to the beginning portion of the content, i.e., in reverse order or otherwise from end-to-beginning order. For example, the download manager 220 downloads a first unit of download representing an ending segment of content, and a second unit of download subsequently to the first unit of download in which he second unit of download represents a segment of the content prior to and adjacent to the ending segment. For a gather 810C download direction, the download manager 220 downloads the content in random order or by random portions of the content. For example, the download manager 220 downloads a first unit of download representing a first segment of content, and a second unit of download subsequently to the first unit of download in which the second unit of download represents a second segment of content not adjacent to the first segment.

For a combination direction 810D, the download manager 220 downloads the content using any combination of the directions 810A-810C. In one embodiment, the download manager 220 may download a first portion of the content using a progressive direction 810A, and a second portion of the content using a reverse direction 810B or a gather direction 810C. In another embodiment, the download manager 220 may download a first portion of the content using a reverse direction 810B and another portion using a gather direction 810A. In some embodiments, the download manager 220 downloads a first portion using a progressive direction 810A, a second portion using a reverse direction 810B, and a third portion using a gather direction 810C. For example, the download manager may download a first unit of download representing a segment near the end of the content, and a second unit of download subsequently to the first unit of download in which the second unit of download represents a segment of the content prior to the segment of the first unit of download.

The source portion 815 of the delivery behavior 230 identifies or specifies one or more content sources 290A-290N or servers 295A-295N from which to download content, such as one or more media files. The source specification 815 may be defined or specified using any suitable format, such as text-based, for example, using a markup language, e.g., XML. In one embodiment, the source 815 identifies the content source 290A-290N or servers 295A-295N by host or domain, or by internet protocol (IP) address. In another embodiment, the source 815 comprises the location of a download source by a Uniform Resource Locator (URL). In some embodiments, the source 815 is specified by type or category of content source 290A-290N, such as any of the following: 1) a load-balance host or server, 2) a content-balance host or server, 3) a peer-to-peer client, host, server or peer, such as a BitTorrent tracker or seed host, 4) an inhouse proxy, 5) a geographic proxy, 6) Internet Service Provider (ISP) proxy or 6) may otherwise use neighborcasting to be directed to a content source. In one embodiment, the source 820 identifies to use any default content source 290A-290N known by the client 205, or any portion thereof, for downloading the desired content. In some embodiments, the default source may be configured by user, client 205, or application. In a further embodiment, the source 815 may not be identified in the delivery behavior 230 indicating to the IDS 120 to determine the source or use any suitable source or otherwise, use a default source. In another embodiment, the source specification 815 may indicate a backup content source 290A-290N if a first content source 290A-290N is not available. In other embodiments, the source specification 815 may identify a plurality of content source 295A-295N, and in further cases, specify an order of preference. In one embodiment, the source specification 815 may identify a content source 295A-295N per file or groups of files to be downloaded in a multiple file download order 235.

A report portion 825 of a delivery behavior 230 identifies or specifies information and data to be provided to the client 205 regarding characteristics and performance related to downloading, and in some cases, specifically regarding the downloading performed by the delivery behavior 230. In one embodiment, the report specification 825 of the delivery behavior 230 defines one or more reports to be communicated to the client 205 from a content source 290A-290N, a server 295A-295N, or from another computing device 100 on the network 204, such as a router, switch or bridge. The reports may comprise one or more report templates, or may otherwise identify a report by name, type or category. In some embodiments, the report specification 825 identifies one or more database queries to perform to provide the desired data and information to the client 205. In another embodiment, the report specification 825 specifies to the download manager 220 or any other portion of the IDS 120 to identify, track, and report on any download activity controlled, managed, understood or perceived by the client 205.

The report communicated, received or obtained by the client 205 according to the delivery behavior 205 may comprise information and data in any format, for example a text-based format or a markup language, such as HTML or XML. The report may be communicated via any type and form of suitable interface, such as via an application programming interface (API) provided by the IDS 120. In some embodiments, the report may be communicated as a web-page or otherwise as HTML content. In other embodiments, the report may be communicated as a log file. In one embodiment, the report may be communicated as a download of content in accordance with any of the techniques described herein, wherein the content includes the report or information and data for the report.

In some embodiments, a report may comprise any desired information related to downloading and performance characteristics related to the download behavior 805, client 205, server 295A-2395N, content source 290A-290N, or network 204, in any portions thereof. In one embodiment, the report provides information and data related to usage of bandwidth or network of the client 205. In another embodiment, the report provides information and data related to speed and progress of downloads. In a further embodiment, the report provides information and data related to issues or errors with downloading, including any error rates with underlying network traffic or network performance. In yet another embodiment, the report provides information and data related to or in support of metering or billing for downloads, network access, network usage, or otherwise service or application usage, for example, in a model where the content source 290A-290A comprises an Application Service Provider (ASP).

In one embodiment, a report may include, describe or identify one or more user interactions related to downloading or otherwise using the intelligent delivery system 120. For example, the report may identify an event, such as a mouse click or the selection of a user interface element, triggered by the user in using the IDS 120. In one embodiment, the report identifies what content the user has downloaded or is currently downloading. In another embodiment, the report identifies how much of the content the user had downloaded or is currently downloading. In some embodiments, the report identifies one of the following: percentage of download completed, size of download completed, total number of files downloaded, total size of content downloaded, download directory, most recent downloads, and/or content source for the downloaded content. In other embodiments, the report identifies one or more system, security, application, or intelligent delivery system event generated by the activity or interaction of a user or a system with the intelligent delivery system 120.

The schedule portion 820 of the delivery behavior 230 identifies or specifies in any suitable format a schedule, time related events, and/or time related constraints and time limits. In one embodiment, the schedule specification 820 may identify a download behavior should start and/or complete within a time range and/or data range, such as via any calendar format. In another embodiment, the schedule specification 820 may identify download activities in relation to any events of the user, client 205, download manager 220, or content source 290A-290N. For example, the schedule 820 may indicate to check for new content from a content source 290A-290N on a periodic basis. In another example, the schedule 820 may indicate to start or check for a download upon a user's login to the client 205 or upon idle time of the computing device 100. In some embodiments, the schedule 820 identifies a time or date limit for completing a download, or for completing a percentage or a portion of a download. For example, the download of desired content should not take longer than 1 hour, or if only 50% of the download is received within 4 hours please stop the download. In one embodiment, the schedule 820 identifies a due date or due time for downloading content. In another embodiment, the schedule 820 identifies a scheduled expiration date for deleting the content.

Figure 8B:
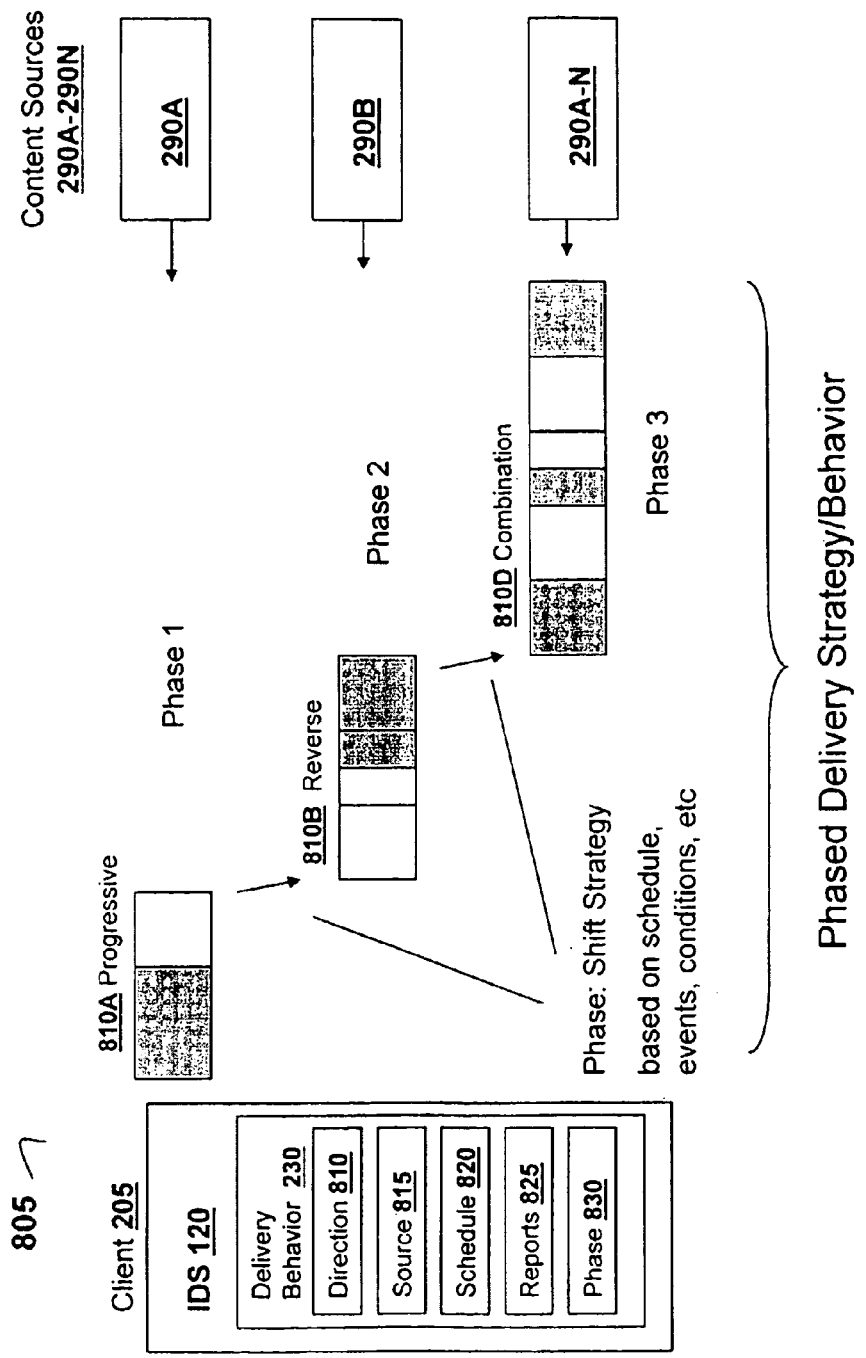
FIG. 8B is a diagrammatic view of an embodiment of a phased delivery behavior.

A phase specification 230 of the delivery behavior 230 defines or specifies information for the IDS client 210 to modify a portion of the delivery behavior 205 being used or to change to or otherwise use another delivery behavior in addition to or instead of the current delivery behavior 230. As such, the phase 230 identifies an event, schedule, report, or other information upon which the client 205 decides to switch between delivery behaviors 230, add one or more delivery behaviors 8705, or to change one or more of a direction 810, source 815, schedule 825 or report 825 of a delivery behavior 230 during the course of downloading. For example, if a download is occurring too slowly in a progressive direction 810A from a first content source 290A, the phase 230 may specify to switch to a reverse 810 direction from one or more other content sources 290B-290N. The phase 230 changes may be specified in any suitable format, such as markup language or scripting language format. For example, the phase 230 may be specified via an application programming interface (API) of the IDS client 205, such as to configure the download manager 220 to behave according to the phase 830 of the delivery behavior 230. The phase 230 may refer to any other portion of the delivery behavior 230, such as a schedule 820 or report 825 to specify when to change phases. Those ordinarily skilled in the art will recognize and appreciate that the combinations of phases 230 that may be specified are wide and many in view of the possible combinations of and differences among delivery behaviors 230. By way of example, FIG. 8B illustrates a phase delivery behavior 830 that will be discussed in further detail in conjunction with the illustrative method depicted in FIG. 8C.

Although the delivery behavior 230 is generally described as being defined from one file or set of information, each portion of the delivery behavior 230, such as the direction 810, source 815, schedule 820, reports 825, or phase 830, may be defined or specified separately in one or more files and associated with a delivery behavior 230. Additionally, the delivery behavior 230 may be specified in any other form or type of data source, such as a database, data structure or object. Furthermore, any type and form of application, such as configuration tool, using an graphical user interface and a database may be used to name, define, and manage delivery behaviors 230.

Figure 8C:
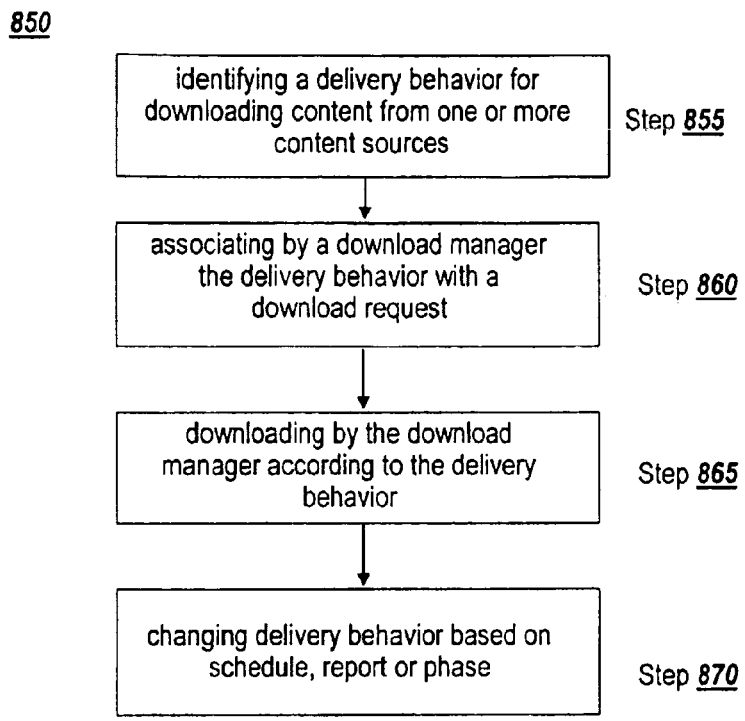
FIG. 8C is a flow diagram of an embodiment of a method performed in practicing one or more download behavior techniques in view of FIG. 8A and FIG. 8B.

Referring now to FIG. 8C, an embodiment of the method 850 is depicted using delivery strategy techniques for downloading content. In brief overview of method 850, at step 855, a delivery behavior 230 is identified for downloading content from one or more content sources 290A-290N. At step 860, the delivery behavior is associated by the download manager 220 with a download request. At step 865, the download manager 220 performs the download according to the delivery behavior 230. In some embodiments, at step 870, the method includes changing the delivery behavior 230 used for downloading based on schedule 820, report 825 or phase 830.

In further details, at step 855, the delivery behavior 230 may be identified by any suitable means to the IDS client 205 or download manager 220. In one embodiment, a download order 235 references, includes or is otherwise associated with a download behavior 230. In another embodiment, a delivery behavior 230 is specified, identified or provided with or included in a download request. At step 860, the download manager 220 associates the delivery behavior 230 with a download request. In some embodiments, the delivery behavior 230 may be associated with the download request as it is referred to or included in with a request, such as by a download order 235. In other embodiments, the download manager 220 may associate a delivery behavior 230 to a download request via a database, data structure or object providing such association. For example, as previously discussed herein, a delivery behavior 230 may be associated with a client 205 or content source 290 identified by the download request. In other embodiments and in furtherance of step 860, the download manager 220 setups, prepares for, or processes the download request in a manner to perform the download in accordance with the delivery behavior 230.

At step 865, the download manager 220 initiates, performs or otherwise causes to perform the download of content in accordance with the delivery behavior 230. In some embodiments, the download manager 220 may communicate to a content source 290 to deliver content according to the delivery behavior 830. For example, the download manager 220 may request a content source 290 to download content in a reverse direction 810B. In other embodiments, the download manager 220 may perform the delivery behavior 230 by modifying a request to the content source 290. For example, the download manager 220 may communicate a get request to a content source to download a random segment of a file, such as in the gather direction 810C. In one embodiment, the download manager 220 may have and execute a set of instructions comprising logic, rules, functions or operations to perform the download accordance to the delivery behavior 230. In a further embodiment, the download manager 220 may execute one or more control scripts 235 designed and constructed to perform a download behavior 230, or any portion thereof.

At step 865, the download manager 220 may complete the download according to the provided delivery behavior 230. At step 870, in other embodiments, the delivery behavior 230 may be changed prior to completing the download by the download manager 220. In one embodiment, the change to the delivery behavior 230 is specified as part of the download request or download order 235. For example, the schedule 820 or phase 830 may identify the change in delivery behavior. In other embodiments, the change to the delivery behavior 230 may be provided after the download request, such as interactively with or in real-time to the download manager 220. For example, a replacement delivery behavior 230 may be communicated to the download manager 220 or entered via a graphical user interface of the download manager 220. In one embodiment, the download manager 220 changes the delivery behavior 230 based on an event, or time related to the schedule 820. For example, a pending due date or time for the download to complete is approach and the download using the current delivery behavior 230 may not complete before the due date/time. As such, in these embodiments, the download manager 220 may automatically switch to use additional content sources 290A-290N or to change a direction 810 to the content source 290A-290N to meet the desired schedule 820.

In another embodiment, the download manager 220 changes the delivery behavior 230 based on inspection or analysis of a report 825. For the example, a report received by the client 205 may include information or data identifying an operational issue with a download or performance of the content source 290A-290N. In some embodiments, the download manager 220 may automatically change delivery behavior 205 based on performance of the download, or status of operation of the client 205, network 204, or content sources 290A-290N. In one embodiment, the IDS client 210, or any portion thereof, such as the download manager 220 comprises executable instructions to perform review, inspection and analysis of the reports, real-time or historically, and in some embodiments, derive statistics therefrom in an intelligent manner to determine any suitable or desired changes to the delivery behavior 230.

In yet further embodiments, the delivery behavior 230 may be changed during the course of downloading as desired and specified by a phase 830. By way of further example to step 870 of method 850 of FIG. 8C and referring now to FIG. 8B, an environment 805 provides a diagrammatical view of a phased delivery behavior for downloading content from content sources 290A-290N to the client 205. In this example, the phase 830 may specify a first source 815, e.g., 290A and a first direction 810A for a first phase of the download, a second source 815, e.g., 290B and a second direction 810B for a second phase of the download, and one of more third sources 815, e.g., 290A-290N and a third direction 810D for a third phase of the download. Between each of the phases, the phase specification 830 may identify or specify a schedule, conditions, events, or other triggers upon which the download manager 220 shifts to the next phase. In some embodiments, although all the phases are specified, the condition to trigger a next phase does not occur and the download manager 220 continues to use the current phase behavior. In some embodiments, no conditions are specified for shifting to a next phase except for time or schedule. With the multitude of schedules, conditions, events and triggers to specify phases in combination with the multitude of choices of delivery behaviors 230, a great multitude of phase shifts can be designed and specified in a flexible manner in accordance with the delivery behavior specification and delivery strategy techniques described herein In some embodiment, a content delivery platform and techniques are used to deliver offline access to online content, such as video, and to provide users with a similar offline experience as experienced online. The content delivery platform and techniques provide for delivering rich interactive media, user interface and broadband content experienced online to a user locally on a client. In delivering video content, the delivery platform and techniques described herein allow users to experience video in improved quality or higher-definition locally with better or improved performance as compared to experiencing video that may be of lesser quality via streaming over a network. Additionally, content providers using the delivery platform and techniques described herein can provide brand and user experience consistency and quality through both the user's online and offline experience with the content provider.

Figure 9A:
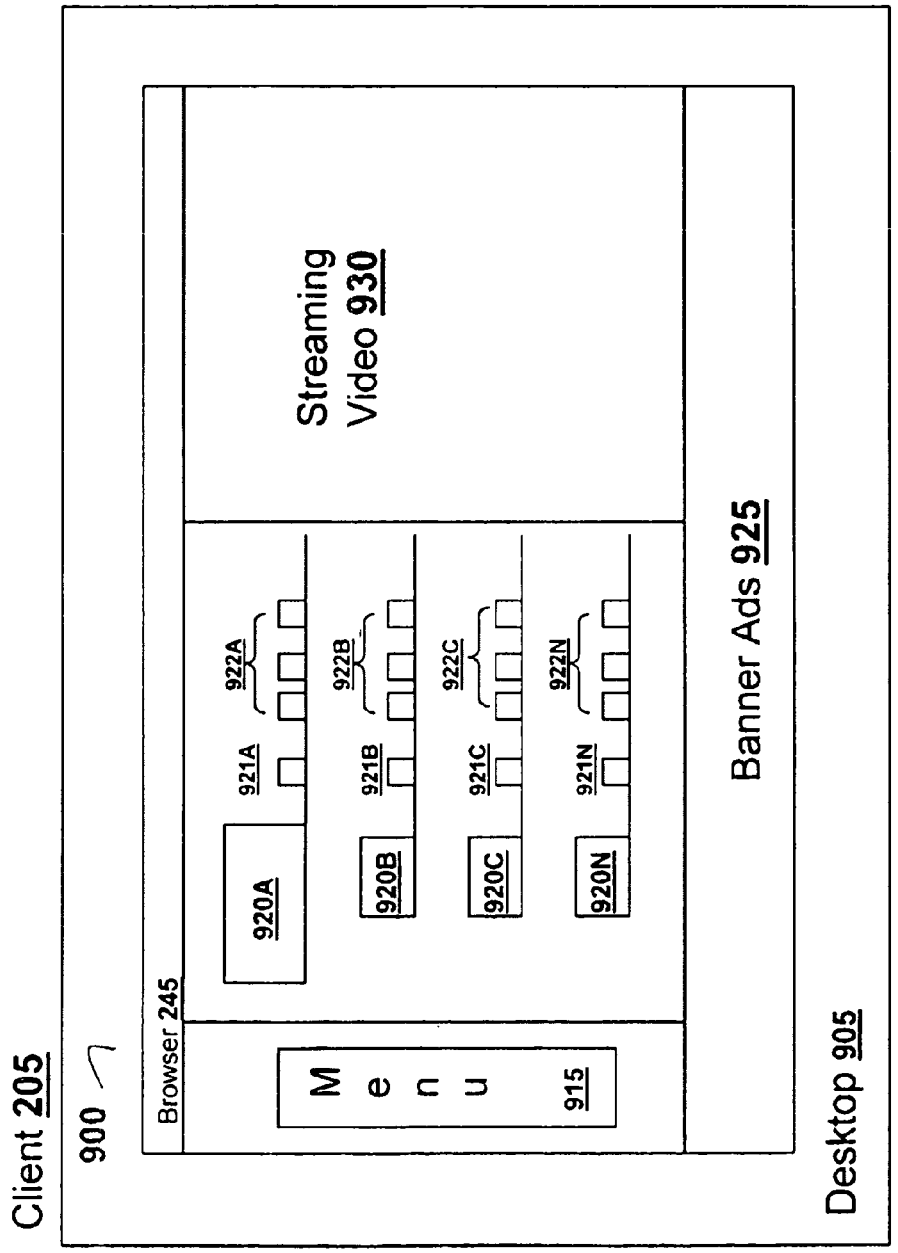
FIG. 9A is a diagrammatic view of an embodiment of the intelligent client delivery system providing a user interface and user experience via online content.
Figure 9B:
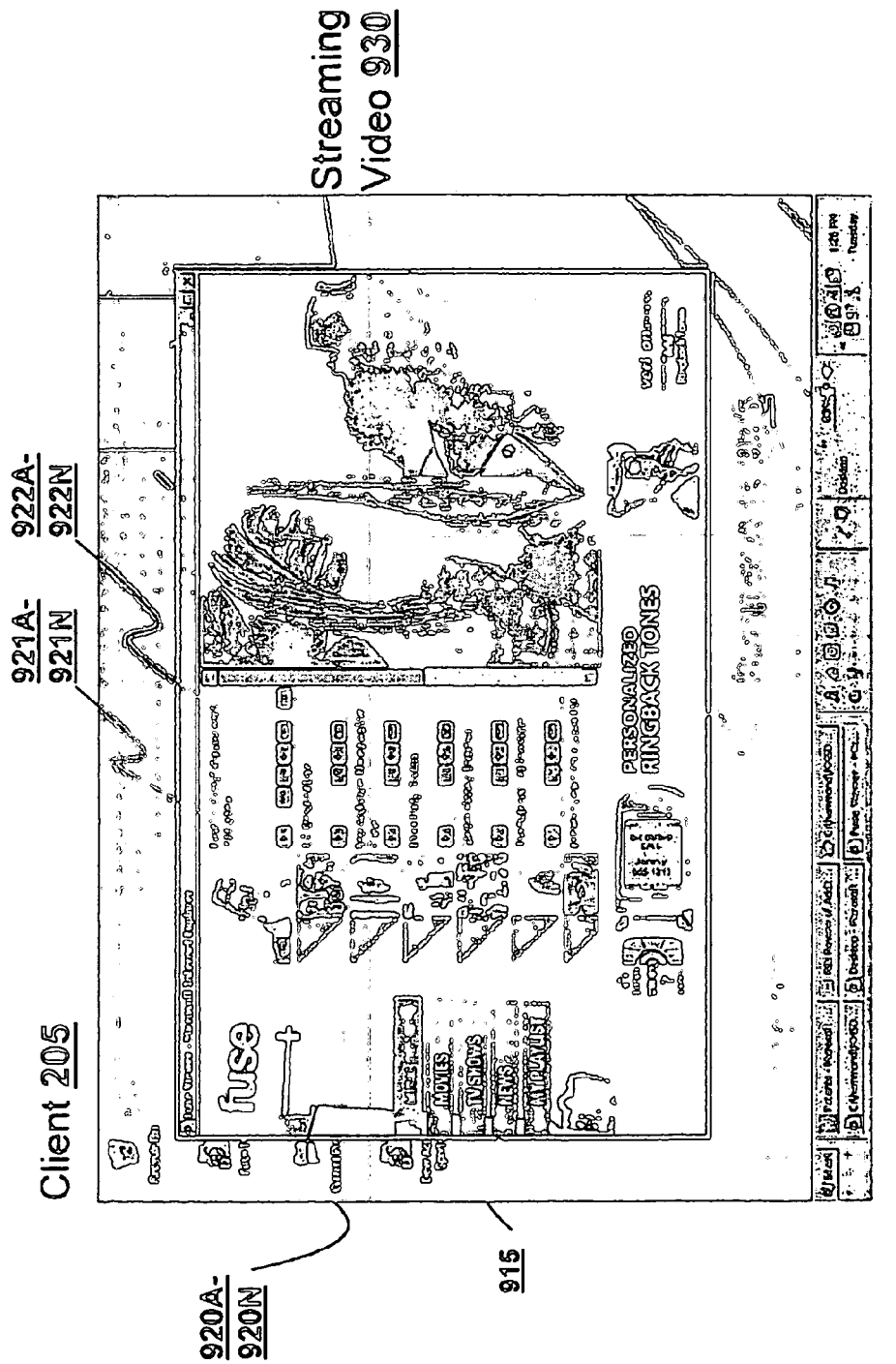
FIG. 9B is an example embodiment of the user interface and user experience of the online content depicted diagrammatically in FIG. 9A.

Referring to FIG. 9A, a diagrammatic view of an environment 900 for providing online content and an online user experience via a network 204. FIG. 9B provides an example illustration of the online content and user experience diagrammatically depicted in FIG. 9A. As described herein the term online refers to a client 205 communicating or receiving communications via a network 204, such as the Internet, to provide a desired operation, functionality or obtain desired information, data or content. For example, an online user experience may comprise a portion of a user interface, content, or media communicate via a network 204 to the client 205, such as video content streamed from a server via a network 204. In contrast and as described herein the term offline refers to a client 205 providing a desired operation, functionality, information, data or content without communicating over the network 204 in one embodiment, or without communicating over the Internet in another embodiment. For example, the client 205 may be disconnected from the Internet or network 204. In some cases, a client 205 may be offline from the Internet but receive local content from a local area network 204. As such, the client 205 obtains the desired information, data or content locally from the client 205 or from the portion of the network 204 available to client although the network 204 may not provide access to the Internet. Those ordinarily skilled in the art will recognize and appreciate the differences between online and offline experience and content in practicing the operations described herein.

In brief overview of FIGS. 9A and 9B, the client 205 is operating a desktop 905 and includes a first application, browser 245, for providing online content and experience from a content provider, such as a content source 290A-290N. The browser 245 provides a first user interface comprising a variety of graphical and textual elements. The user interface may comprise a menu system 915 for providing one or more selectable user interface elements by which a user navigates and interacts with the user interface, and any functionality and content therein. The user interface may also comprise a display of a variety of images of any format, size or resolution, such as images 920A-920N, which may be organized in a hierarchy, group or association, although the invention is not so limited. In one embodiment, each of the images 920A-920N comprises an image of, snapshot, representation, or a portion of a video, such as a video or movie trailer, that the user may desire to view. For example, in some embodiments, a selectable user interface element 921A-921N may provide a means and mechanism by which the user selects the video represented by the corresponding image 920A-920N. In one embodiment, the user interface element 921A-921N represents and comprises a play button to play or stream video media on a media player 215.

Additionally, in the user interface provided by the browser 245, additional user interface elements 922A-922N may be used to provide options, control, or otherwise provide user choices related to experiencing video media. In some embodiments, these user interface elements 922A-922N may be organized as a tool bar and associated with a corresponding image 920A-920N by placement or location in the user interface. In one embodiment, the user interface elements 922A-922N provide options for the user to select to view the video corresponding to the image 920A-920N having a desired characteristic, for example, to view the video in high-definition. In another embodiment, the user interface elements 922A-922N provide an option to the user to download the video to the client 205. In further embodiments, the user interface elements 922A-922N provide controls, such as stop, start, rewind, volume control, etc. for playing the video media.

In one portion of the user interface, a video 930 may be displayed to the user, such as via streaming video media over a network 204. In one embodiment, the video 930 displayed in the user interface depends on the corresponding selection of the user of any of the user interface elements 921A-921N and 922A-922N. In some embodiments, the user interface comprises a media player 215 for streaming the video over the network 204 to provide an online experience via online content. The video 930 may be displayed in any area of the user interface in any size, location or arrangement. The video may be provided in any format with any type and form of characteristics. Although shown with one video 920, the user interfaces of FIGS. 9A and 9B may comprise multiple videos 930.

In terms of video characteristics, such as any desired video characteristic represented or provided via the user interface elements 921A-922N, a video characteristic may comprise one or more of the following as known to those skilled in the art: 1) a resolution, 2) an aspect ratio, 3) a size, 4) a quality, 5) a bit depth per pixel, 6) a compression, 7) a frame rate, and 8) a bit rate. Additionally, video may be described in terms of quality and high-definition. In one embodiment, high-definition generally refers to any video of higher resolution than standard-definition (SD), which includes National Television Standards Committee (NTSC), e.g., analog television and Phase Alternating Line (PAL), which is the color encoding system used in broadcast television systems. In other embodiments, high definition video generally comprises an aspect ratio of 16:9. In some embodiments, high-definition television (HDTV) resolution is at least 1080 interlaced lines or 720 progressive lines. In some embodiments, high-definition video comprises a native resolution of either 720 p (1280×720 pixels: 720 lines progressively scanned with a widescreen 16:9 aspect ratio) or 1080 i (1920×1080: 16:9 widescreen image with 1920 pixels across each of 1080 interlaced scan lines). In some embodiments and in general, high-definition video generally represents an improved performance, quality or characteristics over a standard video representation, or previous standard, high-definition or otherwise, as the case may be.

The user interface presented by the browser 245 as depicted in FIG. 9A and illustrated in FIG. 9B may include one or more areas of the screen for displaying any type and form of banner ads 925, which may be static in one embodiment, and may be dynamic and change over time or use in another embodiment. In one embodiment, the user interface may be in communication via a network 204 to a banner ad content provider, network or service which provides ad content based on any desired criteria or associations, such as keywords or user profiles. For example, the banner ads 925 may be provided via a Uniform Resource Locator (URL) linked to an ad content source 290A-290N. Although one area and location of the user interface is shown with banner ads 925, there may be multiple banner ads 925 in multiple areas, locations and arrangements. Additionally, the banner ads 925 may be associated with the video 930 selection and one or more of the images 920A-920N. In other embodiments, a banner ad 925 is associated with a video ad 925'.

Although the user interface of FIGS. 9A and 9B depicts a particular set, layout, and arrangement of user interface elements, a wide array of different types of user interface elements, layouts, and arrangements that may be used in practicing the operations described herein. In another aspect, a user interface provides a "look and feel", which is an appearance and behavior of a graphical user interface perceived or experienced by the user. The appearance of a graphical user interface can refer to the design aspect of the user interface, in terms of colors, shapes, images, layout, font, typeface, etc. and the behavior of the graphical user interface can refer to the interaction aspect in terms of dynamic elements such as menus, boxes, buttons, dialogs, forms, etc, and user activity such as editing, navigating, selecting, inputting, etc. As such, the browser 245 provides an online user interface with a desired appearance and behavior, or a designed look and feel to provide the user with a desired experience.

Figure 9C:
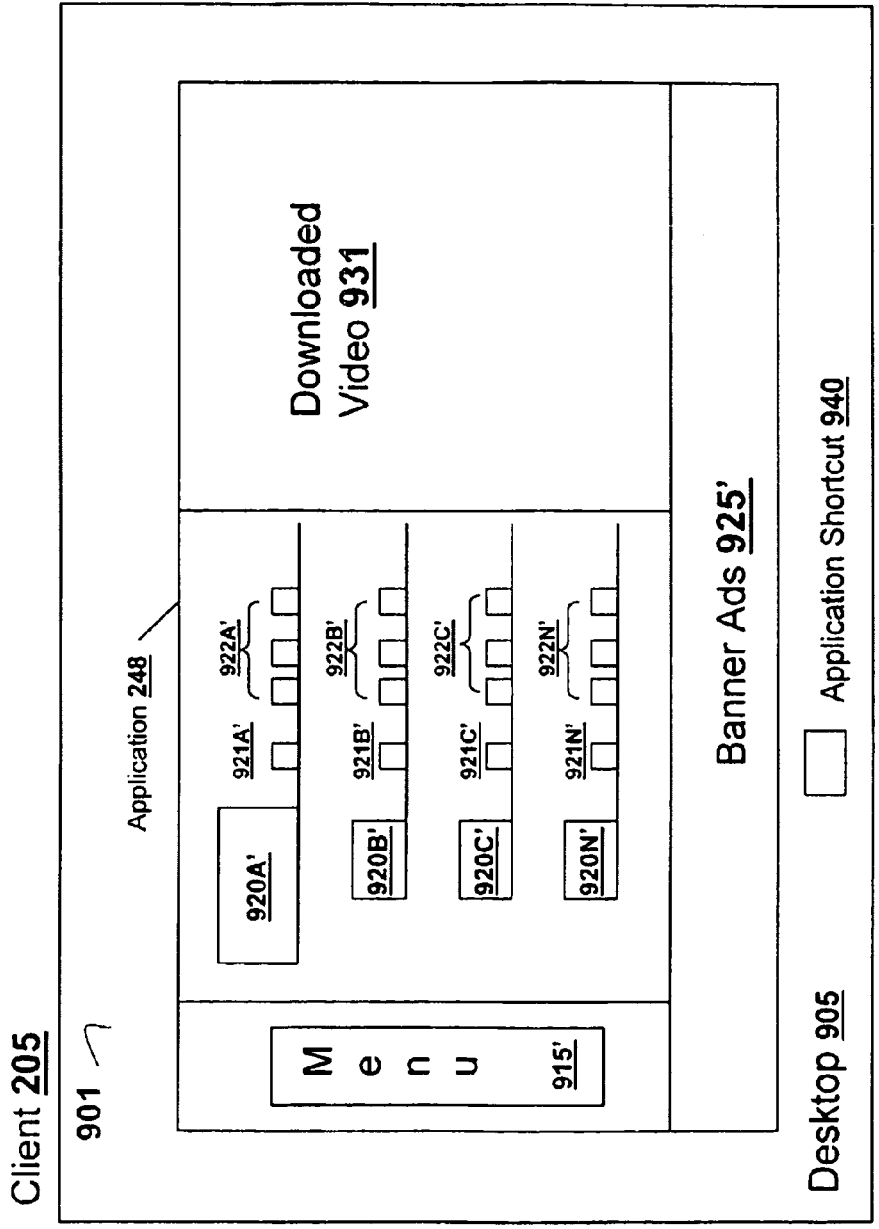
FIG. 9C is a diagrammatic view of an embodiment of the intelligent client delivery system for providing a user interface and user experience via offline content.
Figure 9D:
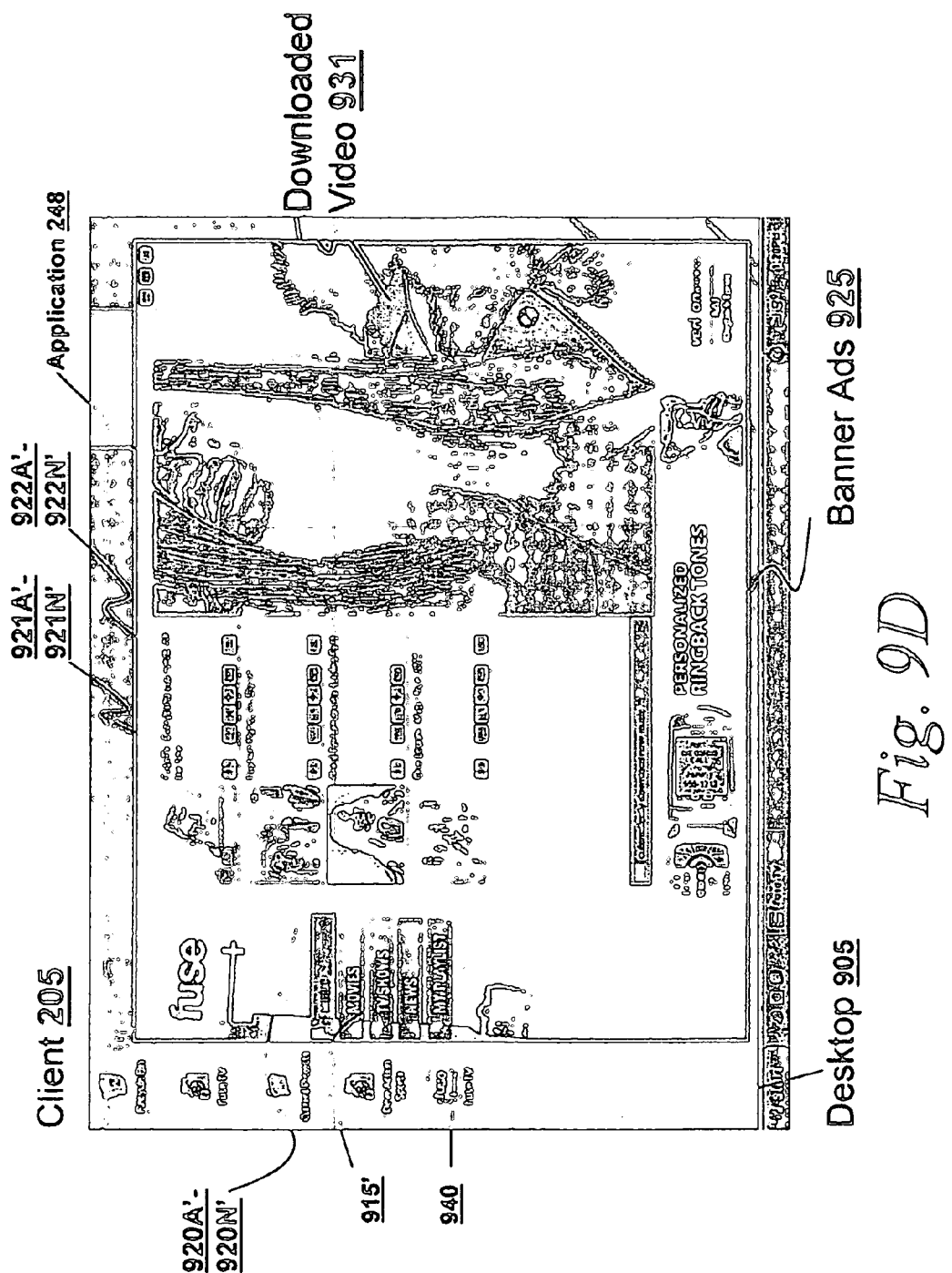
FIG. 9D is an example embodiment of the user interface and user experience of the offline content depicted diagrammatically in FIG. 9A.

Referring now to FIGS. 9C and 9D, another environment 901 of a second user interface is diagrammatically depicted and illustrated by example to provide an offline appearance and behavior or look and feel corresponding to the online user interface of FIGS. 9A and 9B, or desired portion thereof. In one embodiment, the appearance and behavior of the offline user interface is identical to the online user interface. In another embodiments, the appearance and behavior of the offline user interface is substantial similar, closely resembling, or nearly identical to the online user interface. In yet another embodiment, the appearance and behavior of the offline user interface is similar to or resembles the online user interface. As such, any of the user interface elements of the menu 915', images 920A'-920N', banner ads 925', and elements 921A'-921N' or 922A'-922N' of the offline user interface of FIGS. 9C and 9D may be identical, substantially similar or otherwise resemble the corresponding user interface elements of the online user interface. In some embodiments, the online user interface may include additional user interface elements or have user interface elements removed in contrast to the offline user interface, and vice-versa.

In FIGS. 9C and 9D, in order to provide an offline experience and content corresponding to the online user interface, the client 205 comprises an application 248 and the IDS 120. As illustrated in FIGS. 9C and 9D and also discussed in conjunction with FIG. 2A, the application 248 may provide a borderless window and/or otherwise not have any browser decorations on the border. In other embodiments, the application 248 may provide a border decorated window, a browser border or any other borders to have a desired appearance and behavior. The application 248 uses content stored locally to provide the user interface elements of the offline user interface. For example, any of the menu 915', images 920A'-920N', banner ads 925', and elements 921A'-921N' or 922A'-922N'may be provided via content stored locally on the client via a file system or database. In some embodiments, the application 248 uses content stored locally to provide a portion of the user interface and a content communicated via a network, i.e., online content to provide another portion of the user interface. For example, the application 248 may first display the offline user interface with content stored locally in storage and upon detection of a network connection or connection to the Internet, the application 248 provides a portion of the user interface with content from a content source 290A-290N, or otherwise communicated via the network 204.

In one embodiment, the application 248 displays or plays the downloaded video 931 from the storage 260 of the client 205 instead of streaming via the network 204. In some embodiments, the downloaded video 931 comprises a higher-definition video or a desired video characteristic not provided by the streamed video 930 of the online user interface of FIGS. 9A and 9B. As such, in these embodiments, the offline user interface provides an improved user experience of video in quality and speed as compared to the online experience. Additionally, the offline user interface provides a user with a substantially similar user experience as online without connected to or being connected to a network 204 or the content source 290A-290N.

In some embodiments, the online user interface displayed via the browser 245 downloads or otherwise provides to the client 205 the offline user interface displayed via the application 248 automatically or based upon input of the user during the online user interaction. In one embodiment, upon start of the browser 245 or loading or displaying of the online user interface in the browser 245, the IDS client 210 automatically downloads content, e.g., video 931 and user interface elements, for the offline user interface to the storage 260 of the client 205. This may occur transparently to the user as a background process or service.

In another embodiment, the IDS client 210 downloads content for the offline user interface to the storage 260 of the client 205 upon a selection of one of the user interface elements 922A-922N of the online user interface. For example, one of the elements 922A-922N may comprise a selection of the video 910 to be displayed in high-definition or otherwise with a desired video characteristic. In response to the selection, the IDS client 210 downloads the offline user interface content, including the video 931, and in one embodiment, also the application 248, to the client 205, and invokes, launches or executes, automatically or otherwise, the application 248 to present or display the offline user interface with the selected video 931. In some embodiments, the downloading of content in response to the selection of an element of the online user interface may occur transparently to the user or browser 248 of the client 205, such as in the background. In other embodiments, the online user interface may display a progress or status regarding providing the video having the desired video characteristic.

Additionally, the invoking of the application 248 and offline user interface may be performed in a manner that appears seamlessly or transparently to the user to be a part of the online user interface or the online user experience. For example, upon a user's first online visit to the content source 290A-290N via the browser, the application 248 may have not been previously downloaded to the client 205. Upon display the online user interface or upon selection by a user of a online user interface element, the offline user interface content and application 248 may be downloaded by the IDS client 210 in the background. In one embodiment, the application 248 is launched and positioned or displayed in front of the browser 248 to appear as a popup dialog or other form of the online user interface. In another embodiment, the application 248 is launched and the browser 245 is closed, exited, minimized or undisplayed so that the application 248 appears to be the user interface the user should continue to use. In some embodiments, the fact that the application 248 is displaying offline content, such as the video 931, may not be known or otherwise apparent to the user.

In some embodiments, the application 248 is installed on the client 205 with a desktop shortcut 940 to launch the application 248 providing the offline user interface for the user interface, instead of the online user interface via the browser 248. In one embodiment, the desktop shortcut 940 may be installed automatically with the application 248 upon downloading of the application 248, and/or any of the offline user interface content. Although the application 248 is generally described as having a desktop shortcut 940. Other means of accessing, invoking or launching an application 248 from an operating system, for example, by the start menu, task bar, tool bar, etc. may be used in practicing the operations described herein. In another embodiment, if the user accessed the online user interface via the browser 248 after installing the application 248, the browser 248 or online user interface automatically redirects the user's access to the application 248 and the offline user interface. As such, in some embodiments, the content delivery platform and technique provide a continued and enhanced user experience with offline content that is substantially similar to the online user experience and content of a content source but with improved or high-definition video or otherwise with video characteristics desired by the user.

Figure 9E:
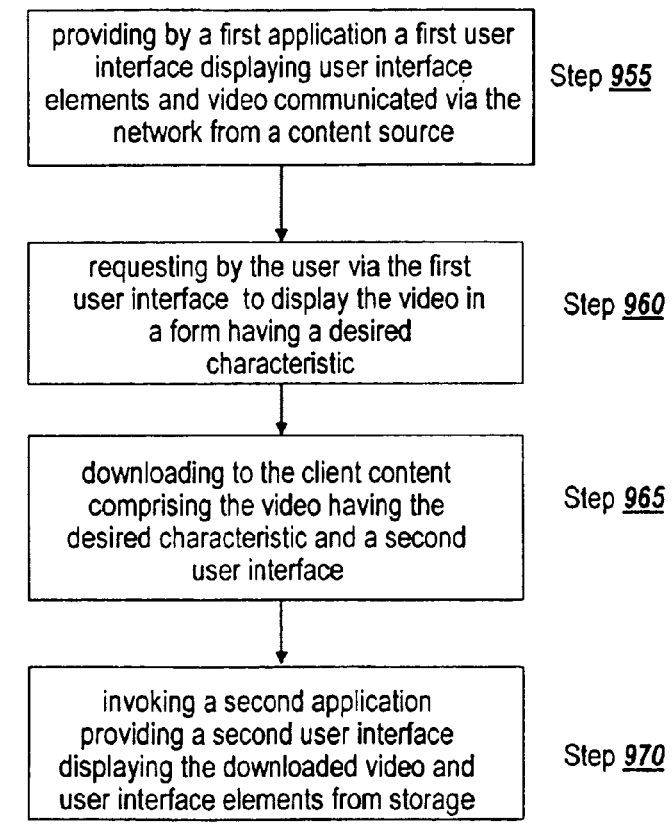
FIG. 9E is a flow diagram of an embodiment of a method performed in practicing a technique of providing offline access to online content.

Referring now to FIG. 9E, an embodiment of a method 950 for providing a user access to offline content is depicted. In brief overview, at step 955, a first application, such as a browser 245, provides a first user interface, e.g. online user interface of FIG. 9A or 9B, displaying user interface elements and video 930 communicated via a network 204 from a content source 290A-290N, i.e., online content. At step 960, a user requests via the first user interface to display the video in form having a desired video characteristic, such as in high-definition. At step 965, in response to the request, the IDS client 210 downloads to storage 260 of the client 205 content comprising the video 931 having the desired video characteristics and a second user interface. At step 970, a second application, such as application 248, is invoked providing a second user interface displaying the downloaded video and user interface elements from storage 260 of the client 205.

In further detail, at method 955, the client 205 may provide a first user interface or an online user interface via any type and form of browser 245 or other type and form of application for receiving and displaying a user interface and/or content communicated via a network 204. In some embodiments, a portion of the first user interface comprises content or user interface elements stored on the client 205, such as cached content. In some embodiments, the first user interface displays a video 930 to be streamed but without yet streaming the video 930. In other embodiments, a portion of the video 930 may be streamed upon displaying the first user interface. In some embodiments, upon providing or displaying the first user interface, the client 205, such as via the IDS client 210, automatically downloads an application 248 for displaying the second user interface of step 970, and any content, video, or user interface elements thereof.

At step 960, a user may request via the first user interface to display the video, such as video 930 in FIGS. 9A or 9B, in a form having a desired video characteristic. In one embodiment, the user selects a user interface elements 922A-922N of the first user interface to request displaying or otherwise playing the video in a desired format, such as high-definition, larger resolution, with certain color depth, etc. In another embodiment, the user may configure a user profile or user preference, such as via the first user interface, that identifies the desired video characteristics of one or more videos by name, type, category, size, compression, download speed or any other characteristics of the video or related to downloading the video.

At step 965, the client 205 downloads at any point in time prior to, upon or after the user request of step 960 the video having the desired characteristic and the second user interface to storage 260 to form or provide the offline content for the application 248. In one embodiment, the client 205 downloads the offline content upon receiving the user request, while in another embodiment, the client 205 downloads the offline content automatically prior to the user request. In one embodiment, the client 205 downloads the application 248 to the client, such as upon a user's first visit or registration at a content source 290, for example registration as a user. In another embodiment, the application 248 is automatically downloaded upon a first request of the user at step 960 for any video provided by the content source 290 or otherwise the first time in using the IDS client 210. As discussed above, the downloading of content may occur transparently to the user or browser of the client 205, such as by a background process of the IDS client 210 or download manager 220.

At step 970, the client 205 invokes a second application, such as application 248 of FIG. 9C or 9D, to provide the second user interface for displaying the downloaded offline content, including the downloaded video and user interface elements, stored in the storage 260 of the client 205. In one embodiment, the second application provides an offline user interface and may be invoked at any point during the displaying of the online user interface of step 955, such as upon the request of step 960 of the user via selection of a user interface element. In other embodiments, the second application is invoked from the desktop, such as via a desktop shortcut 940, instead of using the first application, such as the browser 245. For example, a user may display the online content via the first user interface the first time visiting a content provider, such as a web-site, and from thereafter, use the second application to display the offline content downloaded from the content provider. Additionally, as will be discussed further below, the second application may display the offline content and second user interface having a substantially similar appearance and behavior of the online content displayed by the first application and user interface.

Figure 9F:
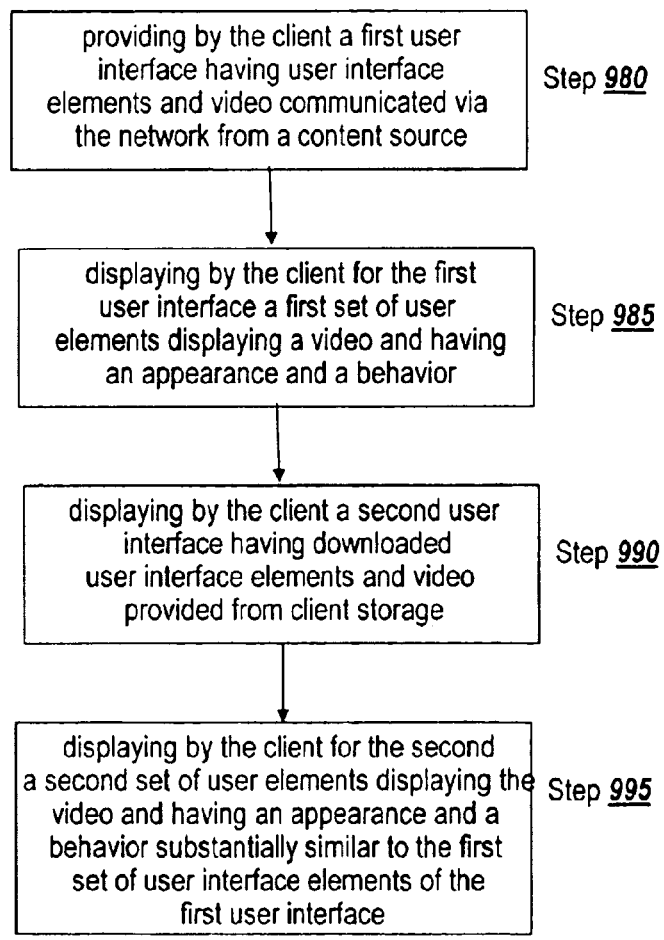
FIG. 9F is a flow diagram of an embodiment of a method performed in practicing a technique of providing a user a similar offline experience as the online user experience.

Referring now to FIG. 9F, an embodiment of a method 975 for providing an offline user experience substantially similar to and/or corresponding to an online user experience is depicted. In brief overview, at step 980, the client 205 provides a first user interface, such as via a browser 245. The first user interface having user interface elements and video communicated via a network 204 from a content source 290A-290N, i.e., such as the online user interface depicted in FIG. 9A or 9B. At step 985, the client 205 displays for the first user interface a first set of user interface elements displaying a video and having an appearance and behavior, i.e., look and feel. At step 990, the client displays a second user interface, such as an offline user interface of FIG. 9C or 9D via the application 248, having user interface elements and video downloaded to and provided by the storage 260 of the client. At step 995, the client displays in the second user interface a second set of user interface elements displaying the video and having an appearance and behavior substantially similar to the first set of user interface elements of the first user interface.

In further detail, at step 980, the client displays a first user interface having user interface elements and video communicated via a network 204, such as the online user interface depicted in FIG. 9A or 9B. In one embodiment, a browser 248 displays the first user interface as a web-page from a web server. In another embodiment, any type and form of application may be used to display online content communicated via a network 204. As previously discussed, the first user interface may display a portion of the user interface from local storage 260 of the client 205, such as cached content, while displaying a portion of the user interface from a network 204, such as the Internet.

At step 985, the client 205 displays at least a portion of the first user interface having a first set of one or more user interface elements related to or otherwise displaying a video 930. The first set of one or more user interface elements has a desired appearance and behavior. In one embodiment, the first set of user interface elements comprises an entire screen area of the first user interface, while in another embodiment, the first set of user interface elements comprises a portioned area of the screen area of the first user interface. In some embodiments, the first set of user interface elements comprises user interface elements of multiple screens, or portions thereof, such as portions of one or more pages the user may navigate via a menu system, hyperlinks or any other suitable means.

At step 990, the client 205 displays a second user interface, such as an offline user interface, via offline content stored on the client 205. The IDS client 210 may download content including a second user interface, or elements thereof, and one or more videos, such as downloaded video 931 of FIGS. 9C and 9D from one or more content sources 290A-290N. In some embodiments, the application 248 may display the second user interface, while in other embodiments, the browser 245 displays the second user interface. In another embodiment, the downloaded video 931 may comprise a higher-definition video of the video displayed by the first user interface at step 985. In one embodiment, the video 931 comprises a desired video characteristic not provided by the streamed video 930 of the first user interface. In still a further embodiment, the video 931 may be a downloaded copy, i.e., same as, of the streamed video 930.

At step 995, the client 205 displays a second set of user interface elements related to or displaying the downloaded video 931. In some embodiments, the second set of user interface elements comprises an appearance and behavior substantially similar to the first set of user interface elements of the first user interface. In one embodiment, the second set of user interface elements corresponds to one of the first set of user interface elements. In other embodiments, the second set of user interface elements comprises a subset of the first set of user interface elements, while in some embodiments, the first set of user interface elements comprises a subset of the second set of user interface elements. As such, in these embodiments, the second user interface or offline user experience provides a substantially similar user experience as the first user interface or online user experience. For example and in view of FIG. 9D in comparison to FIG. 9D, any of the menu 915', images 920A'-920N', banner ads 925', and elements 921A'-921N' or 922A'-922N' of the user interface of FIG. 9D may be identical or substantially similar to the corresponding menu 915, images 920A-920N, banner ads 925, and elements 921A-921N or 922A-922N of the user interface of FIG. 9D.

In some embodiments, the second set of user interface elements may be located or arranged differently in the second user interface and still be substantially similar and correspond to the first set of user interface elements of the first user interface. In other embodiments, the second set of user interface element may be modified in appearance, such as by color, size or font type, and still be substantially similar and correspond to the first set of user interface elements. In a further embodiment, the second set of user interface element may be modified in behavior, such as causing a different processing or communication to occur on the client 205, but still be substantially similar and correspond to the first set of user interface elements of the first user interface. Those ordinarily skilled in the art will recognize and appreciate the various modifications, substantial, slight or otherwise, to the second set of user interface elements that may be designed or constructed and have the appearance and behavior be perceived by the user as substantially similar or resembling the first set of user interface elements.

In another embodiment, a content development platform and tool is used for creating both the online and corresponding offline content from a single development environment. For example, the content development tool allows a designer to create a user interface in a WYSIWYG ("What You See Is What You Get") user interface designing tool and have the content development tool generate from the single user interface two sets of content: one set for the online user interface and a second set for an offline user interface. The second set of the offline content may be generated with a set of user interface elements substantially similar to a corresponding set of user interface elements of the online user interface as discussed above in connection with FIG. 9F. Furthermore, the content development tool provides the designer with the use of a user interface element capable of downloading or causing to download the generated offline content automatically or upon user selection to a client displaying the online user interface as discussed in conjunction with FIG. 9E.

Figure 10A:
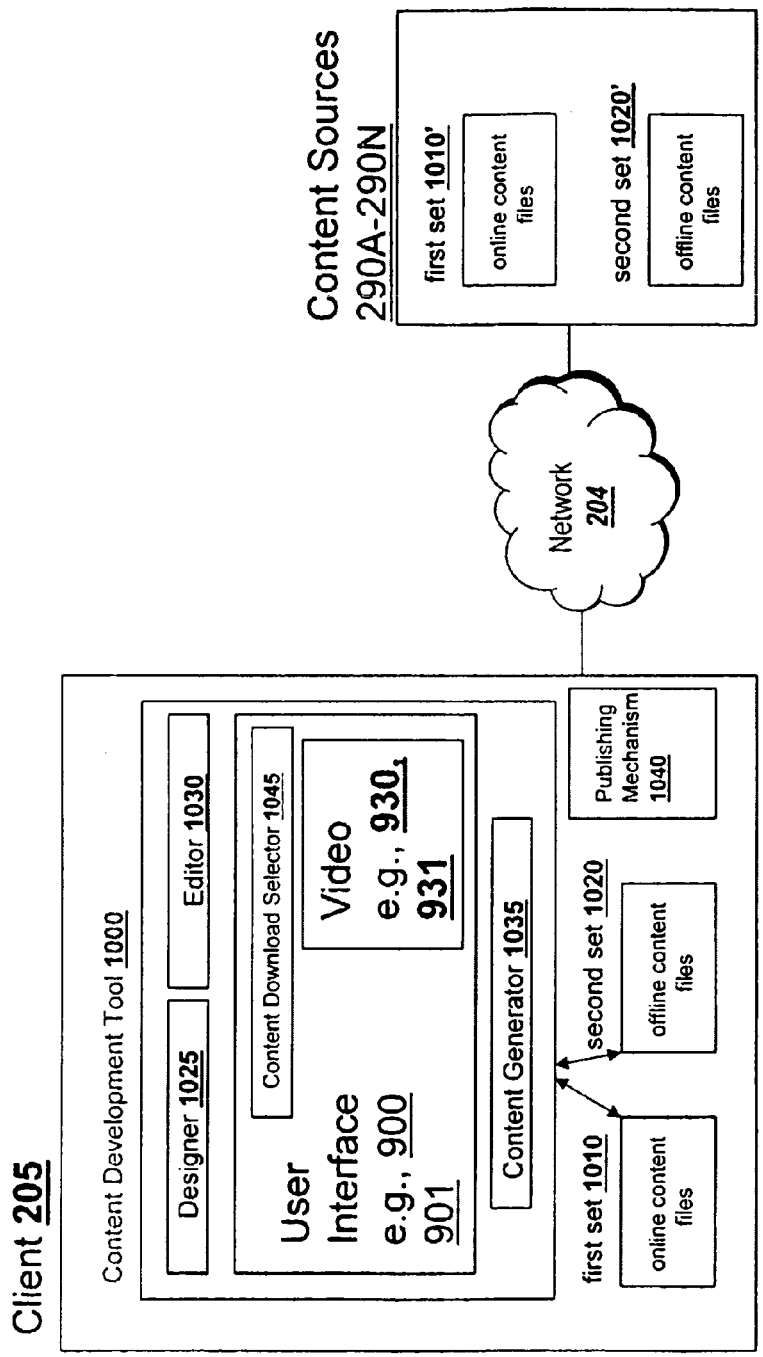
FIG. 10A is a block diagram of an embodiment of the intelligent client delivery system for providing a content development environment.

Referring now to FIG. 10A, an embodiment of the content development tool 1000 is depicted. In brief overview, the content development tool or environment 1000 provides a designer tool 1025 for designing one or more user interfaces, such as any of user interfaces 900 and 901 illustrated in FIGS. 9A-9D. The designer tool 1025 may also be used for designing video content for or via the user interface, such as streamed video 930 or downloaded video 931 content as illustrated in FIGS. 9A-9D. Additionally, via the designer 1025 or editor 1030, the content development tool 1000 provides a user interface element of a content download selector 1045 which provides a mechanism in an online user interface to download a corresponding offline user interface. The content development environment 1000 also includes an editor tool 1030 for managing and publishing content, such as via a publishing mechanism 1040 over a network 204 to a content source 290A-290N. The content development environment 1000 includes a generator 1035 for generating content files from the user interface designed and edited by the designer 1025 and editor 1030. The generator 1035 generates a first set of files 1010 for online content and a second set of files 1020 for corresponding offline content, which may be substantially similar to the online content and include the download mechanism provided by the content download selector 1045.

In some embodiments, the content development tool 1000 operates, runs, executes or otherwise is provided by one or more computing device 100, such as servers 290A-290N. In one embodiment, the content development tool 1000 is hosted on one or more servers 290A-290N, such as a web-server. The content development may present, display or otherwise provide its functionality, operations, and/or user interface via one or more web-pages. In one embodiment, the content development tool 1000 is deployed as an application service provider (ASP) to provide the operations described herein to one or more users via any network connected device 1000. For example, a user may create, edit and publish content via the content development tool 1000 using device 100 connected to a network 205 and using a web browser accessing the uniform resource locator, or web address, of the content development tool 1000. In some embodiments, the content development tool 1000 may be designed and constructed to support multiple users. In other embodiments, the content development tool 1000 is deployed in a client-server model with a client portion of the content development tool 1000 working or operating with a server portion of the content development tool 1000. In yet another embodiment, the content development tool 1000 is deployed in a distributed model with a plurality of portions of the content development tool 1000 running on various computing devices 100 on a network. In still another embodiment, the content development tool 1000 is deployed as an application running on a single computing device 100.

Figure 10B:
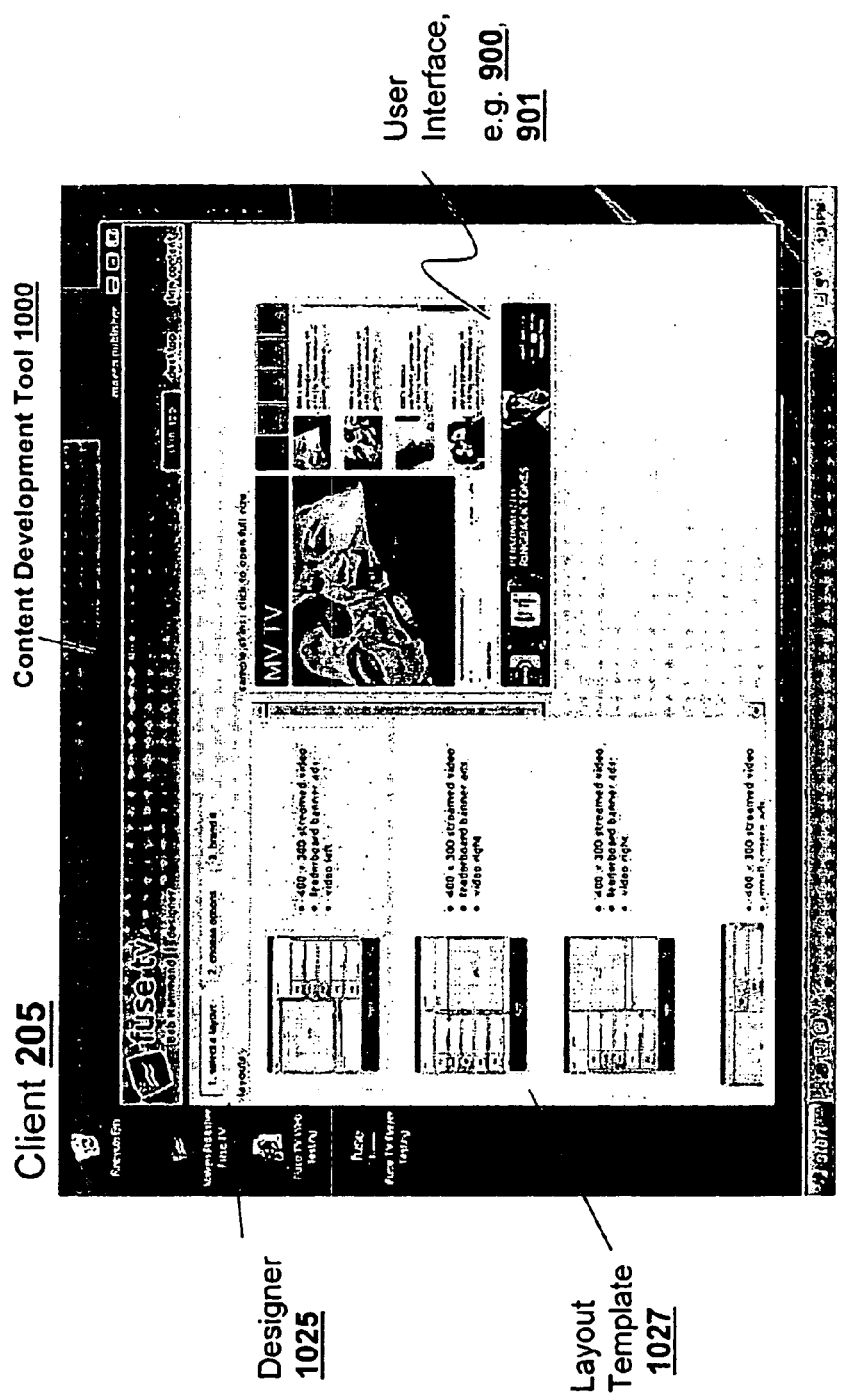
FIG. 10B is an embodiment of the user interface of the designer tool of the content development environment.
Figure 10C:
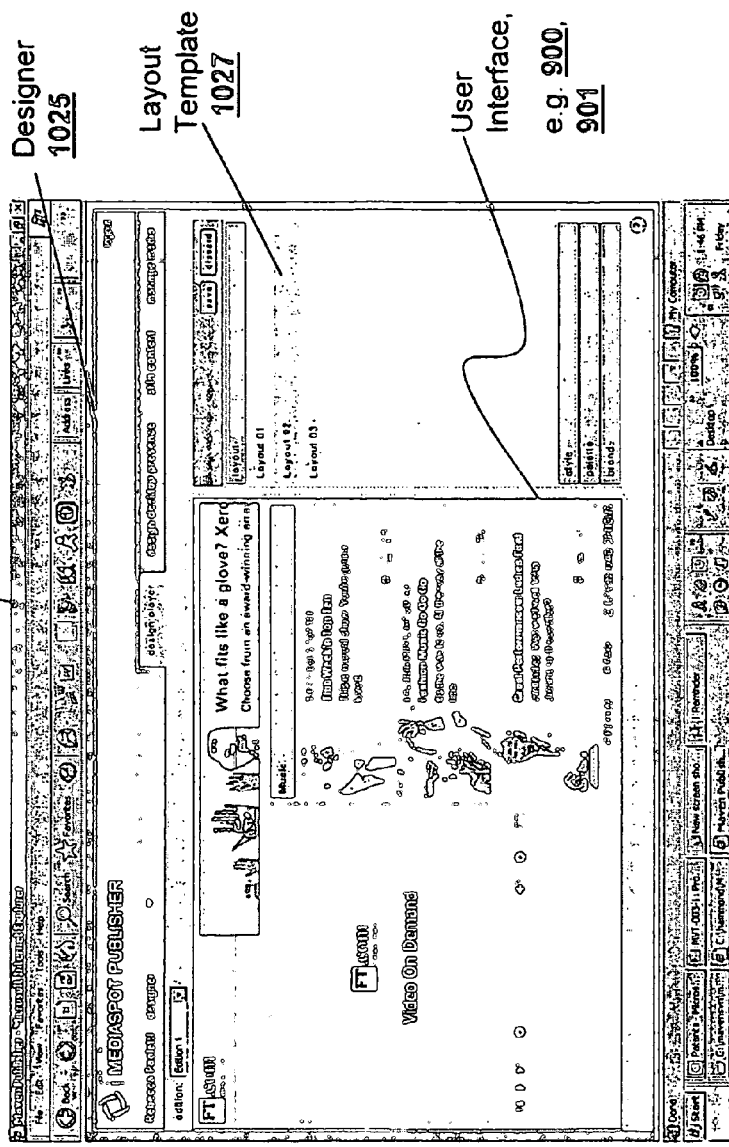
FIG. 10C is another embodiment of the user interface of the designer tool of the content development environment.

In further detail, the designer 1025 may comprise any type and form of mechanism and means for creating, designing, editing, modifying, or otherwise providing a user interface, and the appearance and behavior thereof, and in some embodiments, including video content. As such, the designer 1025 may use any type and form of user interface widgets, components, tool boxes or palettes known to those ordinarily skilled in the art that allow a designer to create, design, arrange, manipulate, or provide graphically, textually or otherwise, the appearance and behavior of a user interface, such as an online user interface communicated via a web server and displayed via a browser 245. By way of example, FIGS. 10B and 10C depict embodiments of a designer tool 1025 that includes a means and mechanism for selecting and using a layout template 1027 from a plurality of layout templates, e.g.

a layout template library, for designing the user interface. A layout template 1027 identifies a selection, design, arrangement, location and/or layout of a variety of user interface elements for the user interface. In one embodiment, a layout template 1027 identifies a portion or area of the user interface for displaying a video of a selected size or resolution, and a portion or area of the user interface for displaying banner ads 925. In other embodiments, the layout template 1027 includes a selection and/or layout and arrangement of user interface elements, such as one or more of the menu 915, images 920A-920N and related media control elements 921A-921N and 922A-922N depicted in FIGS. 9A and 9B. The designer tool 1025 may use a variety of layouts and layout templates 1027 in practicing the operations described herein.

The designer 1025 may also include any means and mechanisms for identifying, selecting, placing or otherwise providing the graphical and visual appearance of the content of the user interface, and the application, such as application 248, for displaying the content. This may also be referred to as "skinning" the application and content. In one embodiment, the designer 1025 provides a mechanism or configuration tool for selecting, identifying and assigning or associating images to user interface elements. Additionally, the designer 1025 may include a configuration mechanism for selecting and assigning a color, font, size or other visual or graphical characteristic of any of the elements of the user interface. In some embodiments, the designer 1025 allows for the configuration of the border and any border decorations of the browser 245 or application 248 displaying the user interface. In one embodiment, the designer 1025 provides a mechanism for designing the application 248 or browser 245 to be borderless. In other embodiments, the designer 1025 provides a configuration mechanism for a designer to create or design a desired layout without using a layout template 1027 or otherwise to design and provide a desired layout template 1027.

Figure 10D:
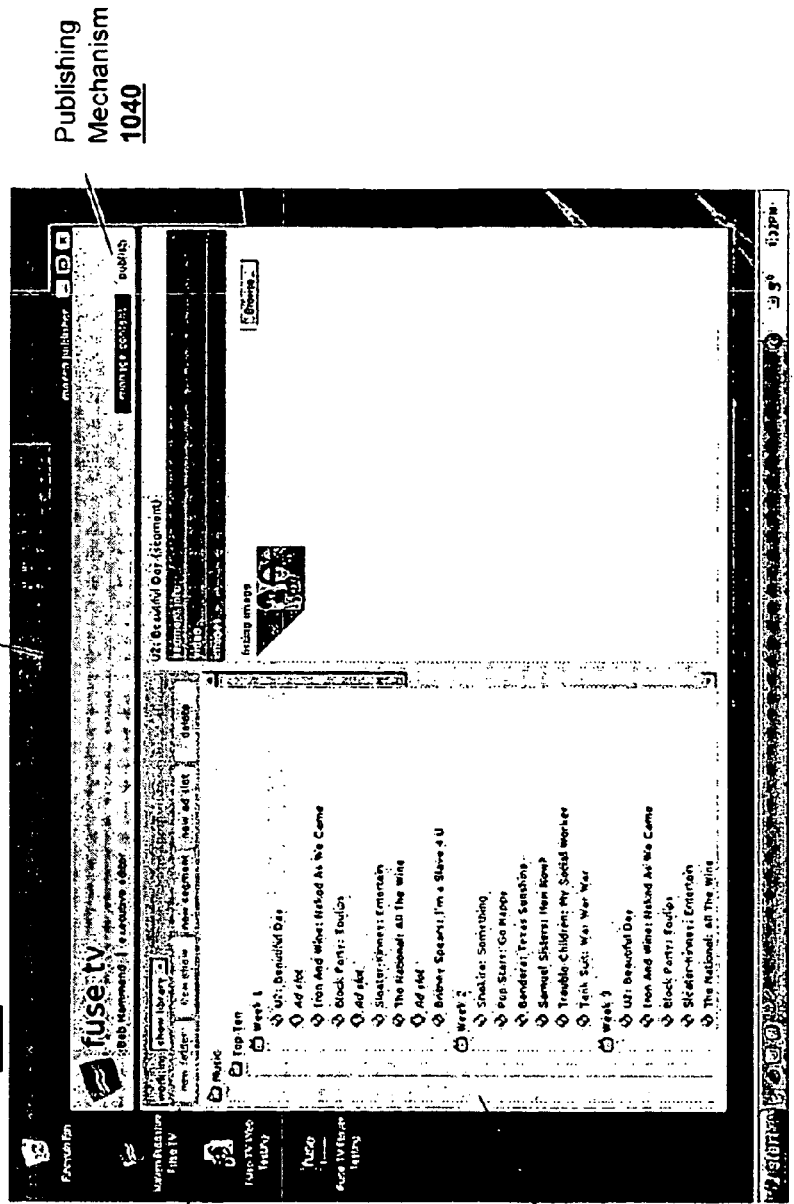
FIG. 10D is an embodiment of the user interface of the editor tool of the content development environment.
Figure 10E:
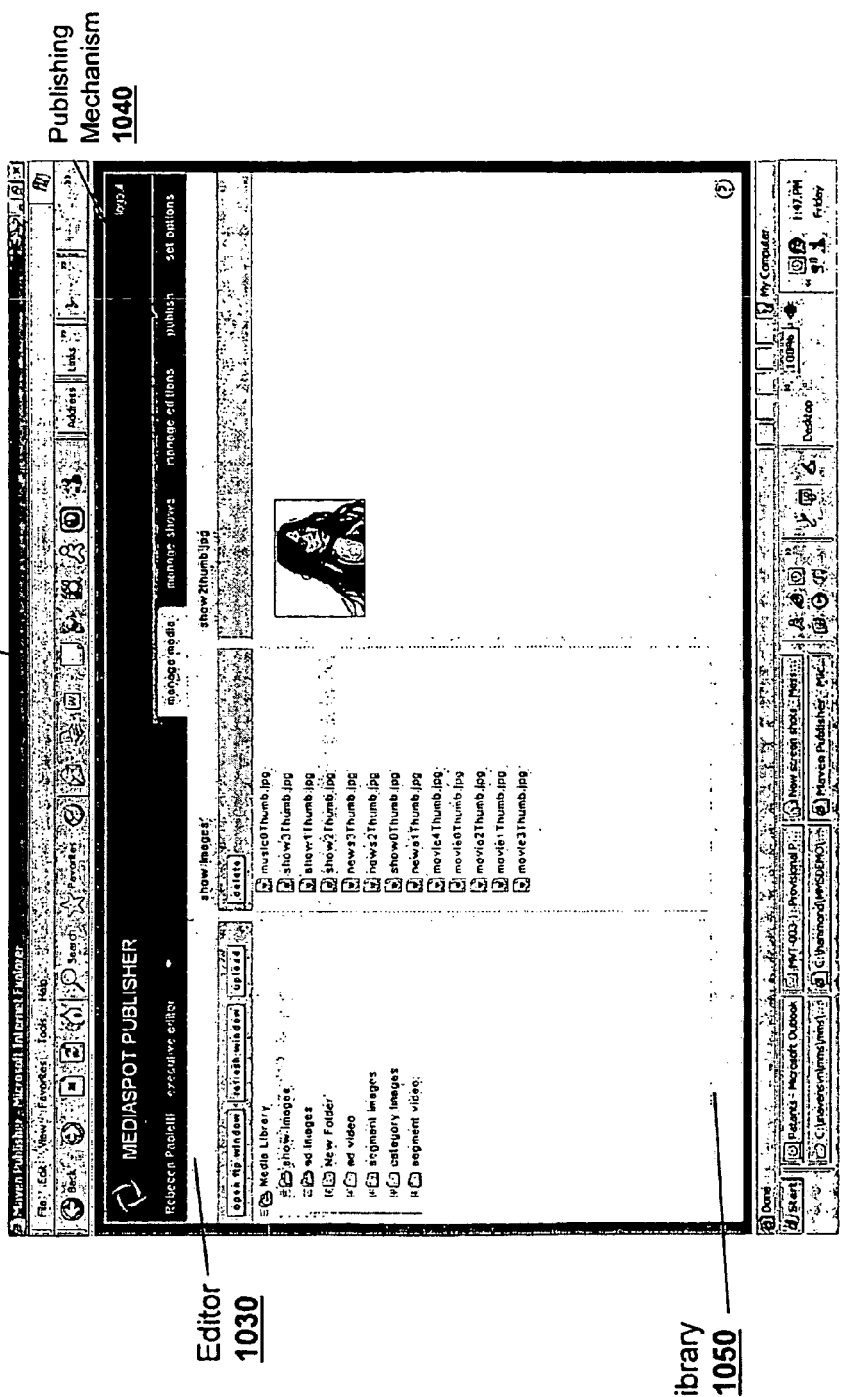
FIG. 10E is another embodiment of the user interface of the editor tool of the content development environment.

The editor tool 1030 of the content development environment 1000 may comprise any type and form of mechanism and means for editing, modifying, arranging, controlling, or otherwise managing the user interface and any content thereof created with the designer tool 1025. By way of example, FIGS. 10D and 10E depict embodiments of an editor 1030. The editor 1010 may provide a user interface means and mechanism for selecting a library 1050 of content, which may include in some embodiments, a selection and arrangement of segments of content, such as images, video and banner ads. In some embodiments, the editor 1030 provides a configuration means and mechanism for adding new content segments and/or new ad slots, or for deleting content segments and ad slots from a library 1050 to provide what is generally referred to as a show, i.e., content target to be played to an audience of one or more users. With the editor tool 1030, an editor, such as an executive editor or producer responsible for the publishing of the content can select and arrange content segments in a desired order with desired video and image sequences along with ads to provide the desired published appearance and behavior of the user interface. Additionally, the editor 1030 may provide a configuration mechanism for creating, editing or otherwise providing information and data, e.g., segment information, related to a segment. Furthermore, the editor tool 1020 may provide a configuration mechanism for creating new libraries 1050 and folders therefore, to provide a show.

Additionally, the editor 1030 may provide a user interface element related to publishing, such as a user interface element interfaced or in communication with the publishing mechanism 1040. As such, the editor can finalize any content, such as an arrangement of content to provide a show, and publish the content or show to desired content source 290A-290N. In one embodiment, the publishing mechanism 1040 includes a user interface or configurator for allowing a user to select, modify or otherwise provide information and data related to publishing content with the content development tool 1000. In some embodiments, the publishing mechanism 1040 may include a means to select, specify or identify the content sources 290A-290N, such as by EP address or host name. Additionally, the publishing mechanism 1040 provides a user interface, such as via the editor 1010, for identifying, selecting or otherwise specifying the set of one or more files, or database of content, providing the content to be published.

The publishing mechanism 1040 comprises a set of executable instruction of any form and type such as a programming language or scripting language, e.g., control scripts 225 for controlling, managing or otherwise providing the logic, function, rules or operations to publish content from one source, i.e., content development tool 1000, to another source, such as content source 290A-290N. In some embodiments, the publishing mechanism 1040 uses any type of protocol, such a file transfer protocol (FTP), a download protocol, or the Common Internet File System Protocol (CIFS) to communicate content from one source, such as the content development tool 1000, to another source, such as the content source 290A-290N via a network 204. In one embodiment, as will be discussed further herein, the publishing mechanism 1040 communicate the first set of content files 1010 providing online content and the second set of files 1020 providing offline content to a content source 290A-290N.

Figure 10F:
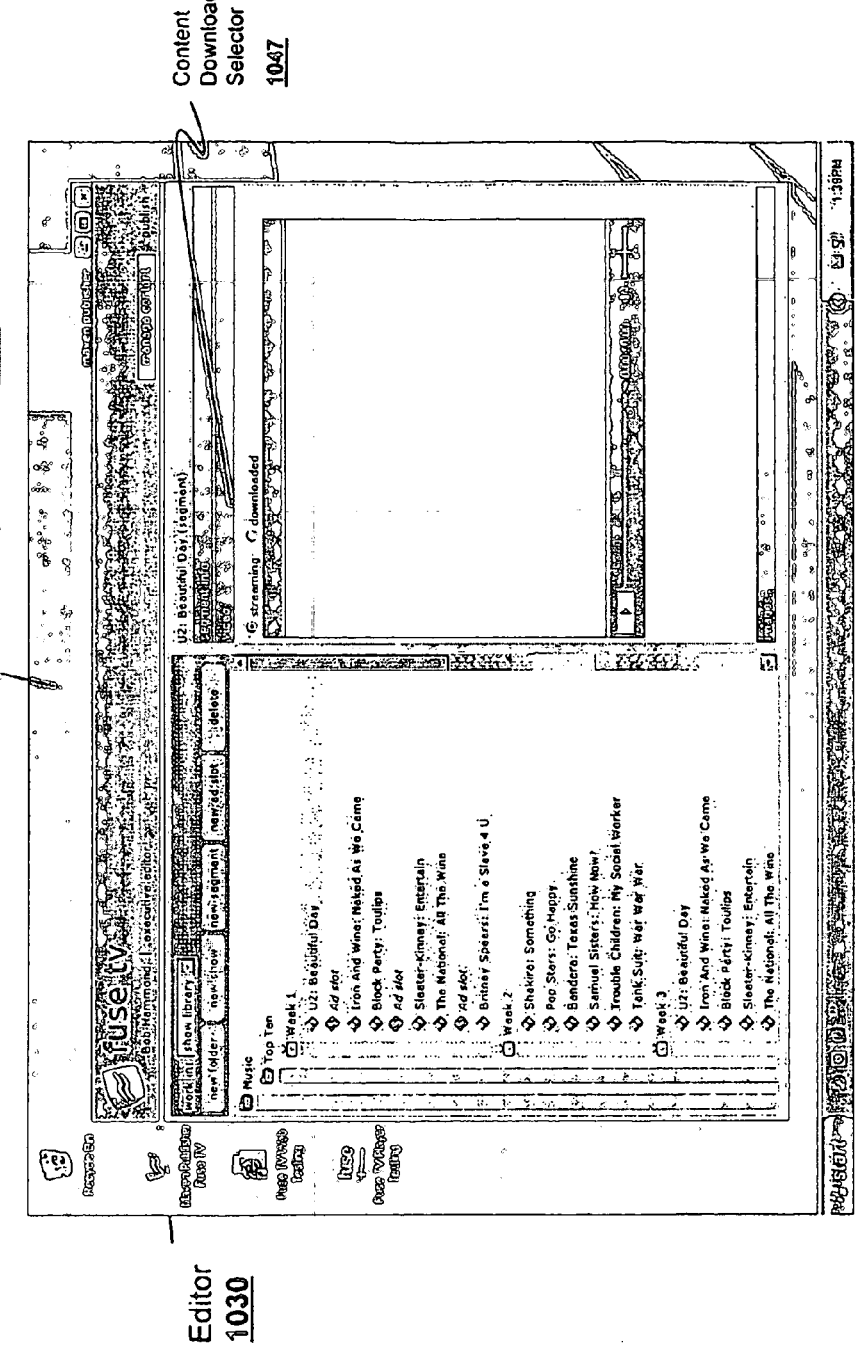
FIG. 10F is an embodiment of the user interface of a content download selector mechanism.
Figure 10G:
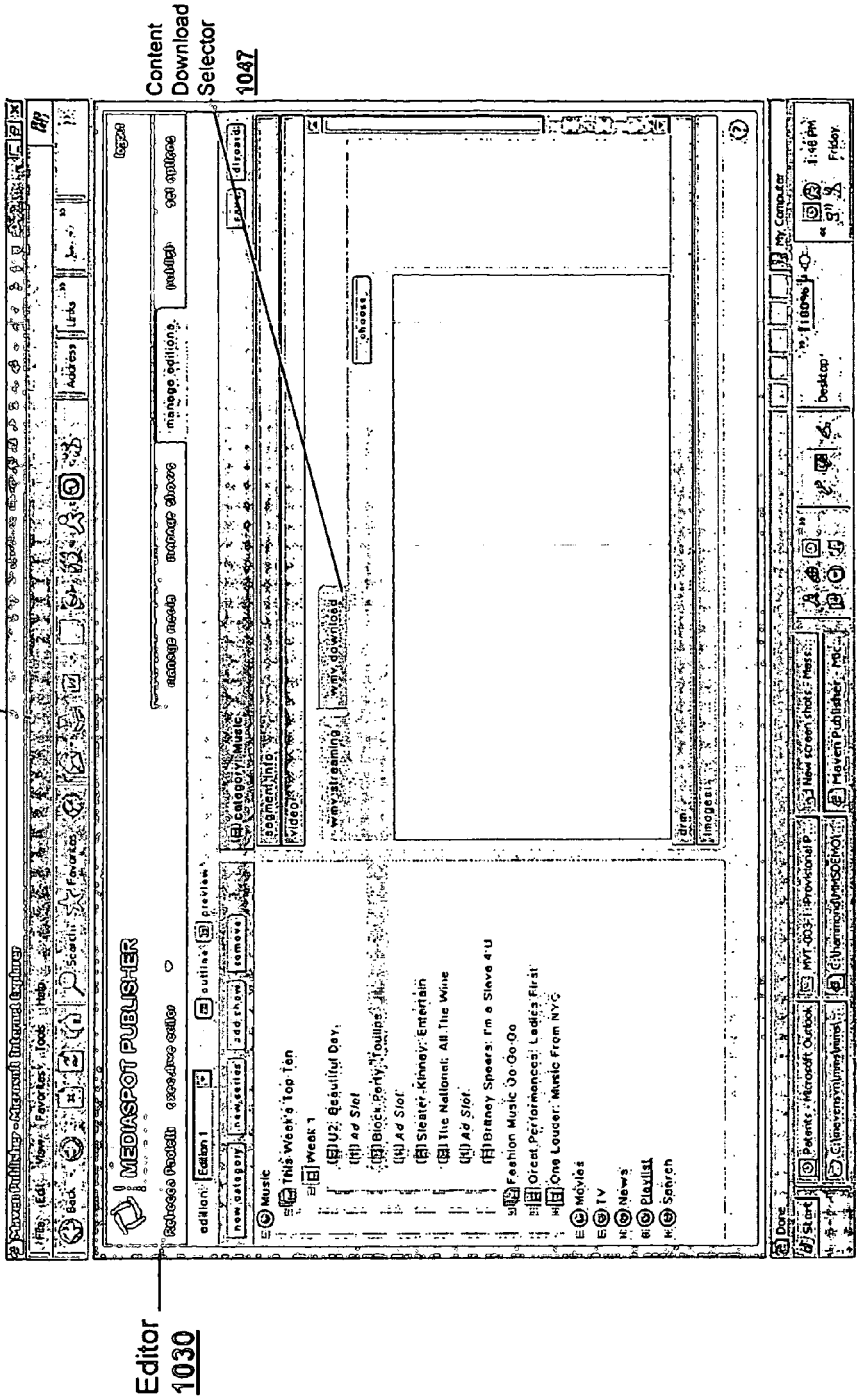
FIG. 10G is another embodiment of the user interface of a content download selector mechanism.
Figure 10H:
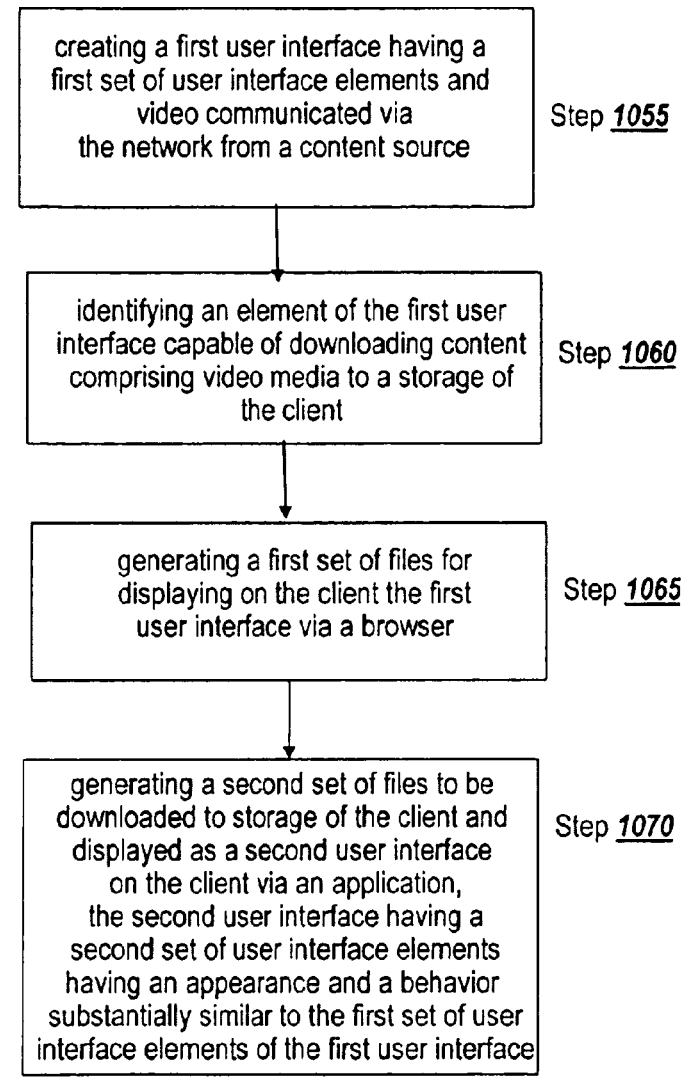
FIG. 10H is a flow diagram of an embodiment of a method performed in practicing a technique of providing offline and online content from a single content development tool.

The content development tool 1000 may also provide a content download selector 245, such as via the designer 1025 or the editor tool 1030, for selecting content of the user interface to be downloaded to a client 205. Referring now to FIG. 10F and 10.G, embodiments of the content development tool 1000 for providing a content download selector 1045 are depicted. By way of example, a video 930 to be streamed may be selected to be downloaded via the content download selector 1045 via any suitable user interface means and mechanism, such as a checkbox element. Although generally discussed or illustrated herein as downloading video content, the content download selector 245 may be used in association with any type and form of content or media provided via the user interface as described herein.

In one embodiment, the content download selector 245 identifies, configures, or provides a user interface element, automatically or otherwise, in the online user interface, such as the elements 921A-921N or 922A-922N of user interface 900 of FIGS. 9A-9B that download content to provide the offline content, such as user interface 901 of FIGS. 9C-9D. As such, the content download selector 245 configures or provides an element of the first user interface, e.g., online user interface, capable of downloading content comprising the video media from a content source 290A-290N to a storage 260 of a client 205, in which the content of the storage 260 provides a second user interface, e.g., offline user interface, having a second set of elements corresponding to a first set of elements of the first user interface and for displaying the video media stored in the storage 260 of the client 205.

The content development tool 1000 may also include a content generator or generator 1035 for generating a first set of content, such as online content files 1010, for an online user interface, and generating a second set of content, such as offline content files 1020, for an offline user interface. The generator 235 comprises any type and form of executable instructions providing the logic, function, rule, or operations for generating content files suitable for representing the user interface developed and/or managed with the content development tool 1000 in both a desired online form and a corresponding offline form. In some embodiments, based on the portions of content identified or selected for downloaded content via the content download selector 245 in the user interface, the generator 235 automatically generates or provides the user interface mechanism and means for downloading such content in the user interface represented by the first set of online content files 1010, such as to provide the online and offline content used by the corresponding techniques discussed in conjunction with methods 950 and 975 of FIGS. 9E and 9F. For example, in one embodiment, the generator 1035 generated the API or function calls, or provides a URL or web request to communicate in the online user interface of thee first set of files 1010 to download the second set of files 1020 or otherwise provide the offline content on the client 205.

The generator 1035 may generate the first set of files 1010 and the second set of files 1020 in any type and form or format desired or targeted for the online content and the offline content. For example, the online content 1010 may include web-based pages, such as HTML files, scripts, images, etc., to publish or be served by a web server. The online content may includes links or URLs to content sources 290A-290N to stream video, such as video 930, over the network 204. Further to the example, the offline content 1020 may include user interface elements, such as layout templates 1047 that can be read and understood by the application 248 in one embodiment of the IDS 120. In another embodiment, the second set of files 1020 is organized into a download package, such as a compressed set of files or a cab file as known to those skilled in the art. In some embodiments, the offline content 1020 includes downloaded video 931 corresponding to streamed video 930 of the online content 1010 but having high-definition or one or more desired video characteristics. In some embodiment and although the formats between the sets of content files 1010 and 1020 may be different, the generator 1035 generates the second set of files 1020 to have at least a second set of user interface elements substantially similar to and corresponding to a first of user interface elements provided by the first set of files 1010. In one embodiment, the first set of content files 1010 includes, references or identifies the second set of content files 1020. In some embodiments, the first set of content files 1010 includes the second set of files 1020 and are published together via the publication mechanism 1040 to a content source 290A-290N as depicted in FIG. 10A. In further embodiments, the first set and second set of content files 1010 and 1020 are managed and published separately to the same or different content sources 290A-290N.

Referring now to FIG. 10E, a method 1050 is depicted for using the content development tool to provide the content files for and in accordance with any of the techniques described in FIGS. 9A-9F. In brief overview, at step 1055 of method 1050, a first user interface is created in the content development tool 1000 having a first set of user interface elements and video communicated via the network 204 from a content source 290A-290N. At step 1060, an element of the first user interface is identified via the content development tool 1000 and the first user interface element is capable of downloading content comprising video media to a storage 260 of the client 205. At step 1065, the content development tool 1000 generates a first set of files 1010 for displaying on the client 1010 the first user interface via a browser 245 or other suitable online content application. At step 1070, the content development tool 100 generates a second set of files 1020 to be downloaded to storage 260 of the client 205 and displayed as a second user interface on the client 205 via an application 248. The second user interface of the second set of files 1020 includes a second set of user interface elements having an appearance and a behavior substantially similar to the first set of user interface elements of the first user interface provided by the first set of files 1010.

In further detail, at step 1055 of method 1050, a first user interface is created in the content development tool 1000 having any desired appearance and behavior. In one embodiment, the first user interface is designed and created using the designer 1025 and/or editor tool 1030. In some embodiments, the first user interface is based on or created with one or more layout templates 1047. In some embodiments, the first user interface is created or provided to display one video 930 or multiple videos 930, 930' streamed via the network 204 from one or more content sources 290A-290N. The first user interface may be created with any type, form, arrangement of user interface elements, such as menus, images, media control functions, etc, and with any type and form of graphical or visual appearance and any type and form of user interactivity or interactions with a server 295A-295N of a content source 290A-290N. In one embodiment, the content development tool 1000 is used to provide a rich interactive media-based show for a content provider to display an online experience to an audience of one or more users on a client and to also provide a substantially similar offline user experience to the users.

At step 1060 of method 1050, an element of the first user interface is identified via the content development tool 1000 for downloading content comprising video media to storage 260 of the client 205. For example, as illustrated in FIG. 10A, a content download selector 245 may be used to select a video for download using the techniques described herein. By identifying this element, the content development tool 1000 provides the mechanism and means for the offline content, or any portion thereof, to be selected for download, automatically or in response to a user input, via the online user interface. As such, the designer 1025, editor 1030 or generator 1035 may create, generate or provide a hook, interface, URL, or other suitable mechanism for the download of the offline content to occur from or based on displaying the online user interface. For example, a user may select an element of the first user interface for displaying the video in high-definition or a desired video characteristic.

At step 1065, the content development tool 1000 generates a first set of files 1010 for displaying on the client 1010 the first user interface via a browser 245 or other suitable online content application. The content development tool 1000 may generate the first set of files 1010 in response to user selection of a menu item in the tool, or in response to the user saving design or editorial work in either the designer 1025 or editor tool 1030. The generator 1035 generates the first set of files 1010 to represent the content in an online user experience or via online access in manner that represents the appearance and behavior of the user interface created with the tool 1000. In one embodiment, the generator 1035 generates the first set of files 1010 to provide an appearance and/or behavior that corresponds to a "WYSIWYG" design approach as those ordinarily skilled in the art would appreciate. In some embodiments, the generator 1035 generates online content in two or more formats: one set of online content in a format for a first content source 290A-290N and a second set of online content in a format for second content source 290A-290N. In some embodiments, the generator 1035 generates online content corresponding to, translating or transforming the user interface designed via the tool 1000 to be displayed on any form factor, which may be constrained or limited, such as a mobile telecommunication device or media playing device.

At step 1070, the content development tool 100 generates a second set of files 1020 to be downloaded to storage 260 of the client 205 and displayed as a second user interface on the client 205 via an application 248. In accordance with the techniques described in conjunction with FIGS. 9A-9E, the second user interface of the second set of files 1020 includes a second set of user interface elements having an appearance and a behavior substantially similar to the first set of user interface elements of the first user interface provided by the first set of files 1010. In some embodiments, the generator 1035 generates a portion, such as a second set of elements, of the offline content 1020 to be substantially similar to a corresponding portion, first set of elements, of the online content 1010. In other embodiments, the generator 1035 generates offline content 1020 or an offline user interface substantially similar to the entire online content 1010 or online user interface. In one embodiment, the generator 1035 generated offline content 1020 including video content to be downloaded with any desired video characteristics, such as video characteristics identified or selected via the designer 1025 or editor 1030. In other embodiments, the generator 1035 generates offline content 1020 that downloads the desired video content from a content source 290A-290N instead of having the video to be downloaded already included in the offline content 1020.

The content development tool 100 may generate any set of files 1010 and 1020 at any point during use of the tool, and may generate the first set of files 1010 and the second set of files 1020 at the same point in time or together or may generate these sets of files and content at separate times. As such, steps 1065 and 1070 may be performed in some embodiments, concurrently, nearly simultaneously or subsequently, or otherwise in conjunction with each other, while in other embodiments, may be performed distinctly and separately from each other. Once the offline and online content files 1010 and 1020 are generated, these sets of files can be published, released or communicated, in a controlled manner or otherwise, to one or more content sources 290A-290N as depicted in FIG. 10A.

In some embodiments, the IDS is related to personalizing downloaded content for one or more users, and controlling and managing access to content on a user or personal basis on a client having multiple users. A user of the client 205 may subscribe to content from any content source 290A-290N by name, type or category and have the content downloaded automatically or otherwise, to the client 205 for access by the user in accordance with access, authorization and accounting policies of the client 205 provided via a media player 215 or the IDS client 215. Using the techniques described herein, access and authorization to content of one user can be controlled and managed so that another user does not have access and authorization to content of another user, or that a particular user can only subscribe, download, and access content of a certain type or category or having a certain content rating. For example, the techniques described herein can be used to provide parent control supervision of content, such as video and audio files, of a younger user on the client 205 so that the user is only allowed to subscribe, download or access content suitable to that user.

Figure 11A:
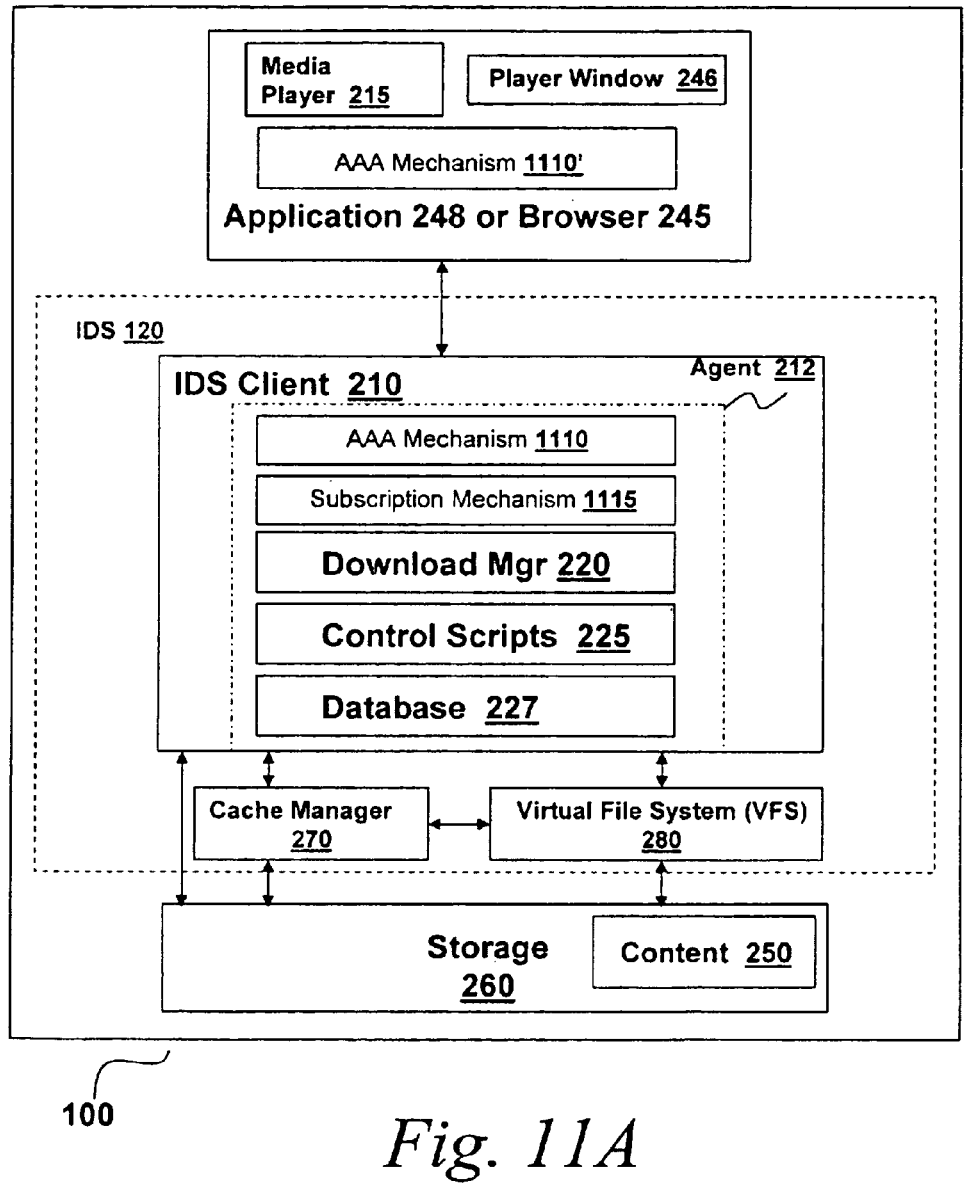
FIG. 11A is a block diagram of an embodiment of the intelligent client delivery system for providing authentication and authorization of users for access to content.

Referring now to FIG. 11A, another embodiment of the IDS client 210 is depicted with an authentication, authorization, and accounting (AAA) mechanism 1110 and a subscription mechanism 1115. The AAA mechanism 1110 provides a configuration mechanism and services for identifying and authenticating who a user is, what the user can access, and/or what services and resources the user is consuming. The AAA mechanism 1110 may comprise software, hardware, or any combination of hardware and software to provide any of the authentication, authorization and accounting configuration and services in accordance with the operations described herein. In one embodiment, the AAA mechanism 110 may identify and authenticate the user using any suitable means and/or mechanism. In one embodiment, the AAA mechanism 1110 may use any identification and authentication mechanism provided by the operating system of the client 205 and as known to those ordinarily skilled in the art. In another embodiment, the AAA mechanism 1110 provides an identification and authentication mechanism distinct from the operating system or otherwise particular to the IDS client 210 and/or media player 215. In one embodiment, the AAA mechanism 1110 may use the database 227 comprising a user identification and corresponding password to authenticate a user. The IDS client 210, media player 215 or the AAA mechanism 1110 may provide a user interface, such as a form of a graphical user interface, to receive input from a user of a user identification and password for the user. In another embodiment, the AAA mechanism 1110 may use the operating system login mechanism for identification and authentication purposes, such as by hooking in or otherwise interfacing to the operating system login service. In other embodiments, the AAA mechanism 1110 may use any ticket authority or ticket service, or any token-based system as known to those skilled in the art to provide identification and authentication of users.

In some embodiments, the AAA mechanism 1110 provides for the configuration of rules or policies regarding what content 250 stored on a client 205 a user or group of users may be authorized to access. In one embodiment, the database 227 is used to store information and data identifying one or more users of the client 205 and identifying authorization of the one or more users to access media files in storage 260 of the client 205. For example, the database 227 may identify a first user and identify rights, permissions or authorization of the first user to view or play a first media file, such as a video stored on the client 205, for example via the VFS 280 and/or cache manager 270. Authorized access may be defined by what content 250 a user can view as stored on the client 205 as an enumerated list, what content 250 a user can play or display via the media player 215 or IDS client 210, what content 250 the user can edit, change, delete, copy, control or otherwise manage on the client 205. In some embodiments, the AAA mechanism 1110 provides rules or policies regarding content a user may download to the client 205 or subscribe to download to the client 205. In some embodiments, the rules or policies may be based on a profile of the user, such as age, gender, interest, hobbies, access or authorization level, or any other suitable characteristic of the user. In other embodiments, the rules or policies may be based on the name, type, category or rating of content or the content source 290A-290N. In some embodiments, the rules or polices may provide limits upon the number and/or size of content 250 to be associated with the user and stored on the client 205. In further embodiments, the AAA mechanism 1110 may provide for aging of content 250 on the client 205 by user, such as any files not accessed by the user for a certain time period is flagged for archiving or deletion.

In another embodiment, the accounting portion of the AAA mechanism 1110 may track and report on the content subscribed, downloaded and accessed by one or more users of the client 205. As such, the AAA mechanism 1110 may identify the times and dates of activity by a user related to subscriptions, downloads and access of content, including in some embodiments, any failed authentication attempts or unauthorized access. In one embodiment, the AAA mechanism 1110 provides for a super-user or administrative control of the database 227, and/or any rules or policies for authentication, authorization and accounting of user and user activity on the client 205. For example, a first user of the IDS client 210 or media player 215 may be assigned administrative access rights to define, specify and configure users, user identification and passwords, access rights for the user, and any other rule or policy for the other users of the client 205. In some embodiments, the AAA mechanism 1110 provides a user interface for the administrative user to configure the database 227 with the desired AAA (authentication, authorization, and accounting) information for each user. In other embodiments, the AAA mechanism 1110 provides a user interface for defining roles or groups of users with respective AAA information and for assigning a user to a role or group.

In some embodiments, the AAA mechanism 1110 may be included with the IDS client 210 such as the agent 212 portion, while in other embodiments, the AAA mechanism 1110', or any portion thereof, may be included with the application 248 or browser 245. For example, the identification portion of the AAA mechanism 1110 may be provided and displayed in the browser 245 while any authorization services of the AAA mechanism 1110, such as via database 227, may be provided via the agent 212. The database 227 and AAA mechanism 1110 may identify any content 250 by a virtual file name and/or a hash code in accordance with the cache manager 270 and virtual file system 280 techniques described herein. In some embodiments, the cache manager 270 and/or VFS 280 are used to provide mangling of file names or otherwise an abstraction of file names to prevent, avoid or hinder unauthorized access to such files.

In one embodiment, the subscription mechanism 1115 may comprise any suitable means and mechanisms for a user to identify content to download to the client 205, automatically or otherwise, from one or more content sources 290A-290N. In one embodiment, the subscription mechanism 1115 comprises a user interface for a user to select from a list of content or content sources by name, type, category or rating. In some embodiments, the subscription mechanism 1115 defines a subscription by a schedule of frequency for download, and whether the download should be automatically downloaded by the download manager 220 or whether the user should be notified of the availability of the content. In further embodiments, the subscription to content of a content source 290A-290N may be a paid subscription, or may be a free subscription. As such, in some embodiment, the subscription mechanism 1115 includes a means and mechanism, such as any logic, function or operation to interface to or provide the content source 290A-290N with user registration information and/or payment information.

In one embodiment, the subscription mechanism 1115 interfaces to or works in conjunction with the AAA mechanism 1110 to provide the user with a selection of content or content sources in accordance with the user's authorization. The subscription mechanism 1115 may store such subscriptions in the database 227 in association with a user. Additionally, the download manager 220 may interface with the subscription mechanism 1115 and/or database 227 to download content in accordance with the defined subscriptions of the one or more users. In other embodiments, the subscription mechanism 1115 may comprise any type and form of interface to the content source 290A-290N to register a subscription of a user with the content source 290A-290N or to receive notification and information regarding the availability of content. In some embodiments, the subscription mechanism 1115 checks for the availability of content on a content source 290A-290N, such as a content source 290A-290N not supporting subscriptions, on a scheduled basis or frequency in order to support and provide the subscription via the client 205.

Figure 11B:
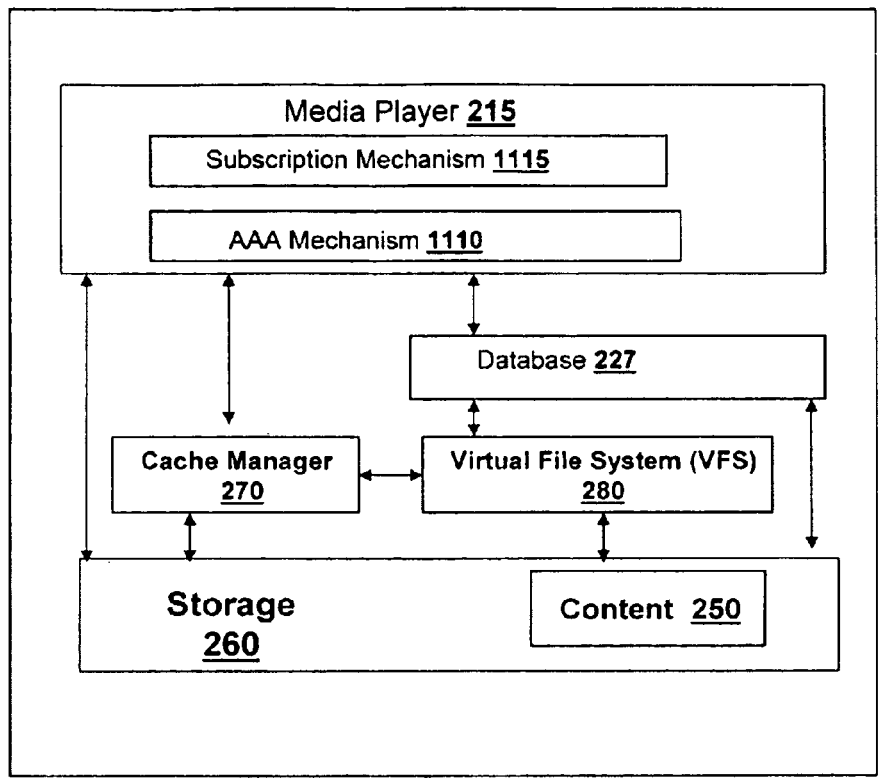
FIG. 11B is a block diagram of an embodiment of a media player for providing authentication and authorization of users for access to content.

Referring now to FIG. 11B, another embodiment of the IDS 120 or IDS client 210 is depicted in which the media player 215 includes the AAA mechanism 1110 and subscription mechanism 1115. In one embodiment, the media player 315 may operate without the IDS client 210, while in another embodiment, the media player 215 may operate with portions of the IDS 120, such as the cache manager 270 or VFS 280. In some embodiments, the media player 215 may be designed and constructed to provide for identifying and authenticating multiple users and controlling and managing the multiple user's access to content on the client 205. For example, the media player 215 may upon starting or execution prompt the user for a user id and password. In some embodiments, the media player 215 may provide limited access to menus and functionality of the media payer 215 when the user is not logged in or if authentication fails. In some embodiments, the media player 215 may access the content in storage 260 directly, such as via the directory and file system 262, in one embodiment. In another embodiment, the media player 215 may use the cache manager 270 and/or VFS 280 portions of the IDS 120 in accordance with the techniques discussed herein to access the storage 260. For example, the media player 215 may include and use an application programming interface (API) to access functionality, logic and operations of the cache manager 270 and/or VFS 280 to control, manage, and provide access to media files in storage 260, such as by virtual file name or hash code. In some embodiments, the media player 215 may use the database 227 for authentication, authorization and accounting configuration and services, and in other embodiments, may interface with any such services or mechanisms provided by the operating system of the client 205.

In some embodiments, the media player 215 includes the subscription mechanism 1115 which may include any portion of logic, functions, and operations of the download manager 220 to provide for the download of content in accordance to a subscription of a user. In other embodiments, the subscription mechanism 1115 may interface with any portion of the media player 215 that may include the functionality to download content or in further embodiments, may interface with a content source 290A-290N to download content to the client 205.

Figure 11C:
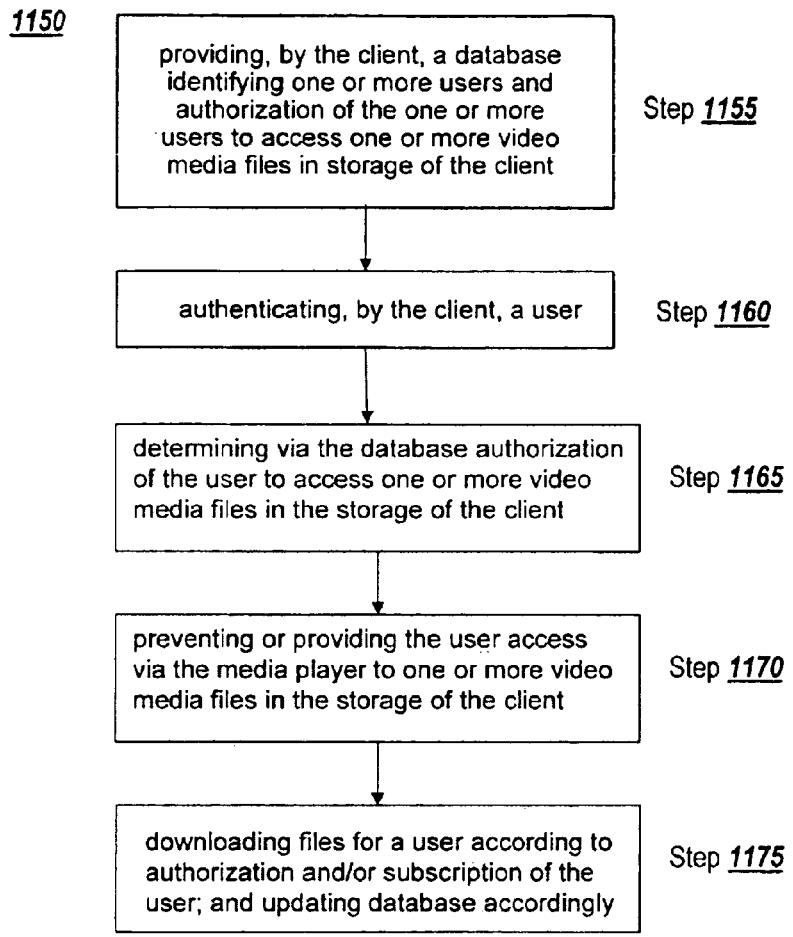
FIG. 11C is a flow diagram of an embodiment of a method performed in practicing a technique of providing authenticated and authorized access to media files.

Referring now to FIG. 11C, an embodiment of a method 1150 for practicing a technique of personalizing downloaded content for a user is depicted. In brief overview, at step 1155, the client 205 provides a database 275 identifying one or more users and an authorization of the one or more users to access one or more media files in storage 260 of the client 205. At step 1160, the user is authenticated by the client 205, such as via the AAA mechanism 1110 of the IDS client 205 illustrated in FIG. 11A or the media player 215 as illustrated in FIG. 11B. At step 1165, the client 205 determines via the database 227 the authorization of the user to access one or more media files in storage 260. At step 1170, the client 2095 either prevents or provides access via the media player to the one or more media files in accordance with the authorization assigned the user. At step 1175, the client 205 downloads content for the user according to the user's authorization and in some embodiments, according to one or more subscriptions of the user.

In further detail, at step 1155 of the method 1150, any type and form of database may be used by the client 205 to provide authentication, authorization, and accounting (AAA) control and policies. In one embodiment, the IDS client 210 as depicted in FIG. 11A interfaces and uses the database 227 to determine and provide authentication and authorization of a user. In another embodiment, the media player 215 as illustrated in FIG. 11B interfaces with and uses the database 227 to determine and provide authentication and authorization of a user. In some embodiments, the IDS client 210 or media player 215 may use any authentication and authorization services provided by the operating system of the client 205 as known to those skilled in the art.

At step 1120, the client 205 may authenticate the user via the authentication mechanism 1110. In one embodiment, the IDS client 210 or media player 215 provides a user interface prompting the user for a user id and password, i.e., user credentials, and validates or verifies the user credentials with the database 227. In another embodiment, the authentication mechanism 1110 interfaces with or otherwise uses the authentication service of the operating system for either local client or network access, such as a login window, i.e., winlogin process in Microsoft Windows family of operating systems. For example, the IDS client 210 or media player 215 may use a single logon procedure with the operating system's network or local client login. In some embodiments, the client 205, the IDS client 210 or media player 215, such as via the authentication mechanism 1110, provides a notification, such as a dialog or popup form indicating the user was not authenticated or to try providing the user credentials again. In one embodiment, the authentication mechanism 1110 allows a user to re-try a login or authentication a certain number of times, upon which the user may need to contact an administrator. In some embodiments, upon a failed login attempt, the user is assigned authorization of a guest or limited user for purposes of accessing content on the client 205.

At step 1165 of the method 1150, the authentication mechanism 1110 of either the client 205, IDS client 210 or media player 215 as the case may, determines the authorization of the user authenticated at step 1160 via the database 227 to access content of the client 205, such as video and/or audio media files. In one embodiment, the authentication mechanism 1110 determines a enumerated list of media files in storage 260 to which the user has authority to access. In some embodiments, the enumerated list may be empty or a zero length list as the user might not have any access to the media files in storage 260 or there may not be any media files yet under control and management of the IDS client 210 or media player 215. In other embodiments, the authentication mechanism 1110 may determine the type of access authorized for the user for each media file associated with the user or otherwise, which may include access to view the listing of the media file in a media player, e.g., an enumerated listing, access to play or display the media file, access to change the name, properties, such as authorization rights, or other characteristics of the media file, access to copy the media file or burn the media file to another media, access to delete the media file, access to subscribe or download the media file by name, type, category or rating, or any other desired type of access. In some embodiments, the authorization of the user in the database 227 is configured as a parental controlled mechanism by which an administrator, e.g., parent, configures the access rights of the user only to suitable content defined by any policy or ruled or only for content desired by the administrator for the user to access.

At step 1170 of the method 1150, the client 205, IDS client 210 or media player 215 provides access to the media content in accordance with the authorization of the user to such files as identified in the database 227 at step 1165. In one embodiment, if the user has authority to access and play the media file, the user is allowed to display or play the media file in the IDS client 210 or media player 215. In another embodiment, if the user does not have authority to access the media file, the IDS client 210 or media player 215 prevents the user from accessing and/or displaying and playing the media file. If the user is not authorized for access or a type of access, the IDS client 210 or media player may present or display any type and form of user interface notifying the user of such denied access. In some embodiments, if the user attempts too many times to access a media file in an unauthorized manner, the IDS client 210 or media player 215 may not allow any further access by the user to any media files or may otherwise prevent authentication of the user or further use of the IDS client 210 or media player 215.

In some embodiments, a first user and a second user have the same access rights to the same media file, while in other embodiments, the first user may access the media file while the second user is not allowed to access the media file. In additional embodiments, a first user may have access to list and play the media but otherwise not to edit, manage, or copy the media, while a second user has access to edit, manage and copy the media in addition to listing and playing the media. In one embodiment, a first user and a second user may not have any access rights to a particular media file. In further embodiments, the user may be an administrator, a super-user or otherwise a highest access level user and may have access without limitation to all the media files in storage 260 of the client 205. Various combinations of different access levels may be authorized to a plurality of users in practicing the operations described herein.

At step 1175, the client 205, IDS client 210, or media player 215 may download content to the client 205 according to the authorization of the user. For example, a user may attempt to download content from a content source 290A-290 and the download manager 220 may check with the authentication mechanism 1110 if the user is authorized to download such content. In some embodiments, the content is downloaded based on a subscription of the user, such as via the subscription mechanism 1115. For example, the download manager 220 may automatically download content for a user based on a subscription managed by the subscription mechanism 1115. The user may only be able to define subscriptions to content for which the user is authorized and therefore, the download manager 220 or media player 215 can download the content based on the subscription without first checking with the authentication mechanism 220. In other embodiments, the download manager 220 or media player 215 checks if the user is authorized for such a download based on the subscription. For example, the user's authority to access the subscription may be changes, such as by an administrator. Upon downloading content for a subscription or otherwise, the IDS client 210 or media player 215 may update the database 227 to associate the appropriate user or users with the downloaded content and identify the authorization of the user or users to access the downloaded content.

The techniques described in conjunction with FIGS. 11A-11C can be used to download a media file once, such as a video, to storage of the client 205 but control and manage the access to the media file by multiple users and different types of users As such, the IDS 120 or IDS client 210 provides a multi-user platform for downloading and playing media on a client 205 and providing authentication, authorization and accounting services, policies and rules for downloading, such as via subscription, and storing the media on a user basis.

In another embodiment, the IDS 120 or IDS client 210 performs techniques related to synchronizing the playing and downloading content of a user among computing devices. In view of the network environment 1200 depicted in FIG. 12A, content streamed from any of the content sources 290A-290N may be synchronized on a per user basis between a first client 205A and a second client 205N, such that user may continue streaming on the second client 205N from a play position, e.g., a stop position, associated with streaming on the first client 205A. Likewise, the playing of downloaded content, such as a video media file, on a first media player 215A may be synchronized with playing of the video media file on a second media player 215N for a user such that the second media player plays from a play position associated with the user on the first media player 215A. Furthermore, the downloaded content for a user stored on a second client 205N may be synchronized with the user's content stored on the first client 205A such that the content associated with a user is automatically available as the user roams from computing device to computing device.

Figure 12A:
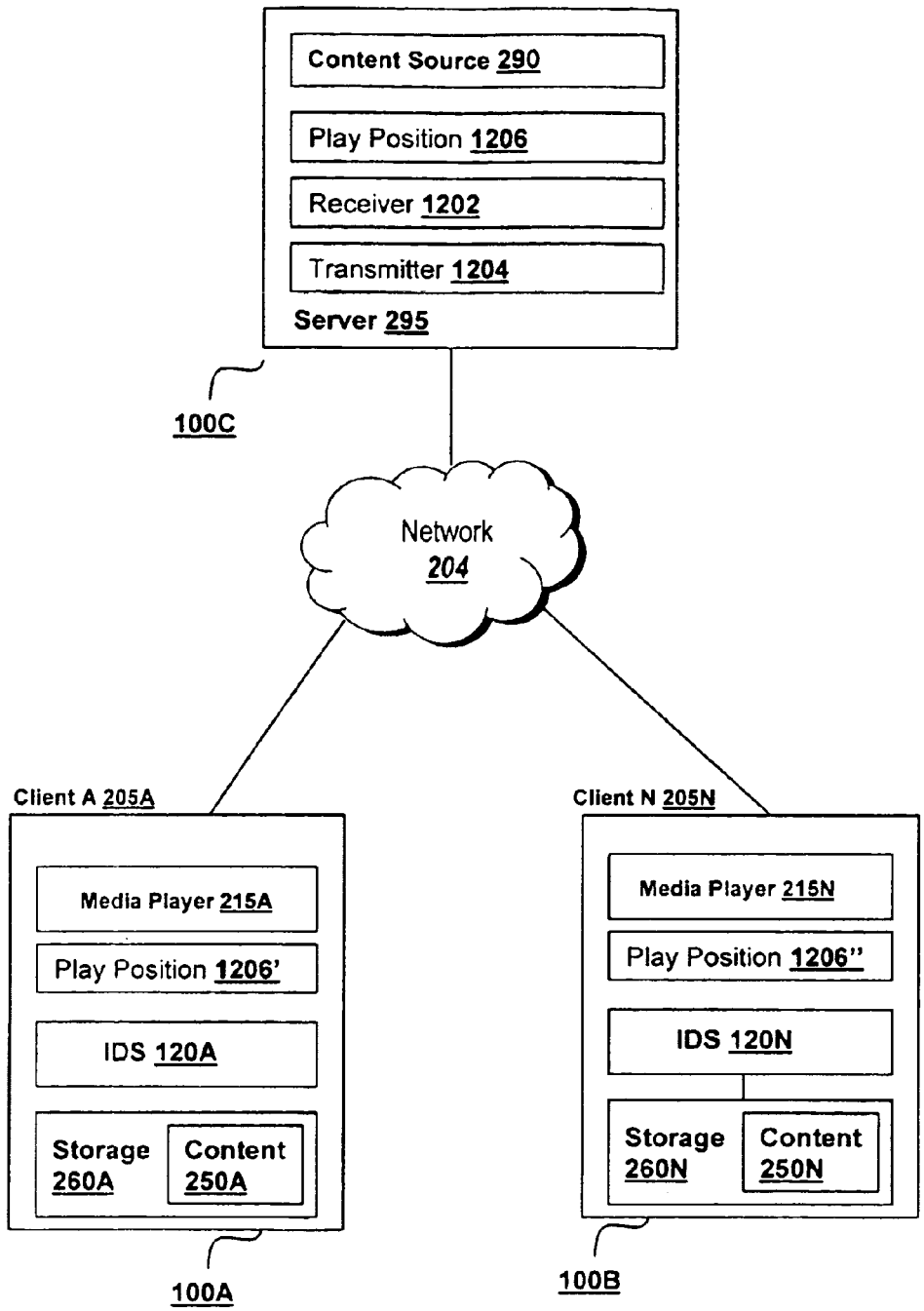
FIG. 12A is a block diagram of an embodiment of a networked environment for practicing synchronization techniques.

Referring now to FIG. 12A, network environment 1200 depicts an embodiment of the IDS 120 for use in synchronizing a user's streaming or playing of media, such as video, between computing devices 100A-100N. In brief overview, a first computing device 100A or client 205A is in communication over a network 204 with a server 295 of computing device 100C. A second computing device 100n or client 205N is also in communication with the server 295 over the network 204, and may also be in communication with the first client 205A via the network 204. The server 295 comprises a receiver 1202 for receiving communications from any of the clients 205A-205N, such as receiving a play position 1206 or user information, or from any other computing device 100 on the network 204. The server 295 also comprises a transmitter 1204 for transmitting communications to any device 100 on the network 205, such as for transmitting streaming media to the first client 205A or the second client 205N.

The server 295 or clients 205A-205N may include information about the play position 1206-1206" of a media being streamed from the server 295 or from one client 205N to another client 205A, or media being played by a media player 215A-215N. The play position 1206-1206" may be associated with a user and the media in any suitable means and mechanism. As such, the play position 1206-1206" may identify the user, the media file or files played or streamed by the user, and one or more play positions for the media file or each of the media files. In one embodiment, the play position information may be stored in the database 227 of the IDS 120 of the client 205A-205N or in a database of the server 295. In another embodiment, the play position 1206-1206" information may be stored in a file, such as a well-known or published file, in any format, such as XML. The play position 1206-1206" may identify a position in the media being streamed or played from which the user desires to mark or identify for starting to stream or play the media from that position on another computing device, media player, session of streaming or at another instance or time for streaming or playing the media. For example, the play position 1206-1206" may identify the point in time or the point in the media at which the streaming or playing of the media was stopped or paused by the user. In some embodiments, the play position 1206-1206" may be an offset, length or location from a starting point of the media in any unit. For example, in one embodiment, the play position 1206-1206" may identify the number of bytes in the file at which the media has been played or streamed. In another embodiment, the play position 1206-1206" may identify the length in time for which the media has been played or streamed, or remaining length in time to be played or streamed. In yet further embodiments, the play position 1206-1206" may identify logical segments or blocks related to the media, such as chapters. Various units and ways to determine and identify a play position of a media may be used in practicing the operations described herein.

Figure 12B:
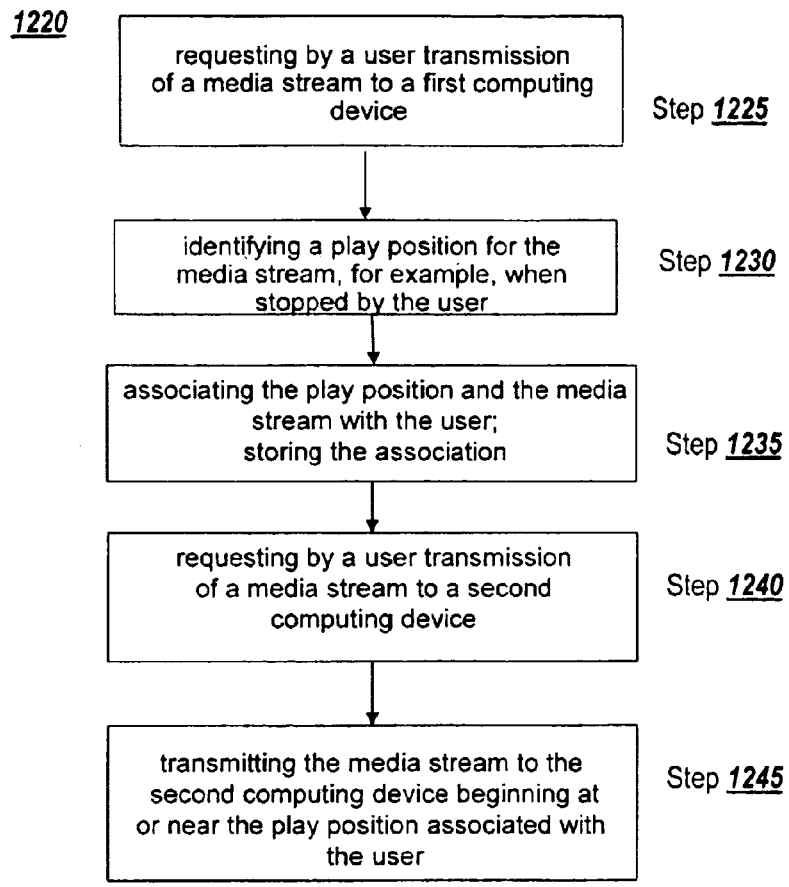
FIG. 12B is a flow diagram of an embodiment of a method performed in practicing a technique of synchronizing transmission of streaming media for a user.

Referring now to FIG. 12B, a method 1220 is depicted for practicing a synchronization technique related to streaming a media file for a user between computing devices. In brief overview, at step 1225, a user requests transmission of a media stream to a first computing device. At step 1230, a play position is identified for the media stream, and at step 1235 is associated with the media and the user. At step 1240, the user requests transmission of the media stream to a second computing device. At step 1245, the media stream is transmitted to the second computing device beginning at or near the play position associated with the user. As such, the user can start streaming media from one client 205A, stop the stream, and start streaming from another client 205N at or near the point at which the stream was stopped.

In further detail, at step 1225, the user may request from any computing device 100 on the network 204 transmission of a media stream from a server 295 to a computing device 100A-100B, such as client 205A. In one embodiment, the user makes the request from the client 205A upon which the user desired to view the streaming media. In another embodiment, the user requests from the client 205A to the server 295 to stream the media to client 205N. In the request, the user may identify the media by name, type or category, and, in some embodiments, may request multiple media files to be streamed. In one embodiment, the receiver 1202 of the server 295 receives the request. In response to the request, the server 295 or content source 290 streams the media to the desired computing device 100A-100N, such as client 205A or 205N. For example, the transmitter 1204 of the server 295 transmits the media over the network 204 to the client 205A-205N. On the receiving device, the streaming media may be played or displayed by a media player 215 or the IDS client 210.

At step 1230 of the method 1220, a play position 1206 is identified for the media stream. This may occur upon any event or trigger associated with the playing of the media stream, operation of the computing device 100 or activity of the user. In some embodiments, the play position 1206 is identified upon the user selecting to stop or pause the media stream. In other embodiments, the play position is identified upon a user logging off the computing device 100 or shutting down the operating system. In further embodiments, the play position 1206 is identified upon detection of interruption in the network connection or interruption in the streaming of media from the server 295. In some embodiments, the play position 1206 is continually identified or tracked and upon an event disrupting operation, such as an unexpected event, for example a computer reboot or shutoff, the last known play position 1206 can be used.

At step 1235, the play position 1206 is associated with the media stream and the user. In some embodiments, the client 205A-205N determines the play position 1206 and sends a communication to the server 295 with the play position 1206, user and media information for the server 295 to maintain for another request to transmit the media stream to the same user. In one embodiment, the server 295 stores the play position 1206 and associated user and media in a database. In another embodiment, the server 295 stores such information in a file, such as an XML file. In some embodiments, multiple play positions 1206 may be associated with the user and the media, such as the last known play position 1206 and a previous play position 1206. This will allow the user to select from multiple play positions 1206-1206" when requesting to stream the media a second time to another computing device or the same computing device.

At step 1240, the user requests transmission of a media stream to a second computing device, such as client 205N. The user may initiate this request from any computing device on the network 204, such as client 205A or server 295, or in some embodiments, from the second client 205N. In one embodiment, the request may indicate the user and the media desired to be streamed. In another embodiment, the request may identify the user. The server 295 may have information stored associating the media file with the user along with the play position 1206. Thus, based on the identified user, the server 295 can lookup the media file and the play position 1206. In some embodiments, the request may identify the user, the media and the play position. In another embodiment, the user may request transmission of the media stream to the first computing device, such as after a period of time from stopping the media stream, or rebooting or shutting off the first computing device.

At step 1245, the server 295 transmits the media stream to the second computing device or client 205N beginning at or near the play position associated with the user. In some embodiments, the server 295 transmits the media stream via the transmitter 1204 and is responsible for starting the media stream at or near the play position 1206. In other embodiments, the server 295 transmits the media stream to the client 205N from the start of the media stream and provides the play position to the client 205N for the client 205N to control, start or provide the media stream at or near the play position 1206 for the user. In one embodiment, the play position 1206 is transmitted with the media stream, such as at the first portion of the stream. In another embodiment, the play position 1206 is communicated via a communication channel separate from the media stream, such as an out of band signal or channel. With the play position 1206, the media player 215 or IDS client 210 may control the streaming of media to display or show the media at or near the play position, for example, by skipping over previous portions of the media prior to the play position 1206. In some embodiments, the server 296 provides multiple play positions 1206 for the user to select from to start the media stream which may be presented to the user by the IDS Client 210 or media player 215. As such, this technique allows a user to synchronize a media stream between computing devices according to a desired play position associated with the user, or synchronizing of a media stream on the same computing device between different streaming or computing sessions of the user.

Figure 12C:
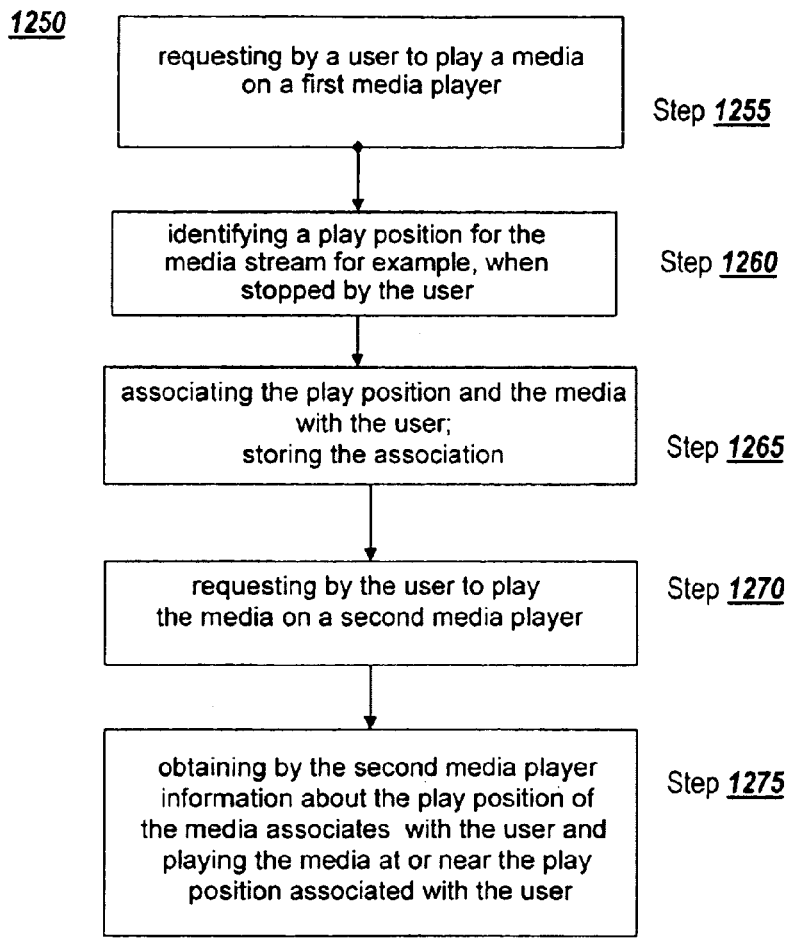
FIG. 12C is a flow diagram of an embodiment of a method performed in practicing a technique of synchronizing playing downloaded media for a user.

Referring now to FIG. 12C, a method 1250 is depicted for practicing a synchronization technique related to playing a media file for a user between media players. In brief overview, at step 1255, a user requests a first media player 215A to play a media. At step 1260, a play position 1206 is identified for the playing of the media, and at step 1265 is associated with the media and the user. At step 1270, the user requests a second media player 215B to play the media. At step 1275, the second media player 1206 obtains information about the play position 1206 of the media associated with the user, and plays the media at or near the play position 1206. The media played by the media player 215A-215N may be downloaded content from a content source 290.

In further detail, at step 1255, the user may request from any computing device 100 on the network 204 a first media player 21 SA to play the media stored on a first computing device 100A such as client 205A. In one embodiment, the user makes the request from the client 205A upon which the user desires to play the media. For example, the user may start or execute the media player 215A or IDS client 210S on client 205A and from the user interface of the media player 215A select and initiate the playing of a media file stored in the storage 260A of the client 205A. In another embodiment, the media player 21 SA may have any type and form of suitable interface to receive a communication from a user from another computing device 100 over the network 204 to play a media from the storage 260A of the client 205A. In the request, the user may identify the stored media by name, type or category, and in some embodiments, may request multiple stored media files to be played by the media player 215A. In response to the request, the media player 215A plays the desired media from the storage 260A of the client 205A.

At step 1260 of the method 1220, a play position 1206 is identified for the media being played by the media player 215A. This may occur upon any event or trigger associated with playing of the media, operation of the client 205A or activity of the user. In some embodiments, the play position 1206 is identified upon the user selecting to stop or pause the media via the media player 215. In other embodiments, the play position is identified upon a user logging off the client 205A or shutting down the operating system. In further embodiments, the play position 1206 is identified upon detection of interruption in operation of the client 205A. In some embodiments, the play position 1206 is continually identified or tracked and upon an event disrupting operation, such as an unexpected event, for example a computer reboot or shutoff, the last known play position 1206 is used.

At step 1265, the play position 1206 is associated with the media and the user. In some embodiments, the client 205A determines the play position 1206 and stores the play position 1206 and user information with the media in storage 260. In other embodiments, the client 205A sends a communication to the' server 295 with the play position 1206, user and media information for the server 295 to store this information, such as in a database or file. In some embodiments, multiple play positions 1206 may be associated with the user and the media, such as the last known play position 1206 and a previous play position 1206. This will allow the user to select from multiple play positions 1206-1206" when requesting to a media player to play the media a second time on another computing device or the same computing device.

At step 1270, the user requests a second media player 215N to a to play the media, such as on client 205N. The user may initiate this request from any computing device on the network 204, such as client 205A or server 295, or in some embodiments, from the second client 205N. In one embodiment, the user executes the second media player 215N on client 205N and via the user interface of the media player 215N request the media to be played. In another embodiment, the request may identify the user. In another embodiment, the user may request a second media player 215N on the first client 205A to play the media. In a further embodiment, the user may request the same media player 215A to play the media after it has been stopped or restarted after the first instance of playing the media.

At step 1275, the second media player 215N obtains information about the play position 1206 associated with the user for the media. In one embodiment, the second media player 215N obtains this information from the first client 205A or the first media player 215A from which the media was played and the play position 1205 identified. In some embodiments, the second client 205N or second media player 215N obtains this information from the storage 260A of the first client 260A or the storage 260N of the second client 205N. For example, the second client 205N may obtain the media from the content source 290A which downloads the play position 1206 associates with the user to be stored with the media in storage 260N. In other embodiments, the second client 205N or second media player 215N requests the play position associated with the user and the media from the content source 290A which stores such information on behalf of the user. With the play position 1206, the media player 215N or IDS client 210N may control the playing of media to start, show or play the media at or near the play position. In some embodiments, the media player 215N skips over previous portions of the media prior to the play position 1206. In some embodiments, multiple play positions 1206 may be associated with the user and the media. In these embodiments, the user may select via the media player 215N from which play position 1206-10206" to start playing from. As such, the techniques described herein allow a user to synchronize a playing of downloaded media between computing devices and/or media players according to a desired play position associated with the user, or synchronizing of playing of a media on the same computing device between different media playing or computing sessions of the user.

Figure 12D:
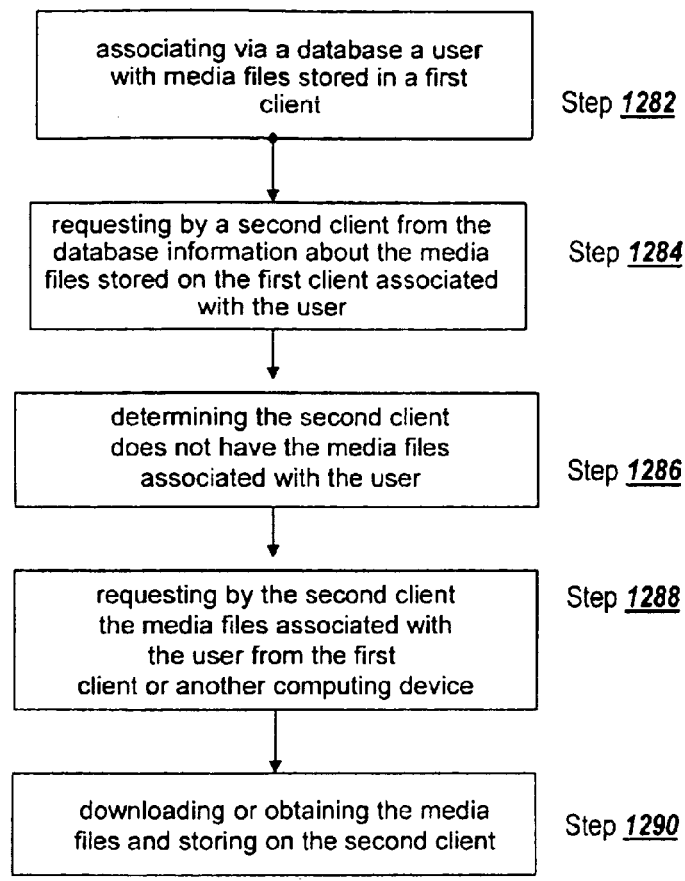
FIG. 12D is a flow diagram of an embodiment of a method performed in practicing a technique of synchronizing content between devices of a user.

Although method 1220 and 1250 are generally described using the IDS client 210 or a media player 215, these techniques may be practiced with media players designed and constructed to practice the operations described herein without the IDS 120. Additionally, the IDS client 210 or media player 215 may include any of the authentication and authorization techniques and features discussed in conjunction with FIGS. 11A-11C. For example, a media player 215 or IDS client 210 may identify a user via the authentication mechanism 1110 in order to associate a user with a media, downloaded or streamed, and to associate a play position 1206 with the user. In some embodiments, the association of the user, play position and the media is stored and maintained in the database 227. Additionally, the authentication mechanism 1110 may be used to provide the play position associated with a user and media to a requesting device, such as the second media player or second media computing device described in conjunction with method 1220 and 1250, Referring now to FIG. 12D, a method 1250 for synchronizing content, such as downloaded media, of a user between computing devices is depicted. In brief overview, at step 1282, a database 227 associates a user with media files stored on a first client 205A. At step 1284, a second client 205N requests information from the database 227 about the media files stored in storage 260A of the first client 205A associated with the user. At step 1286, the second client determines if the media files stored on the first client 205A are also stored in storage 260N of the second client 205N. At step 1288, the second client requests media files associated with the user from the first client 205A or from another computing device, such as server 295. For example, the second client 205N requests the media files determined not be stored for the user on the second client 205B. At step 1290, the media files associated with the user are obtained or downloaded to the second client 205N.

In further detail, at step 1282, a database 227 may associate one or more users with one or more media files, such as video and/or audio files, stored on a first client, such as client 205A. In one embodiment, the database 227 may also be stored on the first client 205a with the user's media files. In another embodiment, the database 227 may be available on another client computing device, such a client 205N or a server 295. The database 227 may organize the records in any suitable manner or arrangement to associate a user with one or more files, the location of the files, and the client storing the files. In one embodiment, the database 227 may associate a user with a directory and sub-directories. In another embodiment, the database 227 may associate a user with one or more Uniform Resource Locators, URLs, which point to one or more media files.

At step 1284, a second client, such as client 205N, may request from the database 227 information about the one or more media files stored on the first client 205A and associated with or belonging to the user. The second client 205N may request this information at any point of time, either in an ad-hoc manner triggered by an event or activity, or otherwise, in a predetermined manner, such as by polling the first client 205N on a determined frequency or scheduled basis. In one embodiment, a user on the second client 205N or the first client 205N requests via any type and form of user interface of the IDS client 210, media player 215, browser 245 or application 248 to synchronize media files of the user among a plurality of computing devices. In one embodiment, the user identifies a first computing device 100A or client 205A, or in another embodiment, a database 227, to be the master in a master/slave relationship as understood by those skilled in the art of information or the master record holder of the files to be synchronized. In some embodiments, the user requests two computing devices to be synchronized, while in other embodiments, the user requests multiple computing devices to be synchronized.

In further embodiments, the user via a user interface of the IDS client 210, media player 215, browser 245 or application 248 configures or specifies one or more schedules or frequencies for a set of computing devices 100 to automatically synchronize the media files of the user. In some embodiments, the IDS client 210 may be configured to automatically synchronize based on an operation of the computer or activity of the user, or any other event or trigger. For example, the IDS client 210 may automatically synchronize media files of a user among computing device upon a user's login to the network or the user's login to a network device. In another example, an IDs client 210 may automatically synchronize media files upon any network detection or other notification that a user is roaming a network from one device to another device or is otherwise likely to switch between computing devices.

In some embodiments, the second client 205N sends a request to the first client 205A to determine what media files a user may have stored on the first client 205A. The first client 205A may check the database 227 or run a query on the files in storage 260A to provide to the second client 205N an enumerated list of files associated with the user on the first client 205A. In another embodiment, the second client 205N sends a request to another computing device, such as the server 295, to query or check a database 227 to determine a list of files on the first client 205A associated with the user. In some embodiments, the second client 205N receives by any suitable communication or interface means and mechanisms from another computing device, such as the first client 205A or server 295 or the database 227, information identifying the user's files stored on the first client 205A.

At step 1286, the second client 205N determines what media files are stored in the storage 260N that belong to or are associated with the user, and compares this information with the information identifying the user's files stored on the first client 205A. In some embodiments, the second client 205N generates an enumerated list of files of the user not found locally in storage 260N of the second client 205N but stored on the fist client 205A. In another embodiment, the second client 205N generates a first enumerated list of files of the user found locally in storage 260N and a second enumerated list of files of the user not found locally in storage 260N. In other embodiments, a database 227 on any of the clients 205A-205N or the server 295 may identify the files stored on the second client 205N and associated with or belonging to the user. As such, in some embodiments, the second client 227 may use a single database or a combination of databases to obtain and compare information about the media files of the user stored on the first client 205A and stored or not stores on the second client 205N.

At step 1288, the second client 205N requests the files of the user not stored in storage 260N from any source or computing device 100, such as the content source 295, server 295N or the first client 205A. In some embodiments, the second client 205N requests the files of the user from a plurality of sources or devices. For example, the second client 205N may request a first set of one or more files of the user from the first client 205A, and request a second set of one or more files of the user from the server 295. In some embodiments, the request may comprise a download request via any type and form of download protocol. In other embodiments, the request may comprise a file transfer request via any type and form of file transfer protocol. In yet another embodiment, the request may comprise a disk copy request or a network file copy request. Various forms of requests and protocols may be used in practicing the operations described herein.

At step 1290, the requested media files are downloaded, copied, transferred, communicated, or otherwise obtained and stored in the storage 260N of the second client 205N. In some embodiments, a portion of the media files to be obtained for the user and stored on the second client 205N may be downloaded via the download manager 220 from one or more content sources 290A-290N. In other embodiments, a portion of the media files to be obtained for the user and stored on the second client 205N may be copies from the storage 260A of the first client 205A over the network 204. In still further embodiments, a portion of the media files of the user may be file transferred via any type and form of ftp application, program, service or task from any computing device 100 on the network 204 to the second client 205N. As such, the second client 205N has synchronized and stored in storage 260N the same media files of the user on the storage 260A of the first client 205A.

Although the embodiment of the method 1280 is generally discussed as synchronizing media files of a user between a first client 205A and a second client 205N, the synchronization techniques of method 1280 may be practiced with a plurality of computing devices in various combinations. For example, a second, third and/or fourth client of the user may be synchronized with the media files of the user stored on a first client. In another example, a second client of the user may be synchronized with media files stored on both a first and third client of the user, and the first client with a fourth or fifth client of the user. In some additional examples, a plurality of clients of the user may be synchronized from a server or a first client of the user.

In yet another embodiment, the IDS 120 or IDS client 210 is related to techniques from requesting from one computing device a download of content to be downloaded to another computing device. For example, a user may browse content from a work or office computer, identify the content for download but request the content to be downloaded to another computer associated with the user, such as a home computer. In another situation, a download may be started on a first computer of the user, such as the work computer, but is either interrupted or will not complete in desired amount of time, for example, before the user commutes homes. The techniques start and continue the download on a second computing device associated with the user, such that the requested download still occurs but on another computing device, for example, on the user's home computer.

Figure 13A:
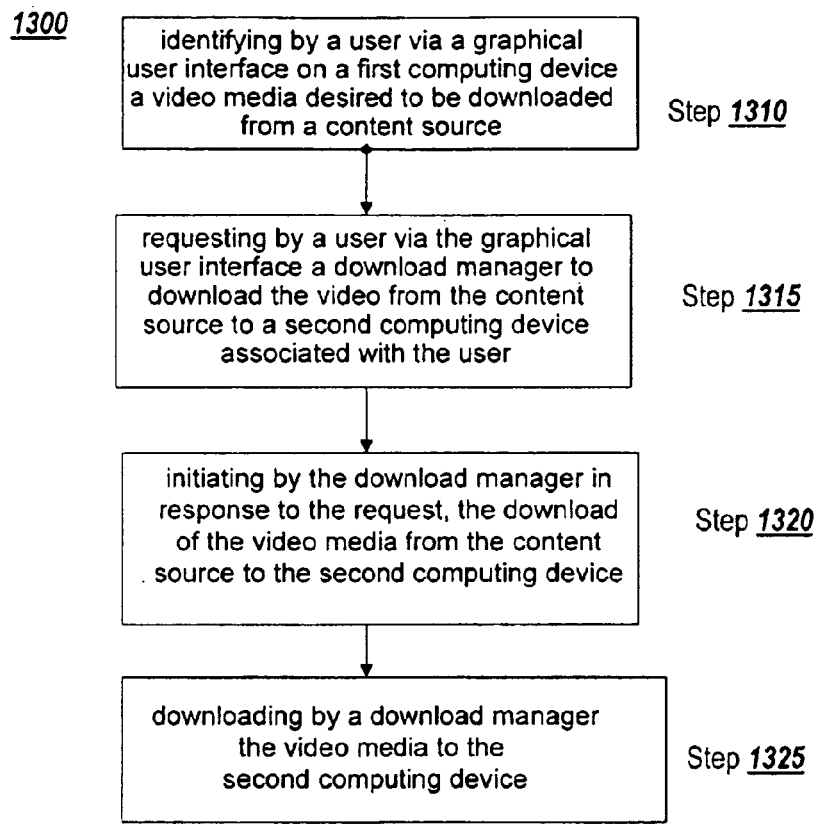
FIG. 13A is a flow diagram of an embodiment of a method performed in practicing a technique of requesting from one computing device a download to another computing device.

These techniques can be practiced in view of any of the embodiments depicted in FIGS. 2A, 2B, 11A and/or 12B, such as via the IDS 120, IDS client 210 or one or more media players 215. Referring now to FIG. 13A, a method 1300 is depicted for practicing an embodiment of the technique to request from a first computing device a download to a second computing device. In brief overview, at step 1310, a user identifies via a graphical user interface on a first computing device a video media from a content source desired to be downloaded. At step 1315, the user requests via the graphical user interface a download manager 220 to download the video media content from the content source to a second computing device associated with the user. At step 1320, the download manager 220 in response to the request initiates a download of the video media from the content sources to the second computing device. At step 1325, a download manager 220, such as a download manager of the first or second computing device, or another computing device downloads the video media to the second computing device.

In further detail, at step 1310, a user may identify the video media from a content source 290 via any type and form of graphical user interface on a first computing device 100a, such as client 205A. Any of the embodiments of the IDS 120 or any computing device 100 may present various types and forms of a user interface, graphical or otherwise, to allow a user to identify and select video media from a content source 290, and that the graphical user interface may be provided or served by a server 295, such as a web server. In one embodiment, the user may identify or select a video media file or list of files desired to be downloaded by clicking and selecting one or more user interface elements in a web page displayed by a browser 245, or in a user interface displayed by an application 248 or a media player 215. In some embodiments, the user identifies one video media file, while in other embodiments, the user identifies multiple video media files.

At step 1315, a user requests via the graphical user interface of the first computing device, such as client 205A, to download the video media from the content source to a second computing device associated with a user, such as a second client 205N. In one embodiment, a computing device is associated with a user in that the user can login, e.g., authenticate, and access, e.g. authorized the computing device, or otherwise has use, ownership, control, or management of the computing device. In some embodiments, the graphical user interface may display a list of one or more computing devices associated with the user. For example, based on the user's authentication on the first client 205A, the IDS 120 may determine the other computing devices the user is associated with. In one embodiment, the database 227 may comprise an association of the user to computing devices. In other embodiments, the IDS 120 may query the server 295 and/or computing devices via the network 204 to determine which computing devices 100 that user can login and/or access, or has previously logged in and/or accessed. In some embodiments, the server 295 may be queried to use the authentication mechanism of the operating system to determine the computing devices available to the user or previously used by the user. In another embodiment, the authentication mechanism 1110 as discussed in FIGS. 11A-11D may be used to determine which computing devices the user may authenticate to or may be authorized to use for downloading in accordance with the operations described herein.

Any of the embodiments of the IDS 120 described herein may present various types and forms of a user interface, graphical or otherwise, to allow a user to select one or more computing devices. In some embodiments, upon selection of the second computing device for which to download the video media, the IDS 120 requests user credentials to authenticate the user to the second computing device, such as via the authentication mechanism 1110. In another embodiment, the IDS 120 uses the credentials of the user on the first computing device to authenticate to the second computing device. In some embodiments, the selected second computing device is authorized for use by the user without presenting or checking user credentials to an authentication mechanism. For example, the user may be logged in to a local area network to which the user has access to all computing devices. In another example, the second computing device was checked for authentication and/or authorization prior to displaying the second computing device as a selection or choice in the graphical user interface.

Upon or after selection of the desired second computing device to which to download, the user may select a user interface element of the graphical user interface, such as submit or download command button, to send a communication or request to a download manger 220 to initiate the download. In one embodiment, the request may be communicated to a download manager 220 on the first computing device. In other embodiments, the request may be communicated to a download manager 220 of the second computing, or another computing device, such as a server 295. In some embodiments, multiple download managers operate on multiple computing devices in a distributed manner in one embodiment, and a client/server manner in another embodiment. As such, in these embodiments, any one of the download managers 220 may receive the request from the user via the graphical user interface of the first computing device. In still further embodiments, a first download manager communicates the request to a second download manager.

At step 1320, the download manager 220 receiving the request from step 1315 initiates the download of the selected video media from the content source to the selected computing device, i.e., the second computing device, in response to the request. In one embodiment, the download manager 220 may perform the download. For example, the download manager 220 of the second computing device receives the request and initiates the download from the content source to storage of the second computing device. In another example, a server 295, such as a web-server, communicates a request to download to the download manager 220 of the second computing device based on the user's interaction or input with the graphical user interface of the first computing device. In another embodiment, the download manager 220 may request a second download manager 220 to perform the download. For example, a first download manager 220 on the first computing device communicates to the second download manager 220 on the second computing device to download the content.

In yet another embodiment, the user may perform any of the steps 1355, 1360, and 1365 via a download order 235 communicated to or used by an IDS client 210. For example, in one embodiment, the user may create, edit, generate or identify and select one or more download orders 235 to identify the video media, the content source and the second computing device in accordance with the method 1350.

At step 1325, the download manager 220 selected to provide the download of the selected video media to the selected computing device downloads such media to the device. The download manager 220 may use any of the download and storage techniques described herein to download such content. In one embodiment, the user may have a selected one computing device to which to download the video media, while in another embodiment, the user may have selected multiple computing devices to which to download the video media. As such, multiple requests may be received by one or more download managers to perform downloads of the selected video media to a plurality of selected computing devices. In still further embodiments, the user via the graphical user interface of the first computing device selected a first video media to be downloaded to a second computing device, and a second video media to be downloaded to a third computing device. Additionally, the first video media and the second video media may be selected to be downloaded from the same or different content sources. These techniques may be practiced in various combinations of selected video media files, selected content sources and selected computing devices for downloads a plurality of video media from one or more content sources to one or more computing devices other than the first computing device from which the user interacts with the graphical user interface.

Figure 13B:
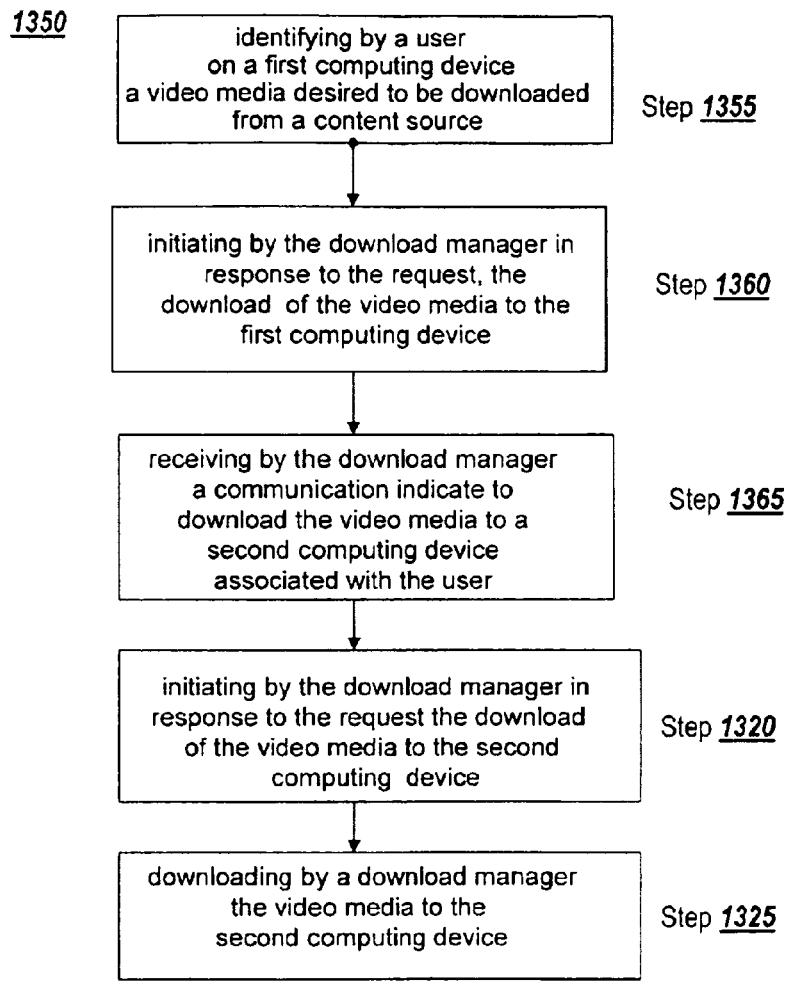
FIG. 13B is a flow diagram of an embodiment of a method performed in practicing a technique of changing the download from one computing device to another computing device.

In another embodiment of these techniques, FIG. 13B depicts an embodiment of a method 1350 for downloading a video media to another computing device at some point during the download of the video media to the first computing device. For example, the IDS 120 may automatically switch to download the video media to the second computing device upon interruption to or expirations of a time limit of the download of the video media on the first computing device. In brief overview, at step 1355, the user identifies on a first computing a video media desired to be downloaded from a content source. At step 1360, a download manager on the first computing device in response to the request initiates or starts the download of the identified video media to the first computing device. At step 1365, the download manager 220 receives a communication, such as a notification or a request, to download the video media to a second computing device associated with the user. At step 1370, in response to the request or communication at step 1365, the download manager initiates the download of the video media to the second computing device. At step 1375, a download manager, such as a download manager of the first computing device or second computing device, downloads the video media to the second computing device.

At step 1355, the user identifies on a first computing device a video media desired to be downloaded from a content source. In one embodiment, the user identifies the video media via a graphical user interface, such as one provided by a browser 248 via a web server 295. In another embodiment, a download order 235 may identify a video media file to be downloaded from a content source. The user may identify the video media to be downloaded by any suitable means and mechanisms, such as clicking a user interface element provide a listing of selectable video media files. In some embodiments, the user identified multiple video media files from one or more content sources.

At step 1360, a download manager 220 of the first computing device initiates or otherwise starts to download the identified video media file(s) from the content source(s) to the storage 260 of the first computing device. In some embodiments, the download manager 220 requests the video media file from the content source but has not yet received any portion of the video media file. In other embodiments, the download manager 220 receives portions of the video media file from the content source, and has stored some or all of the received portions to the storage 260 of the first computing device. In another embodiment, the download manager 220 receives and stores the complete copy of a first video media file to storage, but is still waiting to receive portions of a second or third media file from a content source to store in storage 260 of the first computing device.

At step 1365, during performing the download requested by the user, the download manager 220 may receive a communication indicating the download should be performed on a second computing device. In some embodiments, based on a schedule or time limit to perform the download on the first computing device, the IDS 120 of the present may trigger the download to occur on a second computing device. For example, a user may want the download to occur on the first computing device at the office or at work, unless the download cannot be completed prior to leaving work, then the download should be performed on a second computing device, such as a home computer. In another example, if the user logs off the work computer or the download is still running at 5 P.M., this may trigger the download to occur on the home computer. In one embodiment, the user of the first computing device may request via a user interface to the download manager 220 to instead have the identified video media be downloaded to a second computing device. The communication to trigger the download to the second computing device may automatic, manual, ad-hoc or predetermined and may be based on operation of the first computing device, activity of the user on the first computing device, or performance or schedule of the download.

Upon receiving the request to download the video media to a second computing device, the IDS performs the steps 1320 and 1325 as discussed above in conjunction with the method 1300. The download manager initiates the download to the second computing device in response to the request, and a download manager, such as a download manager of the first or second computing device, performs the download. In some embodiments, although a portion of the download was downloaded to the first computing device, the download manager downloads the entire video media file or otherwise performs the entire download request for the second computing device. In yet another embodiment, the first computing device provides the second computing device the portion of the video media file already downloaded and the download manager continues to download the video media file from the point at which the first computing device stopped downloading. In still another embodiment, the first download manager 220 of the first computing device continues to download the video media while a second download manager of the second computing device also downloads the vide media.

In view of the techniques described in conjunction with FIGS. 13A-13B, the IDS provides techniques and methods for users to download media to one or more computing devices associated with the user from any Internet or network connected computing device, including mobile computing and telecommunications devices. As such, the IDS gives users great flexibility on when and where desired download of content such as video occurs. Additionally, the IDS can download the content to another computing device for a user as the user roams between locations or upon events or triggers under which it may be desirable to download to another computing device.

Although the IDS at times may be generally described in relation to content of video and/or audio media files, these media files or content may include any format for providing any type and form of visual and/or auditory experience to the user, such as the Macromedia flash file format. (.swf) playable by a Macromedia flash player manufactured by Adobe Systems Incorporated of San Jose, Calif., or any file format and media files produced by the Macromedia Director or played by the Macromedia Shockwave Player products also manufactured by Adobe Systems Incorporated.

In some embodiments, any one of the techniques or methods described herein may be combined with any other technique or method. For example, in one embodiment, the flipping technique described in conjunction with FIG. 4B may be practiced in combination with the caching and virtual file system techniques of FIGS. 5D-5E, and/or with the shuffle storage technique of FIG. 6C. In another example embodiment, the multiple content source downloading technique of FIG. 7B may be combined with the delivery behavior techniques of FIG. 8C, which may also be combined with the flipping technique, caching and virtual file system techniques, and/or the shuffle storage techniques. In yet a further example, any of the online and offline content related systems and techniques described in FIGS. 9A-10E may be practiced with any of the downloading, caching and storing techniques. Additionally, in another example, any of the personalization, synchronization, and download techniques of FIGS. 12A-13B may be practiced with the flipping, caching and virtual file system, and shuffle storage techniques, and/or the multiple content downloading technique.

In view of the structure, function and operations of the embodiments of the system, methods and techniques described herein, the Integrated Delivery System (IDS) provides a comprehensive development and delivery platform, and client-side technology for the intelligent and effective delivery and management of video and audio applications and services over the Internet to network connected consumer devices or Internet enabled media devices. As described herein, the IDS may use several techniques for the download, caching and storage of content to a client from one or more content sources. Additionally, the IDS provides techniques for the development and delivery of offline content and user experience corresponding and similar to the online content and user experience. Furthermore, the IDS provides for a multi-user media playing platform with authentication, authorization and accounting policies and services. Moreover, the IDS also provides for the personalization and synchronization of downloaded content on a user basis that can be downloaded and viewed anytime and anywhere.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:
1. A method comprising the steps of:
   (a) displaying, by a client computer, a first user interface having at least a portion communicated via a network;
   (b) displaying, by the first user interface, a first set of one or more user interface elements having an appearance and a behavior;
   (c) displaying, by the client computer, a portion of video media communicated via the network;
   (d) while displaying the portion of video media, automatically downloading, by the client computer to storage of the client computer, the remainder of the video media and a second user interface;
   (e) detecting, by the client computer, that the client computer is no longer connected to the network;
   (f) displaying, by the client computer, the second user interface, the second user interface having a second set of one or more user interface elements matching the appearance and behavior of the first set of one or more user interface elements of the first user interface with the exception of one or more optional user interface ele- ments that do not match the appearance and behavior of the first set of one or more user interface elements of the first user interface; and (g) displaying, by the client computer via the second user interface, the remainder of the video media in a higher definition of video quality from the storage of the client computer.

2. The method of claim 1, comprising displaying, by a browser, the first user interface, the browser in communication via the network with a server.

3. The method of claim 1, comprising displaying, by an application on the client computer, the second user interface, the application obtaining the remainder of the video media for the second user interface from the storage of the client computer instead of via the network.

4. The method of claim 3, comprising, displaying by the application, for the second user interface at least one user interface element communicated via the network.

5. The method of claim 1, comprising displaying the second user interface instead of the first user interface in response to a request by a user via an element of the first user interface.

6. The method of claim 1, comprising automatically downloading the video media as a background process transparent to the user.

7. The method of claim 1, comprising downloading the video media to the storage of the client computer as a background process transparent to the user while the first user interface displays the video media on the client computer communicated via the network.

8. The method of claim 1, wherein the remainder of the video media stored in the storage of the client computer comprises a desired video characteristic not provided by the video media communicated via the network.

9. The method of claim 8, wherein the desired video characteristic comprises one or more of the following: a resolution, an aspect ratio, a size, a quality, a bit per pixel, a compression, a frame rate, and a bit rate.

10. A client computer comprising:
a storage;
a display;
a first user interface having at least a portion communicated via a network, the first user interface displaying a first set of one or more user interface elements and displaying on the display a portion of video media communicated via the network, the first set of one or more user interface elements having an appearance and a behavior,
while displaying the portion of the video media on the display, a download manager automatically downloading to the storage a remainder of the video media from a content source and a second user interface, the second user interface having a second set of one or more user interface elements corresponding to and matching the appearance and behavior of the first set of one or more user interface elements of the first user interface with the exception of one or more optional user interface elements that do not match the appearance and behavior of the first set of one or more user interface elements of the first user interface; and
a processor invoking the second user interface to display on the display the remainder of the video media from the storage in a higher definition of video quality.

11. The client computer of claim 10, comprising a browser displaying the first user interface, the browser in communication via the network with a server.

12. The client computer of claim 10, comprising an application displaying the second user interface, the application obtaining content for the second user interface from the storage of the client computer instead of via the network.

13. The client computer of claim 12, wherein the application displays for the second user interface at least one user interface element communicated via the network.

14. The client computer of claim 10, wherein the second user interface is displayed instead of the first user interface in response to a request by a user via an element of the first user interface.

15. The client computer of claim 10, comprising automatically downloading the content as a background process transparent to the user.

16. The client computer of claim 10, wherein the download manager downloads the remainder of the video media to the storage of the client computer as a background process transparent to the user while the first user interface displays the portion of the video media on the client computer communicated via the network.

17. The client computer of claim 10, wherein the first user interface comprises an element selectable, by the user to display the video media in a higher definition of video quality, and in response to a selection of the element, the first user interface invokes the second user interface to display the video media from the storage on the client computer, the video media from the storage providing the higher definition of video quality.

18. The client computer of claim 10, wherein the video media stored in the storage of the client computer comprises a desired video characteristic not provided by the video media communicated via the network.

19. The client computer of claim 18, wherein the desired video characteristic comprises one or more of the following: a resolution, an aspect ratio, a size, a quality, a bit per pixel, a compression, a frame rate, and a bit rate.

* * * * *